US009047166B2

(12) United States Patent
Nishio et al.

(10) Patent No.: US 9,047,166 B2
(45) Date of Patent: Jun. 2, 2015

(54) SYSTEM FOR GENERATING APPLICATION SOFTWARE INSTALLED ON A MOBILE TERMINAL

(75) Inventors: Naoki Nishio, Tokyo (JP); Shinya Matsuda, Tokyo (JP); Yasuhiro Nezu, Tokyo (JP); Eiichi Ohsawa, Tokyo (JP); Akira Tateishi, Tokyo (JP)

(73) Assignee: Mediaseek, Inc., Tokyo (JP)

( * ) Notice: Subject to any disclaimer, the term of this patent is extended or adjusted under 35 U.S.C. 154(b) by 0 days.

(21) Appl. No.: 14/355,740

(22) PCT Filed: Nov. 4, 2011

(86) PCT No.: PCT/JP2011/075394
§ 371 (c)(1),
(2), (4) Date: May 1, 2014

(87) PCT Pub. No.: WO2013/065165
PCT Pub. Date: May 10, 2013

(65) Prior Publication Data
US 2014/0298293 A1    Oct. 2, 2014

(51) Int. Cl.
*G06F 9/44* (2006.01)
(52) U.S. Cl.
CPC ... *G06F 8/71* (2013.01); *G06F 8/30* (2013.01)
(58) Field of Classification Search
CPC ..................................... G06F 8/30; G06F 8/71
USPC ................... 717/106–108, 120, 121
See application file for complete search history.

(56) References Cited

U.S. PATENT DOCUMENTS 8,239,840 B1 *    8/2012   Czymontek ................... 717/135
8,352,903 B1 *    1/2013   Friedman ...................... 717/100
(Continued)

FOREIGN PATENT DOCUMENTS

JP    2003173261 A    6/2003
JP    2004128649 A    4/2004
(Continued)

OTHER PUBLICATIONS

Japanese Office Action, Japanese Patent Application No. 2012-535509; mailed Jun. 12, 2013.
(Continued)

*Primary Examiner* — Qing Chen
(74) *Attorney, Agent, or Firm* — Hogan Lovells US LLP

(57) ABSTRACT

An application generation system configured to automatically generate an application having a desired function is disclosed. The application generation system has a mobile terminal including computation means for performing predetermined computation processing, image capture means for capturing an information code, decoding means for decoding the information code to extract character information, display means for displaying predetermined information, and first communication means for communicating character information. The system includes a server having second communication means for communicating with the first communication means, an assessment database storing assessment rules, a program component database storing program components, and analysis means which analyzes character information received by the second communication means to determine results of the analysis based on the assessment rules stored in the assessment database to determine information related to attributes and configuration of an application to be generated as well as program components configuring the application.

18 Claims, 33 Drawing Sheets

(56) References Cited

U.S. PATENT DOCUMENTS

| | | | |
|---|---|---|---|
| 8,479,154 B1* | 7/2013 | Friedman | 717/106 |
| 8,850,389 B2* | 9/2014 | Jo et al. | 717/107 |
| 2003/0110239 A1 | 6/2003 | Sugumoto | |
| 2007/0220494 A1* | 9/2007 | Spooner | 717/130 |
| 2008/0109528 A1 | 5/2008 | Knight et al. | |
| 2008/0222621 A1 | 9/2008 | Knight et al. | |
| 2010/0174974 A1* | 7/2010 | Brisebois et al. | 715/223 |
| 2011/0023011 A1* | 1/2011 | Khader et al. | 717/106 |
| 2012/0110546 A1* | 5/2012 | Jo et al. | 717/107 |
| 2012/0250106 A1* | 10/2012 | Kiran Kannambadi et al. | 358/474 |
| 2012/0254768 A1* | 10/2012 | Aggarwal et al. | 715/744 |
| 2012/0254853 A1* | 10/2012 | Aggarwal et al. | 717/173 |

FOREIGN PATENT DOCUMENTS

| | | |
|---|---|---|
| JP | 2005150941 A | 6/2005 |
| JP | 2008523464 A | 7/2008 |
| JP | 2008310637 A | 12/2008 |
| JP | 2009055166 A | 3/2009 |
| JP | 2009098741 A | 5/2009 |
| JP | 2009282896 A | 12/2009 |
| JP | 2010117816 | 5/2010 |
| JP | 2010191917 A | 9/2010 |
| JP | 2011086198 A | 4/2011 |

OTHER PUBLICATIONS

Translated Japanese International Search Report, PCT Application No. PCT/JP2011/075394, Japanese Receiving Office, completed Mar. 22, 2012, mailed Apr. 3, 2012.

Japanese International Search Report and Written Opinion, PCT Application No. PCT/JP2011/075394, Japanese Receiving Office, completed Mar. 22, 2012, mailed Apr. 3, 2012.

* cited by examiner

| ATTRIBUTE | MAIN PURPOSE / CHARACTERISTIC | COMPONENT TO BE BASED |
|---|---|---|
| TYPE A | PROMOTION EVENT (INCLUSIVE OF VIDEO/VOICE REPRODUCTION FOR ADVERTISEMENT, ETC.) | BASIC COMPONENT A |
| TYPE B | URL ACCESS | BASIC COMPONENT B |
| TYPE C | COMMUNICATIONS MEAN ESTABLISHMENT | BASIC COMPONENT C |
| TYPE D | MEMBERSHIP CARD | BASIC COMPONENT D |
| TYPE E | COUPON TICKET | BASIC COMPONENT E |
| TYPE F | RESTAURANT INFORMATION | BASIC COMPONENT F |
| TYPE G | RETAIL SHOP INFORMATION | BASIC COMPONENT G |

| NAME OF COMPONENT | FUNCTION(S) POSSESSED BY COMPONENT |
|---|---|
| COMPONENT a | DISPLAY FUNCTIONS OF COOPERATION NAME / SHOP NAME, ETC. |
| COMPONENT b | TELEPHONE NUMBER/FACSIMILE NUMBER DISPLAY AND TRANSMISSION FUNCTION |
| COMPONENT c | BUSINESS HOURS DISPLAY FUNCTION |
| COMPONENT d | MAIL ADDRESS DISPLAY / MAIL GENERATION / TRANSMISSION AND RECEPTION FUNCTION |
| COMPONENT e | SMS DISPLAY / RECEPTION AND TRANSMISSION FUNCTION |
| COMPONENT f | MEMBERSHIP CARD INFORMATION DISPLAY / MANAGEMENT FUNCTION |
| COMPONENT g | COUPON TICKET DISPLAY FUNCTION |
| COMPONENT h | VOICE REPRODUCTION FUNCTION |
| COMPONENT i | VIDEO REPRODUCTION FUNCTION |
| COMPONENT j | URL ACCESS FUNCTION |

| APP ID | TITLE | Ver. # | CHARACTER STRING (xxxxx/yyyyy/012345/etc...) | ADDITIONAL INFORMATION (ag/fm/aa/yy/mm/dd/tttt/ll/na/xx/yy/zz) | CONTROL CODE (xxx/x0000/00000) | GENERATION OF APP |
|---|---|---|---|---|---|---|
| xxxxx-000000 | RESTAURANT A-1 | 1.02 | http://www.inshoku_a.jp/coupon/yyyyy/zzzzz/001 | na/na/01/na/yy/mm/dd/tttt/ll/na/xx/yy/na/na | aaa/a0000/12345 | YES |
| xxxxx-000001 | RESTAURANT A-2 | 1.01 | — | na/na/01/na/na/na/na/ja/ja/na/na/na/na | — | YES |
| xxxxx-000002 | RESTAURANT A-3 | 1.04 | — | na/na/01/na/na/na/na/ja/ja/na/na/na/na | — | YES |
| xxxxx-000006 | BOOKSTORE B-1 | 1.04 | http://www.hon_b.com/campaigne/2011_winter/01 | na/na/01/11/na/na/na/ja/ja/na/na/na/na | abc/a0010/33333 | YES |
| xxxxx-000007 | BOOKSTORE B-2 | 1.02 | — | na/na/01/11/na/na/na/ja/ja/na/na/na/na | — | YES |
| xxxxx-000008 | BOOKSTORE B-3 | 1.01 | — | na/na/01/na/na/na/na/ja/ja/na/na/na/na | — | YES |
| xxxxx-000009 | BOOKSTORE C-1 | 1.01 | http://www.hon_c.com/ad/2011/0001 | na/na/01/na/na/na/na/ja/ja/na/na/na/na | — | YES |
| xxxxx-000011 | CAR DEALER A-1 | 1.02 | cardealer_a/ad/001 | na/na/01/na/na/na/na/ja/ja/na/na/na/na | amf/g0010/24353 | YES |
| xxxxx-000012 | CAR DEALER A-2 | 1.01 | — | na/na/01/na/na/na/na/ja/ja/na/na/na/na | — | YES |
| xxxxx-000014 | CAR DEALER B-1 | 1.01 | cardealer_b/ad/001 | na/na/01/na/na/na/na/ja/ja/na/na/na/na | — | YES |
| xxxxx-000015 | CAR DEALER C-1 | 1.01 | cardealer_c/ad/001 | na/na/01/na/na/na/na/ja/ja/na/na/na/na | — | YES |
| xxxxx-000018 | INDIVIDUAL (PARENT APP ID=xxx0000) | 1.03 | suuchijouhou_9876543210_abcdefg/xyz | — | — | YES |
| xxxxx-000019 | INDIVIDUAL (PARENT APP ID=xxx0001) | 1.02 | suuchijouhou_9876543210_abcdefg/xyz | — | — | YES |
| xxxxx-000024 | RESTAURANT B-1 | 1.05 | inshoku_b/minato-ku/minamiazabu/0-0-0 | na/na/01/na/na/na/na/ja/ja/na/na/na/na | bbb/b0000/00000 | NO |
| xxxxx-000025 | RESTAURANT C-1 | 1.03 | inshoku_c/minato-ku/nishiazabu/0-0-0 | na/na/01/na/na/na/na/ja/ja/na/na/na/na | ccc/c0000/00000 | NO |

FIG. 7(b1)

| APP ID | TITLE | APP ATTRIBUTE | INFORMATION PERTAINING TO PROGRAM COMPONENTS | BASIC COMPONENT |
|---|---|---|---|---|
| xxxxx-000000 | RESTAURANT A-1 | TYPE F (RESTAURANT INFORMATION) | buhin/01234/00 | F |
| xxxxx-000001 | RESTAURANT A-2 | TYPE A (PROMOTION / EVENT) | buhin/01234/00 | A |
| xxxxx-000002 | RESTAURANT A-3 | TYPE E (COUPON TICKET) | buhin/01234/00 | E |
| xxxxx-000006 | BOOKSTORE B-1 | TYPE G (RETAIL STORE INFORMATION) | buhin/01234/00 | G |
| xxxxx-000007 | BOOKSTORE B-2 | TYPE A (PROMOTION / EVENT) | buhin/01234/00 | A |
| xxxxx-000008 | BOOKSTORE B-3 | TYPE D (MEMBERSHIP CARD) | buhin/01234/00 | D |
| xxxxx-000009 | BOOKSTORE C-1 | TYPE B (URL ACCESS) | buhin/01234/00 | B |
| xxxxx-000011 | CAR DEALER A-1 | TYPE A (PROMOTION / EVENT) | buhin/01234/00 | A |
| xxxxx-000012 | CAR DEALER A-2 | TYPE G (RETAIL STORE INFORMATION) | buhin/01234/00 | G |
| xxxxx-000014 | CAR DEALER B-1 | TYPE B (URL ACCESS) | buhin/01234/00 | B |
| xxxxx-000015 | CAR DEALER C-1 | TYPE G (RETAIL STORE INFORMATION) | buhin/01234/00 | G |
| xxxxx-000018 | INDIVIDUAL (PARENT APP ID=xxx0900) | TYPE C (ESTABLISHMENT OF COMMUNICATION MEAN WITH INDIVIDUAL) | buhin/01234/00 | C |
| xxxxx-000019 | INDIVIDUAL (PARENT APP ID=xxx0901) | TYPE C (ESTABLISHMENT OF COMMUNICATION MEAN WITH INDIVIDUAL) | buhin/01234/00 | C |
| xxxxx-000024 | RESTAURANT B-1 | TYPE F (RESTAURANT INFORMATION) | buhin/01234/00 | F |
| xxxxx-000025 | RESTAURANT C-1 | TYPE F (RESTAURANT INFORMATION) | buhin/01234/00 | F |

FIG. 7(b2)

| APP ID | a | b | c | \multicolumn{7}{c}{EMBED INFORMATION PERTAINING TO COMPONENTS} |
|---|---|---|---|---|---|---|---|---|---|---|

| APP ID | a | b | c | d | e | f | g | h | i | j |
|---|---|---|---|---|---|---|---|---|---|---|
| xxxxx-000000 | IMPERIAL HOST | 075-0000-0000 /nul | WEEKDAYS:00:00~24:00, nul, SATURDAYS, SUNDAYS AND HOLIDAYS:00:00~24:00, nul, CLOSED DAY: NON | nul | nul | nul | nul | nul | nul | http://www.imperialhost.com |
| xxxxx-000001 | IMPERIAL HOST | 075-0000-0000 /nul | WEEKDAYS:00:00~24:00, nul, SATURDAYS, SUNDAYS AND HOLIDAYS:00:00~24:00, nul, CLOSED DAY: NON | nul | nul | nul | nul | nul | http://www.imperialhost.com/promo/2012summer/video_01 | http://www.imperialhost.com |
| xxxxx-000002 | IMPERIAL HOST | 075-0000-0000 /nul | WEEKDAYS:00:00~24:00, nul, SATURDAYS, SUNDAYS AND HOLIDAYS:00:00~24:00, nul, CLOSED DAY: NON | nul | nul | nul | http://www.imperialhost.com/coupon/2012summer/c_03 | nul | nul | http://www.imperialhost.com |
| xxxxx-000006 | AKASAKA BOOKSTORE | 03-xxxx-xxxx | WEEKDAYS:00:00~24:00, nul, SATURDAYS, SUNDAYS AND HOLIDAYS:00:00~24:00, nul, CLOSED DAY: NON | MAIL ADDRESS | SMS ADDRESS | MEMBERSHIP CARD INFORMATION | COUPON IMAGE DATA STORAGE PLACE | VOICE DATA STORAGE PLACE | VIDEO DATA STORAGE PLACE | URL |
| xxxxx-000007 | AKASAKA BOOKSTORE | 03-xxxx-xxxx | WEEKDAYS:00:00~24:00, nul, SATURDAYS, SUNDAYS AND HOLIDAYS:00:00~24:00, nul, CLOSED DAY: NON | MAIL ADDRESS | SMS ADDRESS | MEMBERSHIP CARD INFORMATION | COUPON IMAGE DATA STORAGE PLACE | VOICE DATA STORAGE PLACE | VIDEO DATA STORAGE PLACE | URL |
| xxxxx-000008 | AKASAKA BOOKSTORE | 03-xxxx-xxxx | WEEKDAYS:00:00~24:00, nul, SATURDAYS, SUNDAYS AND HOLIDAYS:00:00~24:00, nul, CLOSED DAY: NON | MAIL ADDRESS | SMS ADDRESS | MEMBERSHIP CARD INFORMATION | COUPON IMAGE DATA STORAGE PLACE | VOICE DATA STORAGE PLACE | VIDEO DATA STORAGE PLACE | URL |
| xxxxx-000009 | YAMABUKI BOOKS | 03-xxxx-xxxx | WEEKDAYS:11:00~24:00, nul, nul, nul, CLOSED DAYS: SATURDAYS, SUNDAYS AND HOLIDAYS | MAIL ADDRESS | SMS ADDRESS | MEMBERSHIP CARD INFORMATION | COUPON IMAGE DATA STORAGE PLACE | VOICE DATA STORAGE PLACE | VIDEO DATA STORAGE PLACE | URL |

FIG. 7(c)

| APP ID | TITLE | APP ATTRIBUTE | SETTING CONDITION 1 (ACCUMULATED TOTAL ACTIVATION NUMBER OF TIMES) | SETTING CONDITION 2 (ACCUMULATED TOTAL ACTIVATION TIME) | SETTING CONDITION 3 (EVENT ARGUMENT α) | SETTING CONDITION 4 (EVENT ARGUMENT β) |
|---|---|---|---|---|---|---|
| xxxxx-000000 | RESTAURANT A-1 | TYPE F (RESTAURANT INFORMATION) | SETTING CONDITION 1 (ACCUMULATED TOTAL ACTIVATION NUMBER OF TIMES) IF ACTIVATION NUMBER OF TIMES ≥ XXX, THEN REPLACE BY APP OF APP ID "xx" | SETTING CONDITION 2 (ACCUMULATED TOTAL ACTIVATION TIME) IF ACTIVATION TIME ≥ hh, THEN REPLACE BY APP OF APP ID "xx" | NON / STILL NOT SET | NON / STILL NOT SET |
| xxxxx-000001 | RESTAURANT A-2 | TYPE A (PROMOTION / EVENT) | NON / STILL NOT SET | NON / STILL NOT SET | NON / STILL NOT SET | NON |
| xxxxx-000002 | RESTAURANT A-3 | TYPE E (COUPON TICKET) | NON / STILL NOT SET | NON / STILL NOT SET | NON / STILL NOT SET | NON / STILL NOT SET |
| xxxxx-000006 | BOOKSTORE B-1 | TYPE G (RETAIL STORE INFORMATION) | SETTING CONDITION 1 (ACCUMULATED TOTAL ACTIVATION NUMBER OF TIMES) IF ACTIVATION NUMBER OF TIMES ≥ XXX, THEN REPLACE BY APP OF APP ID "xx" | NON / STILL NOT SET | NON / STILL NOT SET | SETTING CONDITION 4 (EVENT ARGUMENT β) IF β = b, THEN REPLACE BY APP OF APP ID "xx" |
| xxxxx-000007 | BOOKSTORE B-2 | TYPE A (PROMOTION / EVENT) | NON / STILL NOT SET | NON / STILL NOT SET | NON / STILL NOT SET | SETTING CONDITION 4 (EVENT ARGUMENT β) IF β = b, THEN REPLACE BY APP OF APP ID "xx" |
| xxxxx-000008 | BOOKSTORE B-3 | TYPE D (MEMBERSHIP CARD) | NON / STILL NOT SET | NON / STILL NOT SET | NON / STILL NOT SET | NON / STILL NOT SET |
| xxxxx-000009 | BOOKSTORE C-1 | TYPE B (URL ACCESS) | NON / STILL NOT SET | NON / STILL NOT SET | NON / STILL NOT SET | NON / STILL NOT SET |
| xxxxx-000011 | CAR DEALER A-1 | TYPE A (PROMOTION / EVENT) | NON / STILL NOT SET | NON / STILL NOT SET | SETTING CONDITION 3 (EVENT ARGUMENT α) IF α = a, THEN REPLACE BY APP OF APP ID "xx" | SETTING CONDITION 4 (EVENT ARGUMENT β) IF β = b, THEN REPLACE BY APP OF APP ID "xx" |
| xxxxx-000012 | CAR DEALER A-2 | TYPE G (RETAIL STORE INFORMATION) | NON / STILL NOT SET | NON / STILL NOT SET | SETTING CONDITION 3 (EVENT ARGUMENT α) IF α = a, THEN REPLACE BY APP OF APP ID "xx" | NON / STILL NOT SET |
| xxxxx-000014 | CAR DEALER B-1 | TYPE B (URL ACCESS) | NON / STILL NOT SET | NON / STILL NOT SET | NON / STILL NOT SET | NON / STILL NOT SET |
| xxxxx-000015 | CAR DEALER C-1 | TYPE G (RETAIL STORE INFORMATION) | NON / STILL NOT SET | NON / STILL NOT SET | NON / STILL NOT SET | NON / STILL NOT SET |
| xxxxx-000018 | INDIVIDUAL (PARENT APP ID=xx0002) | TYPE C (ESTABLISHMENT OF COMMUNICATION MEAN WITH INDIVIDUAL) | NON / STILL NOT SET | NON / STILL NOT SET | NON / STILL NOT SET | NON / STILL NOT SET |
| xxxxx-000019 | INDIVIDUAL (PARENT APP ID=xx0003) | TYPE C (ESTABLISHMENT OF COMMUNICATION MEAN WITH INDIVIDUAL) | NON / STILL NOT SET | NON / STILL NOT SET | NON / STILL NOT SET | NON / STILL NOT SET |
| xxxxx-000024 | RESTAURANT B-1 | TYPE F (RESTAURANT INFORMATION) | NON / STILL NOT SET | NON / STILL NOT SET | NON / STILL NOT SET | NON / STILL NOT SET |
| xxxxx-000025 | RESTAURANT C-1 | TYPE F (RESTAURANT INFORMATION) | NON / STILL NOT SET | NON / STILL NOT SET | NON / STILL NOT SET | NON / STILL NOT SET |

FIG. 8

| APP ID | INFORMATION PERTAINING TO PROGRAM COMPONENTS | BASIC COMPONENT | COMPONENTS | | | | | | | | | | ICON DATA (IMAGE DATA) STORING LOCATION |
|---|---|---|---|---|---|---|---|---|---|---|---|---|---|
| | | | a | b | c | d | e | f | g | h | i | j | |
| xxxxx-000000 | buhin/01234/00 | A | ○ | ○ | ○ | ○ | ○ | × | × | × | × | × | storage_a/00A6/B82C |
| xxxxx-000001 | buhin/01234/01 | B | ○ | ○ | ○ | ○ | ○ | ○ | × | × | × | × | storage_a/00A6/B83C |
| xxxxx-000002 | buhin/01234/02 | B | ○ | ○ | ○ | ○ | ○ | ○ | × | × | × | × | storage_a/00A6/B84C |
| xxxxx-000006 | buhin/01234/03 | D | ○ | ○ | ○ | × | × | × | × | × | × | × | storage_a/00A6/B85C |
| xxxxx-000007 | buhin/01234/04 | A | ○ | ○ | ○ | ○ | ○ | ○ | × | ○ | ○ | ○ | storage_a/00A6/B86C |
| xxxxx-000008 | buhin/01234/05 | F | ○ | × | ○ | × | ○ | ○ | ○ | ○ | ○ | ○ | storage_a/00A6/B87C |
| xxxxx-000009 | buhin/01234/06 | G | ○ | × | × | × | ○ | ○ | ○ | ○ | ○ | ○ | storage_a/00A6/B88C |
| xxxxx-000011 | buhin/01234/07 | C | ○ | ○ | ○ | ○ | × | ○ | × | × | × | × | storage_a/00A6/B89C |
| xxxxx-000012 | buhin/01234/08 | D | ○ | ○ | ○ | × | × | ○ | ○ | × | ○ | ○ | storage_a/00A6/B90C |
| xxxxx-000014 | buhin/01234/09 | C | ○ | ○ | ○ | × | × | ○ | ○ | ○ | ○ | ○ | storage_a/00A6/B91C |
| xxxxx-000015 | buhin/01234/10 | E | ○ | ○ | ○ | ○ | × | × | × | ○ | ○ | ○ | storage_a/00A6/B92C |
| xxxxx-000016 | buhin/01234/11 | G | × | ○ | ○ | × | × | ○ | ○ | ○ | ○ | × | storage_a/00A6/B93C |
| xxxxx-000017 | buhin/01234/12 | F | ○ | ○ | ○ | ○ | ○ | × | × | ○ | ○ | × | storage_a/00A6/B94C |
| xxxxx-000018 | buhin/01234/13 | E | × | ○ | ○ | × | ○ | ○ | ○ | ○ | ○ | × | storage_a/00A6/B95C |
| xxxxx-000019 | buhin/01234/14 | A | × | ○ | ○ | ○ | ○ | × | × | ○ | ○ | × | storage_b/0041/0119 |
| xxxxx-000020 | buhin/01234/15 | F | ○ | ○ | ○ | ○ | ○ | ○ | ○ | ○ | ○ | ○ | storage_b/00A6/011A |
| xxxxx-000021 | buhin/01234/16 | E | ○ | ○ | ○ | ○ | ○ | × | ○ | ○ | ○ | × | storage_b/00A6/011B |
| xxxxx-000022 | buhin/01234/17 | B | ○ | ○ | ○ | ○ | ○ | ○ | ○ | × | ○ | × | storage_b/00A6/011C |
| xxxxx-000024 | buhin/01234/19 | C | ○ | ○ | ○ | ○ | ○ | ○ | ○ | × | ○ | × | storage_b/00A6/011D |
| xxxxx-000025 | buhin/01234/20 | D | ○ | ○ | ○ | ○ | ○ | ○ | ○ | × | ○ | ○ | storage_b/00A6/011E | www.ms.com/video/video-A.mp4

ENCODING

QR CODE, ETC.

| www.ms.com/video/video-A.mp4 | buhin-I |

DATA STORING

DATA BASE

QR CODE, ETC.

DATA BASE www.ms.com/video/video-A.mp4

DATA STORING

DATA FILE
www.ms.com/XML/videodata.xml

X654321

ENCODING

QR CODE, ETC.

TO MONTH N: www.ms.com/video/video-A.mp4
FROM MONTH N+1: www.ms.com/video/video-B.mp4

DATA REWRITING

DATA FILE
www.ms.com/XML/videodata.xml

QR CODE, ETC.

DETERMINATION DATABASE

FIG. 32

| APP ID | TITLE | ADDITIONAL INFORMATION (ag) (AGES) | ADDITIONAL INFORMATION (fm) (GENDER) | ADDITIONAL INFORMATION (aa) (LOCATION INFORMATION) | ADDITIONAL INFORMATION (yy/mm/dd) (YEAR MONTH DAY) | ADDITIONAL INFORMATION (tttt) (TIME) | ADDITIONAL INFORMATION (ll) (LANGUAGE SETTING) |
|---|---|---|---|---|---|---|---|
| xxxxx-000000 | RESTAURANT A | — | — | IN CHUO WARD | — | — | — |
| xxxxx-000226 | RESTAURANT D | 16~30 | m | — | — | — | — |
| xxxxx-001936 | RESTAURANT E-1 | — | m | — | — | ~11 | — |
| xxxxx-000055 | RESTAURANT E-2 | — | — | — | — | 15~ | — |
| xxxxx-001848 | BOOKSTORE C | — | — | IN SAITAMA CITY- | — | — | — |
| xxxxx-000239 | BOOKSTORE D | — | — | IN TOKYO- | — | — | — |
| xxxxx-000099 | BOOKSTORE E | — | — | IN CHIBA CITY | — | — | JAPANESE /ENGLISH |
| xxxxx-000794 | CAR DEALER H | — | — | IN KANAGAWA PREFECTURE | — | — | JAPANESE |
| xxxxx-000630 | CAR DEALER I | — | — | IN YOKOHAMA CITY | — | — | JAPANESE |
| xxxxx-001467 | CAR DEALER J | 18~ | — | IN SETAGAYA WARD- | — | — | JAPANESE /ENGLISH |
| xxxxx-000538 | JEWELRY SHOP K | — | f | — | 2011/12/10 ~ 2011/12/24 | — | JAPANESE /KOREAN |
| xxxxx-001121 | DRESS SHOP L | — | — | — | — | — | — |
| xxxxx-001121 | DRESS SHOP P | 50~ | m | — | — | — | — |
| xxxxx-000082 | SOBA-MAKING SCHOOL M | — | m | — | — | — | JAPANESE |
| xxxxx-001984 | RESTAURANT F | — | f | MINATO WARD /SHIBUYA WARD | — | — | — |
| xxxxx-002100 | RESTAURANT G | 30~ | f | TOKYO 23 WARDS | — | — | — |

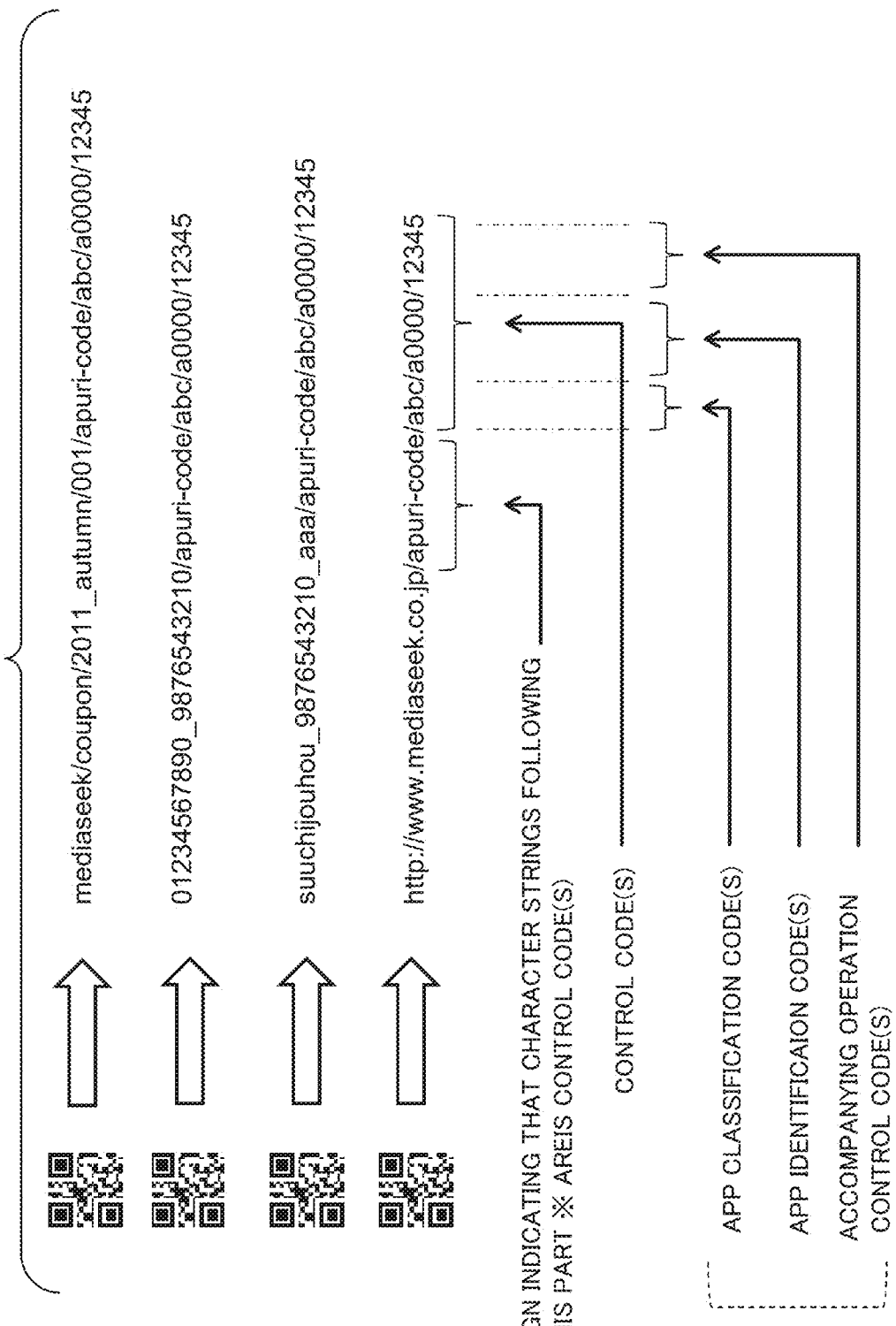

FIG. 34

| TERMINAL ID | CHARACTER STRING | ADDITIONAL INFORMATION | CONTROL CODE(S) |
|---|---|---|---|
| xxxxx-000000 | xxxxx/yyyyy/012345/ecc... | ag/fm/aa/yy/mm/dd/tttt/ll/na/xx/yy/zz | xxx/x0000/00000 |
| xxxxx-000001 | http://www.mediaseek.co.jp/xxxxx/yyyyy/zzzzz/012345 | 18/f/01/10/05/01/1256/ja/ja/xx/yy/zz | aaa/a0000/12345 |
| xxxxx-000002 | http://www.mediaseek.co.jp/aaaa/bbbb/cccc/8765 | 17/m/01/10/06/15/1256/ja/ja/xx/yy/zz | aaa/b0008/00089 |
| xxxxx-000006 | 0123456789_9876543210_0000/5555/2222 | 34/f/01/11/08/09/1256/ja/ja/xx/yy/zz | abb/a0001/11511 |
| xxxxx-000007 | 0897867564534231_27384951_000/111/3333 | 41/m/01/11/10/01/1256/ja/ja/xx/yy/zz | abc/a0010/33333 |
| xxxxx-000008 | suuchijouhou_9876543210_abcdefg/xyz | 20/f/02/11/11/02/1256/us/en/xx/yy/zz | aaa/c0101/12349 |
| xxxxx-000009 | jidakedata_0123456789_zzzdefg/abc | na/m/01/11/12/21/1256/us/en/xx/yy/zz | abb/b0012/21000 |
| xxxxx-000011 | mediaseek/coupon/2011_autum/mc20110920/a/001 | 64/f/01/12/01/08/1256/ja/ja/xx/yy/zz | abc/a0005/12345 |
| xxxxx-000012 | mediaseek/coupon/2011_autum/mc20111006/a/002 | 25/f/03/12/01/31/1256/ja/ja/xx/yy/zz | aaa/a0005/12345 |
| xxxxx-000014 | mediaseek/coupon/2011_Winter/mc20111201/a/001 | 21/na/01/12/02/14/1256/ja/ja/xx/yy/zz | abc/d0000/12345 |

FIG. 35

| TERMINAL ID | APP ID | TITLE | Ver. # | GENERATION DATE (yyyy/mm/dd) |
|---|---|---|---|---|
| AAAA-000000 | xxxx-0000000 | RESTAURANT A-1 | 1.02 | 2011/10/2 |
| AAAA-000001 | xxxx-0000014 | CAR DEALER B-1 | 1.10 | 2011/11/15 |
| AAAA-000001 | xxxx-0000018 | INDIVIDUAL (PARENT APP ID = xxx0000) | 1.33 | 2011/10/3 |
| AAAA-000001 | xxxx-0000019 | INDIVIDUAL (PARENT APP ID = xxx0001) | 1.27 | 2011/10/4 |
| AAAA-000001 | xxxx-0000021 | INDIVIDUAL (PARENT APP ID = xxx0003) | 1.39 | 2011/10/6 |
| AAAA-000001 | xxxx-0000007 | BOOK STORE B-2 | 1.23 | 2011/10/2 |
| AAAA-000002 | xxxx-0000018 | INDIVIDUAL (PARENT APP ID = xxx0000) | 1.33 | 2011/11/9 |
| AAAA-000002 | xxxx-0000020 | INDIVIDUAL (PARENT APP ID = xxx0002) | 1.16 | 2011/12/24 |
| AAAA-000002 | xxxx-0000023 | RESTAURANT A-2 | 1.07 | 2011/12/18 |
| AAAA-000002 | xxxx-0000024 | RESTAURANT B-1 | 1.21 | 2011/12/18 |
| AAAA-000002 | xxxx-0000025 | RESTAURANT C-1 | 1.11 | 2011/12/17 |
| AAAA-000003 | xxxx-0000011 | CAR DEALER A-1 | 1.21 | 2011/10/29 |
| AAAA-000003 | xxxx-0000014 | CAR DEALER B-1 | 1.10 | 2011/11/2 |
| AAAA-000003 | xxxx-0000018 | INDIVIDUAL (PARENT APP ID = xxx0000) | 1.33 | 2011/10/21 |
| AAAA-000003 | xxxx-0000019 | INDIVIDUAL (PARENT APP ID = xxx0001) | 1.27 | 2011/10/21 |
| AAAA-000003 | xxxx-0000020 | INDIVIDUAL (PARENT APP ID = xxx0002) | 1.16 | 2011/12/1 |
| AAAA-000003 | xxxx-0000021 | INDIVIDUAL (PARENT APP ID = xxx0003) | 1.39 | 2011/10/9 |
| AAAA-000003 | xxxx-0000022 | INDIVIDUAL (PARENT APP ID = xxx0004) | 1.08 | 2011/10/8 |
| AAAA-000003 | xxxx-0000002 | BOOK STORE A-3 | 1.10 | 2011/12/2 |
| AAAA-000003 | xxxx-0000007 | BOOK STORE B-2 | 1.23 | 2011/12/11 |
| AAAA-000003 | xxxx-0000009 | BOOK STORE C-1 | 1.04 | 2011/12/28 |
| AAAA-000003 | xxxx-0000025 | RESTAURANT C-1 | 1.11 | 2011/10/30 |

FIG. 36

| TERMINAL ID | APP ID | TITLE | Ver. # | ACCUMULATED TOTAL ACTIVATION NUMBER OF TIMES | ACCUMULATED TOTAL ACTIVATION TIME (h:mm:ss) | EVENT ARGUMENT α | EVENT ARGUMENT β |
|---|---|---|---|---|---|---|---|
| AAAA-000000 | xxxxx-0000000 | RESTAURANT A-1 | 1.02 | 11 | 0:11:23 | 0 | NON / STILL NOT SET |
| AAAA-000001 | xxxxx-0000014 | CAR DEALER B-1 | 1.10 | 6 | 0:00:48 | 2 | 0 |
| AAAA-000001 | xxxxx-0000018 | INDIVIDUAL (PARENT APP ID = xxx0000) | 1.33 | 156 | 8:31:12 | NON / STILL NOT SET | NON / STILL NOT SET |
| AAAA-000001 | xxxxx-0000019 | INDIVIDUAL (PARENT APP ID = xxx0001) | 1.27 | 88 | 4:48:58 | NON / STILL NOT SET | NON / STILL NOT SET |
| AAAA-000001 | xxxxx-0000021 | INDIVIDUAL (PARENT APP ID = xxx0003) | 1.39 | 12 | 1:02:51 | NON / STILL NOT SET | NON / STILL NOT SET |
| AAAA-000001 | xxxxx-0000007 | BOOK STORE B-2 | 1.23 | 2 | 0:00:39 | 1 | NON / STILL NOT SET |
| AAAA-000002 | xxxxx-0000018 | INDIVIDUAL (PARENT APP ID = xxx0000) | 1.33 | 98 | 5:28:21 | NON / STILL NOT SET | NON / STILL NOT SET |
| AAAA-000002 | xxxxx-0000020 | INDIVIDUAL (PARENT APP ID = xxx0002) | 1.16 | 225 | 9:52:11 | NON / STILL NOT SET | NON / STILL NOT SET |
| AAAA-000002 | xxxxx-0000023 | RESTAURANT A-2 | 1.07 | 1 | 0:00:10 | 3 | NON / STILL NOT SET |
| AAAA-000002 | xxxxx-0000024 | RESTAURANT B-1 | 1.21 | 0 | 0:00:00 | 2 | NON / STILL NOT SET |
| AAAA-000002 | xxxxx-0000025 | RESTAURANT C-1 | 1.11 | 3 | 0:05:27 | NON / STILL NOT SET | NON / STILL NOT SET |
| AAAA-000003 | xxxxx-0000011 | CAR DEALER A-1 | 1.21 | 4 | 0:21:24 | 0 | NON / STILL NOT SET |
| AAAA-000003 | xxxxx-0000014 | CAR DEALER B-1 | 1.10 | 2 | 0:08:46 | 1 | NON / STILL NOT SET |
| AAAA-000003 | xxxxx-0000018 | INDIVIDUAL (PARENT APP ID = xxx0000) | 1.33 | 12 | 0:10:28 | NON / STILL NOT SET | NON / STILL NOT SET |
| AAAA-000003 | xxxxx-0000019 | INDIVIDUAL (PARENT APP ID = xxx0001) | 1.27 | 56 | 0:59:31 | NON / STILL NOT SET | NON / STILL NOT SET |
| AAAA-000003 | xxxxx-0000020 | INDIVIDUAL (PARENT APP ID = xxx0002) | 1.16 | 113 | 2:48:38 | NON / STILL NOT SET | NON / STILL NOT SET |
| AAAA-000003 | xxxxx-0000021 | INDIVIDUAL (PARENT APP ID = xxx0003) | 1.39 | 27 | 0:08:12 | NON / STILL NOT SET | NON / STILL NOT SET |
| AAAA-000003 | xxxxx-0000022 | INDIVIDUAL (PARENT APP ID = xxx0004) | 1.08 | 70 | 3:04:00 | NON / STILL NOT SET | NON / STILL NOT SET |
| AAAA-000003 | xxxxx-0000002 | BOOK STORE A-3 | 1.10 | 25 | 1:41:45 | 4 | NON / STILL NOT SET |
| AAAA-000003 | xxxxx-0000007 | BOOK STORE B-2 | 1.23 | 18 | 0:58:07 | 1 | NON / STILL NOT SET |
| AAAA-000003 | xxxxx-0000009 | BOOK STORE C-1 | 1.04 | 7 | 0:36:17 | NON / STILL NOT SET | NON / STILL NOT SET |
| AAAA-000003 | xxxxx-0000025 | RESTAURANT C-1 | 1.11 | 0 | 0:00:00 | NON / STILL NOT SET | NON / STILL NOT SET |

SYSTEM FOR GENERATING APPLICATION SOFTWARE INSTALLED ON A MOBILE TERMINAL

CROSS-REFERENCE TO RELATED APPLICATION

This application is a U.S. National Phase filing under 35 U.S.C. §371 of PCT/JP2011/075394, which was filed on Nov. 4, 2011, which is herein incorporated by reference in its entirety.

BACKGROUND OF THE INVENTION

The present invention pertains to a system for generating an application software (hereinafter it is abbreviated to "app") installed on a mobile terminal such as a multifunction mobile telephone (so-called a "smartphone") with PDA functionality.

In general, mobile terminals display information associated with apps installed on the mobile terminal on the display screen of the mobile terminal, and apps are downloaded to the mobile terminal based on information displayed on the display.

In one conventional technology, for example, when a user acquires an app with desired functionality, the mobile terminal reads a two-dimensional (2D) code such as a QR code (registered trademark), displays character information pre-stored in the scanned 2D code on the mobile terminal display, accesses an appropriate URL using the character information displayed on the display, and selects and downloads the required app from the accessed URL.

In another conventional technology, when a user acquires an app with desired functionality, a URL is pre-encoded in a 2D code such as a QR code (registered trademark); the URL is automatically accessed by scanning 2D code with the mobile terminal, and required apps are selected and downloaded from the accessed URL.

PRIOR ART REFERENCES

Patent Documents

Patent Document 1: JP-A-2008-310637
Patent Document 2: JP-A-2011-86198
Patent Document 3: JP-A-2010-1178167
Patent Document 4: JP-A-2009-98741
Patent Document 5: JP-A-2009-282896
Patent Document 6: JP-A-2009-055166

SUMMARY OF THE INVENTION

Problems to be Solved by the Invention

The problem arises, however, that in the conventional technology described above, the character information pre-stored in the 2D code is only displayed on the display of the mobile terminal, and to acquire an app with desired functions the user is required to do a series of active operations, such as accessing the appropriate URL using displayed character information and selecting and downloading necessary apps. Also, the result of the operations is affected by the skill and experience of the user of the mobile terminal, leading to problems such as the user being unable to smoothly acquire apps with desired functions, or to acquire them at all, due to errors in operating the mobile terminal or lack of knowledge.

An additional problem with the above-described conventional art is that even if URLs are encoded in 2D codes, the URLs are those URLs as of the time they were encoded, and if the URL changes after the 2D code is distributed, the distributed 2D code is rendered useless. For example, changes in 2D-encoded contact information such as telephone numbers or address after distribution of the 2D code result in problems such as wrong numbers or undeliverable mail, etc.

Also, using the conventional technology described above, a user may not be able to make effective use of character information acquired from the 2D code, depending on the content of the character information encoded in the 2D code. For example, if a URL showing a retailer's website is encoded in 2D code, a user can easily access the website by image-capturing the 2D code, and obtain information or download apps, etc. by accessing the website, but if no URL happens to be encoded in the 2D code, and only the retailer's name and phone number are encoded, users get only the retailer's name and phone number by image-capturing and decoding the 2D code, and have been unable to obtain other information, this poses the problem of lack of access to further information.

The same kinds of problems were of course present using barcodes such as the JAN code.

In the light of the above problems in the conventional art, it is an object of the present invention to provide a system which is capable of displaying character information acquired from bar codes or 2D codes on a mobile terminal display, while analyzing and cross-checking the character information, using the server-side to supplement information pre-stored in the bar code or 2D code, and other information, so that an app desired by a user scanning a bar code or 2D code with a mobile terminal can be generated automatically, and icon associated with the generated app shown on the mobile terminal display.

Means for Solving the Problems

The above object of the present invention is achieved by an application generation system for generating a child application software program which is different from a parent application software program, the system comprising:
 (i) a mobile terminal including:
 computation means for performing a predetermined computation processing;
 image-capturing means for image-capturing a dimensional code consisting of one dimensional code or a multi dimensional code of two or more dimension;
 decoding means for decoding the dimensional code which is image-captured by the image-capturing means so as to extract character information corresponding to the dimensional code;
 display means for displaying a predetermined information; and
 a first communication means for communicating the character information;
 (ii) a server including:
 a second communication means for communicating with the first communication means;
 a determination database for storing determination rules;
 a program component database for storing program components; and
 analysis means for analyzing the character information received by the second communication means, and for determining a result of the analysis based on the determination rules stored in the determination database, so as to determine information related to an attribute and a configuration of a child application software program to be generated as well as program components constituting the child application software program,
wherein the mobile terminal is configured to receive information related to the attribute and the configuration transmitted from the second communication means of the server as well as program components constituting the child application software program, by the first communication means, and to generate a child application software program having a desirable function, based on the information related to the attribute and the configuration of the child application software program as well as the program components constituting the child application software program.

In the application generation system according to the present invention, the mobile terminal is preferably configured to display an icon symbolizing the child application software program on the display means in the mobile terminal, when the child application software program is generated.

In the application generation system according to the present invention an image data of an icon symbolizing an application software to be generated is preferably included, in program components constituting the child application software program.

In the application generation system according to the present invention, setting one or more information as additional information among the followings:
(1) a user attribute;
(2) a position information of the mobile terminal;
(3) a time when the dimensional code is read by operating the image-capturing means;
(4) a time when the mobile terminal transmits the character information to the server;
(5) a language used by the user;
(6) a nationality of the user;
(7) input information of the user;
(8) a past utilization history of the user;
(9) a type (types) of other icon (icons) to be displayed on display means in the mobile terminal;
(10) a number of other icon (icons) to be displayed on the display means in the mobile terminal;
(11) information of whether a specific icon is (icons are) displayed on the display means in the mobile terminal or not;
(12) information of whether there exists other mobile terminal in which the parent application software program is installed within a certain geographical range with respect to the mobile terminal or not, at a time when the mobile terminal transmits the character information to the server;
(13) an IP address of the mobile terminal;
(14) a standard time setting of the mobile terminal;
(15) a type of the mobile terminal; and
(16) a type and a version of OS (Operating System) running in the mobile terminal,
wherein the analysis means in the server is preferably configured to acquire the determination rules, by searching the determination database, in combination of the additional information and the character information, in order to determine a child application software program to be generated, and program components constituting the child application software program.

In the application generation system according to the present invention, wherein a specific control code is preferably pre-encoded in the dimensional code,
wherein the mobile terminal acquires a character information in which the control code is included, when acquiring a character information from the dimensional code, and
wherein the server is configured to determine the attribute, the configuration of the application software to be generated, and program components constituting the application software, by setting the control code as a key information, at the time of analyzing the character information by the analysis means and the determination database.

In the application generation system according to the present invention, wherein the mobile terminal preferably further comprises video analysis means, and
the mobile terminal is configured to extract a character information, from a motion picture or a still picture image-captured by the image-capturing means using the video analysis means, instead of extracting the character information from the dimensional code using the image-capturing means and the decoding means.

In the application generation system according to the present invention, wherein the mobile terminal preferably further comprises recording means and voice analyzing means, and
the mobile terminal is configured to extract a character information, from a voice stored by the recording means using the voice analyzing means, instead of extracting the character information from the dimensional code using the image-capturing means and the decoding means.

In the application generation system according to the present invention, wherein the mobile terminal preferably further comprises recording means, and wherein the server further comprises video analysis means and voice analyzing means,
the mobile terminal is configured to extract a character information, from a motion picture or a still picture image-captured by the mobile terminal, or from a voice stored by the mobile terminal, using the video analysis means or voice analyzing means.

In the application generation system according to the present invention, wherein the server preferably further comprises:
a generation unit for generating a child application software program; and
a child application software program storage database for storing the child application software program generated,
wherein the child application software program is generated in the generation unit so as to store in the child application software program storage database, using information related to an attribute and a configuration of the child application software program determined as well as program components constituting the child application software program,
wherein an icon information of the child application software program generated and an address information indicating a location at where the child application software program generated is stored on the child application software program storage database is transmitted to the mobile terminal, instead of transmitting information related to as attribute and a configuration of the child application software program determined as well as program components constituting the child application software program determined, and
wherein the mobile terminal is configured to display only the icon of the child application software program on the display means in the mobile terminal, based on the icon information of the child application software program, as well as to access to the child application software program storage database, by the communication means, when a user touches an icon of the child application software program displayed, and to download and activate the child application software program based on the address information.

In the application generation system according to the present invention, wherein the server preferably further comprises a function of notifying only information respectively related to the attribute and configuration as well as the program components to the mobile terminal, after having defined an attribute and a configuration of the child application software program to be generated as well as program components constituting the child application software program,
- wherein the mobile terminal further comprises program component storage means for storing program components which are required for the child application software program generation,
- wherein the mobile terminal is configured to generate a child application software program using program components stored in the program component storage means, based on the notification from the server.

In the application generation system according to the present invention, wherein the server preferably further comprises a function of notifying only information respectively related to the attribute and configuration as well as the program components to the mobile terminal, after having defined an attribute and a configuration of the child application software program to be generated as well as program components constituting the child application software program,
- wherein the mobile terminal further comprises storage means for pre-storing a model of a child application software program having all functions which (such model) is to be used as matrix of the child application software program generation,
- wherein the mobile terminal is configured to turn on only the necessary function(s), among all functions of which the model has, based on the notification from the server, as well as to turn off other functions, so as to display an icon image received by the notification in the display means.

In the application generation system according to the present invention, wherein the server preferably further comprises, instead of the determination database, an application software program listing database into which all child application software programs which are possible to be generated, and information respectively related to the attribute and configuration of child application software programs as well as program components constituting child application software program are pre-stored,
- wherein the server is configured to search the application software program listing database, based on the combination of the additional information and the character information, and if there would exist an applicable child application software program, then to acquire information respectively related to the attribute and configuration which is required for generating the applicable child application software program as well as program components from the application software program listing database.

In the application generation system according to the present invention, wherein the server preferably further comprises a non-applicable information storing database,
- wherein the server is configured to search an applicable child application software program among child application software programs stored in the application software program listing database using the analysis result of the character information and the additional information, and if there would exist no applicable child application software program, then to notify an effect to the mobile terminal, as well as to store the character information and the addition information on which the application generation cannot be carried out in the non-applicable information storing database, and to repeat, at a constant frequency, searching again an applicable child application software program among child application software programs stored in the application software program listing database, in the combination of the character information and the additional information, and if an applicable child application software program would be searched, then to continue the child application software program generation, as well as to delete the character information related to the searched child application software program from the non-applicable information storing database.

In the application generation system according to the present invention, wherein the server is preferably configured to notify an effect to the mobile terminal, if there would exist no applicable child application software program, at the time of searching an applicable child application software program among child application software programs stored in the application software program listing database, in the combination of the character information and the additional information;
- the mobile terminal further comprises a non-applicable information storing database;
- the mobile terminal is configured, if the notification would be received from the server, to store the character information and the additional information on which the child application software program cannot be generated into the non-applicable information storing database, and to notify the contents of the non-applicable information storing database to the server whenever performing a communication with the server;
- the server receiving the notification is configured to repeat searching again an applicable child application software program among child application software programs stored in the application software program listing database, in combination of the character information and the additional information, and if the applicable child application software program would be searched, then continuing the child application software program generation as well as notifying the character information and the addition information related to the child application software program searched to the mobile terminal; and
- the mobile terminal is configured to delete the character information and the additional information related to the child application software program searched from the non-applicable information storing database.

In the application generation system according to the present invention, wherein the server is preferably configured to store, into the application software program listing database, the character information and the additional information on which the child application software program generation cannot be carried out, as the information of the new child application software program, which is the child application software program still having a defect and is not suitable for generation, if there would be no applicable child application software program, at the time of searching an applicable child application software program among child application software programs stored in the application software program listing database, in combination of the character information and the additional information.

In the application generation system according to the present invention, wherein the mobile terminal further comprises a version information storage database for storing ID and version information of a child application software program generated, wherein the mobile terminal is configured to store ID and version information of the child application software program generated into the version information storage database, at a time of generating the child application software program, and also to transmit the character information together with the content of the version information storage database, at a time of transmitting the character information to the server for separately generating other child application software program;

the server is configured to receive the content of the version information storage database transmitted from the mobile terminal, and to check whether there is a difference between the received version information of each child application software program stored in the version information storage database and version information of the child application software program having the same ID stored in the application software program listing database, the server, as a result of the check, if there would be a difference, then transmits altogether to the mobile terminal, information related to an attribute and a configuration of a child application software program of a new version on the application software program listing database as well as program components constituting the child application software program, at a time of transmitting information related to an attribute and a configuration of child application software program as well as program components for separately generating the other child application software program; and the mobile terminal, which has received information related to an attribute and a configuration of the child application software program of a new version as well as program components constituting the child application software program, is configured to generate a child application software program of a new version based on information related to an attribute and a configuration of the child application software program as well as program components constituting the child application software program, and to replace child application software program of a conventional version having the same ID by the child application software program of a new version.

In the application generation system according to the present invention, wherein the server preferably further comprises a version information storage database for storing an ID of a child application software program generated in every individual mobile terminal and version information of the child application software program, wherein the mobile terminal is configured to notify the ID of the child application software program generated and version information of the child application software program, at a time of generating the child application software program to the server;

wherein the server is configured to store the ID of child application software program received and version information of the child application software program into the version information storage database, if the notification would be received, to regularly check whether there is a difference between version information of each child application software program stored in the version information storage database and version information of the child application software program having the same ID stored in the application software program listing database, the, server, as a result of the check, if there would be a difference, then transmits altogether to the mobile terminal, information related to an attribute and a configuration of a child application software program of a new version on the application software program listing database as well as program components constituting the child application software program, at a time of transmitting information related to an attribute and a configuration of child application software program as well as program components for separately generating the other child application software program;

the mobile terminal, which has received information related to an attribute and a configuration of the child application software program of a new version as well as program components constituting the child application software program, is configured to generate a child application software program of a new version based on information related to an attribute and a configuration of the child application software program as well as program components constituting the child application software program, and to replace child application software program of a conventional version having the same ID by the child application software program of a new version.

In the application generation system according to the present invention, wherein the mobile terminal preferably further comprises a use history storage database for storing a history pertaining to an ID of a first child application software program generated and an activation, a use of the first child application software program;

the server is configured to refer to use history information including a total activation number of times, a total activation time and an event argument of the first child application software program used, by referring the use history storage database, at a time of the first child application software program being activated, and to validate whether or not the referred use history information satisfies the setting conditions related to use history information of an applicable first child application software program stored in the application software program listing database, as a result of the validation, if the setting conditions would be satisfied, then specifying an ID of a second child application software program to be generated when the setting conditions are satisfied, which is different from an ID of the first child application software program, an effect that the first child application software program is updated to the second child application software program, together with an ID of the first child application software program and an ID of the second child application software program is transmitted to the mobile terminal, Information related to an attribute and a configuration of the second child application software program as well as program components constituting the second child application software program is determined from the ID of the second child application software program, Information related to an attribute and a configuration of the second child application software program as well as program components constituting the second child application software program determined is transmitted to the mobile terminal, and the mobile terminal is configured to receive information related to an attribute and a configuration of the second child application software program as well as program components constituting the second child application software program from the server, and to newly generate a second child application software program in the mobile terminal using the computation means, based on the information related to an attribute and a configuration of the second child application software program as well as program components constituting the second child application software program received, and to replace the first child application software program by the second child application software program newly generated.

Advantage(s) of the Invention

Using above-described system for generating apps of the invention, all users can easily obtain and start up apps with desired functions so long as they can capture barcodes or 2D codes, etc.

BRIEF DESCRIPTION OF THE DRAWINGS

FIG. 6 A diagram showing app attributes (7 types) and basic program components determined according to each attribute, in an app generation system according to the present invention.

FIG. 7 A diagram showing an overview of the app listing database (211) in an app generation system according to the present invention.

FIG. 8 A diagram showing the program component database (206) in an app generation system according to the present invention.

FIG. 32 A diagram showing an overview of the additional information condition database (213) in an app generation system according to the present invention.

FIG. 33 A diagram showing an embodiment of control codes embedded in a QR code (registered trademark) in an app generation system according to the present invention.

FIG. 34 A diagram showing the non-applicable information storing database (212) in an app generation system according to the present invention.

FIG. 35 A diagram showing an overview of the version information storing database (113) in the app generation system of the invention.

FIG. 36 A diagram showing an overview of the use history storing database (114) in the app generation system of the invention.

DETAILED DESCRIPTION OF THE INVENTION

In the followings, preferred embodiments of the system for generating apps (hereinafter, it is abbreviated as "the system") according to the present invention will be explained, referring to the accompanied drawings.

The system according to the present invention is configured to generate apps, based on character information and additional information obtained by image-capturing and decoding a 2D code as one embodiment of a code targeted for decoding, however, the app to be generated may be an app having any type of function or feature.

However, in the embodiments explained below, seven (7) types of app are contemplated as shown in FIG. 6, according to the purpose and the characteristics thereof.

Figure 3:
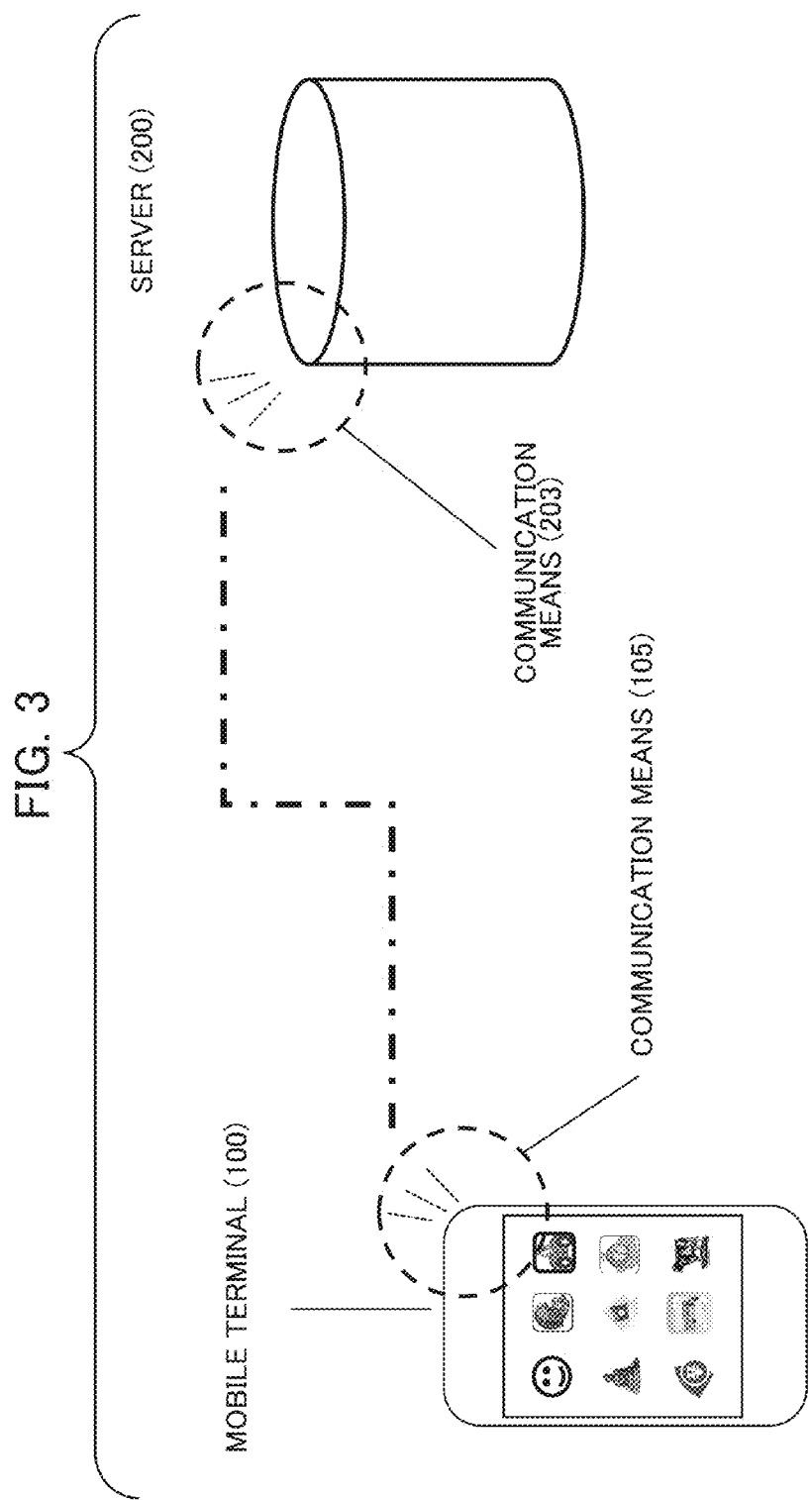
FIG. 3 An explanatory diagram showing the transmission and receiving of information through a network between a mobile terminal and a server in an app generation system according to the present invention.

FIG. 3 is a schematic diagram showing an embodiment of a system according to the present invention.

The system (1000) of the present embodiment comprises a mobile terminal (100) having a communication means (105), and a server (200) having a communication means (203), wherein the mobile terminal (100) and server (200) are configured to transmit and receive information and signals by the respective communication means (105) and (203), through the communication media.

First, the mobile terminal (100) will be explained.

Figure 1:
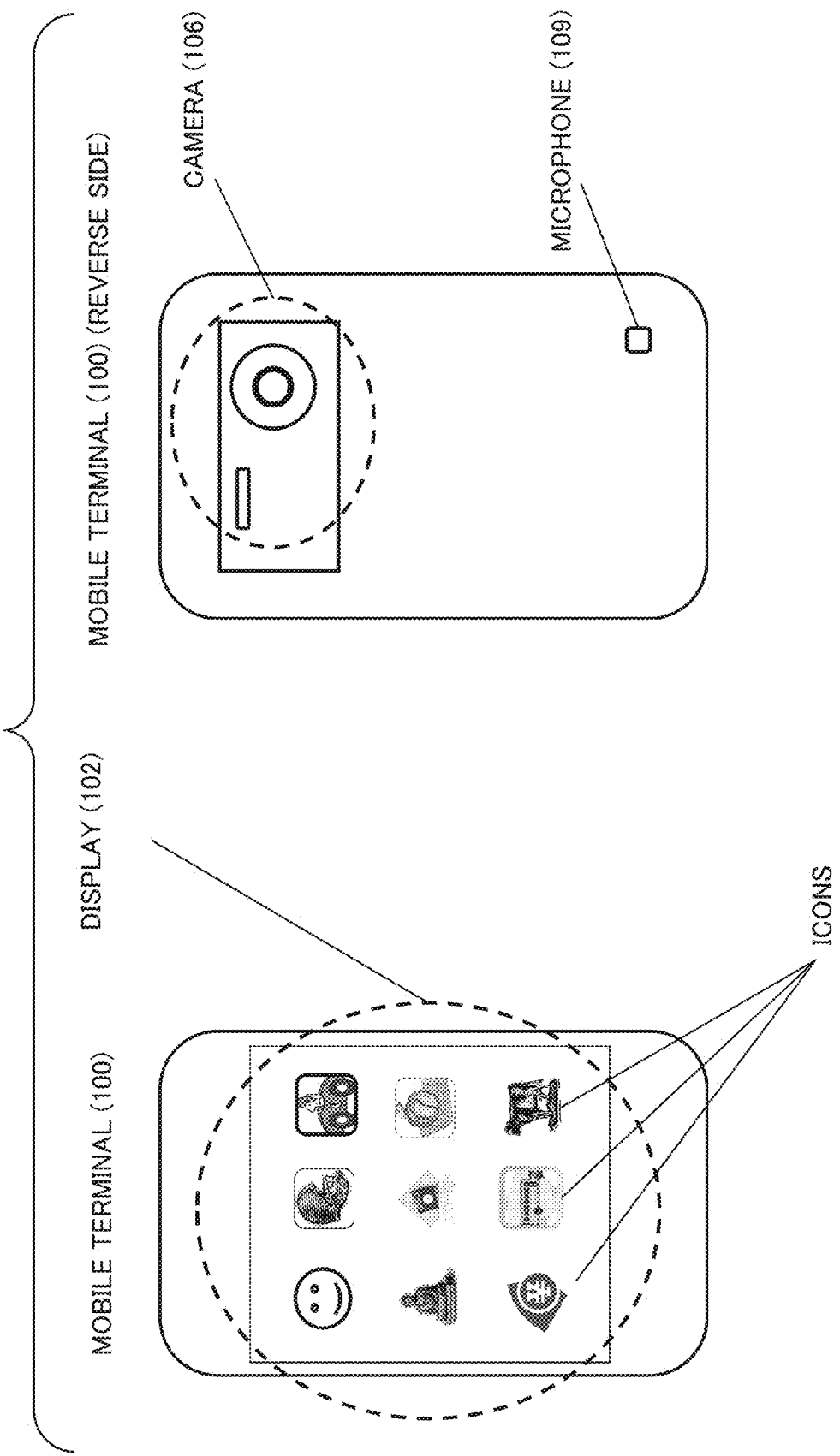
FIG. 1 A diagram showing all parts appearing on the exterior of a mobile terminal in an app generation system according to the present invention.
Figure 2:
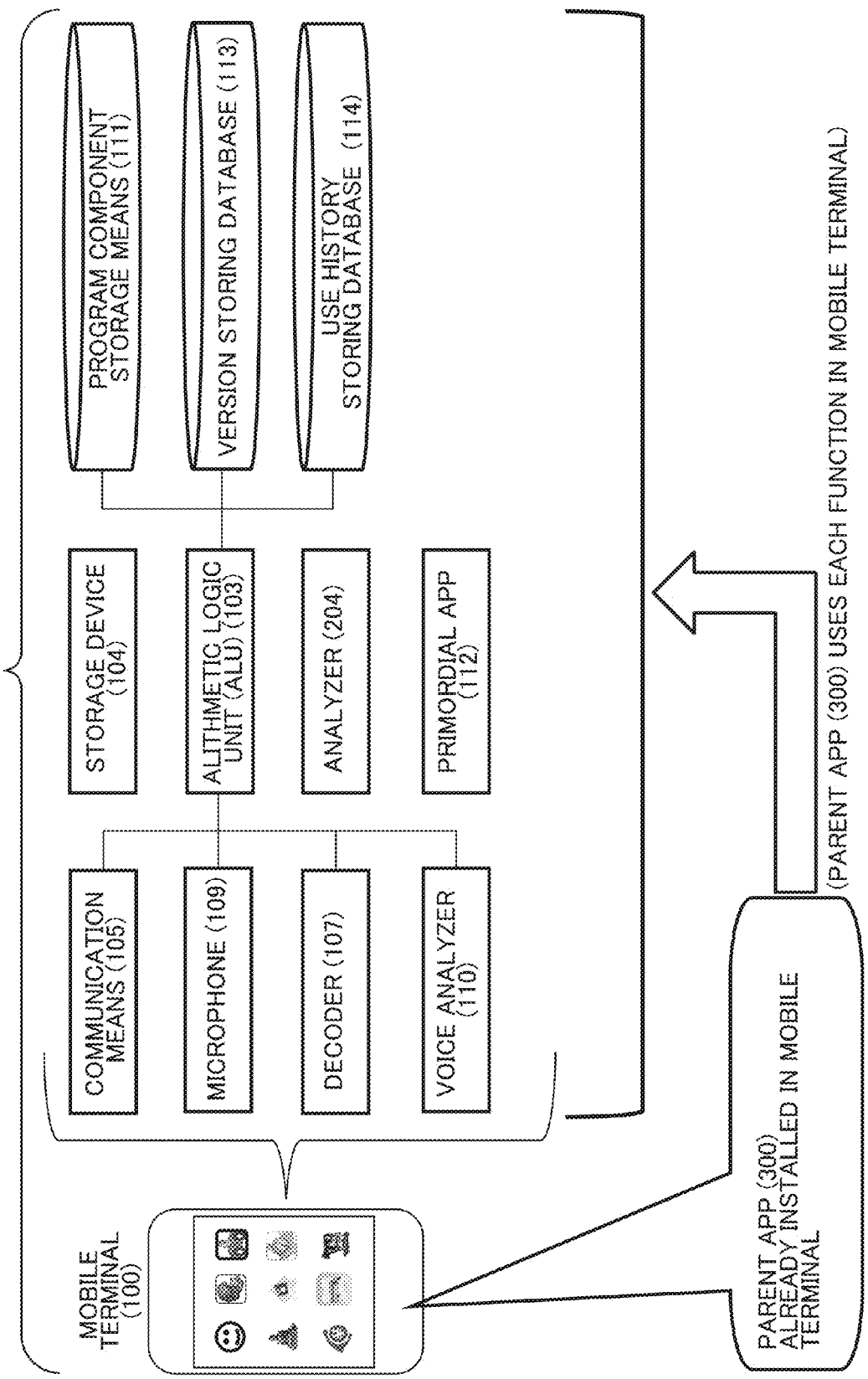
FIG. 2 A diagram showing that parent app is installed on the mobile terminal, and each of the built-in functional parts therein, in an app generation system according to the present invention.

FIGS. 1 and 2 are schematic diagrams showing a configuration embodiment of the mobile terminal (100).

As shown in FIG. 1, the mobile terminal (100) comprises a display (102), on one surface (a front surface) of surfaces thereof, which is display means for displaying various icons, and comprises a camera (106) on the other surface (a back surface) thereof, which is image-capturing means for capturing 2D code, and a microphone (mic), which is audio recording means.

Also, as shown in FIG. 2, the mobile terminal (100) has a parent app (300) preinstalled, and further comprises communication means (105), mic (109), which is audio recording means, a decoder (107), which is decoding means for decoding 2D codes and extracting information correlated with 2D codes, a voice analyzing device (110), which is voice analyzing means, a storage device (104), which is storage means; a computing device (103), which is computing means; an analysis device (204), a primordial app (112), program components storage means (111), a version information storing database (113), and a use history storing database (114).

A parent app (300) controls the operation of the aforementioned various types of devices and means in the mobile terminal (100) through the OS (operating system) operating on the mobile terminal (100). For example, using communication means (105), a parent app transmits to the server (200) information obtained as a result of an inquiry to the mobile terminal (100) and receives information sent out from the server (200). The parent app also transmits, to the analysis device (204) via the computing device (103), the voice stored by recording means (109), the character information obtained by decoding the 2D codes using the decoder (107), and the character information obtained by the analysis of voice by the voice analyzing device (110), and receives the analysis results through the computing device (103), and transmits them to the server (200) using communication means (105).

Furthermore, the parent app (300) generates the apps using the program components stored in the program components storage means (111) based on primordial app (112), recording generated app versions in version information storing database (113) and recording usage history to the use history storing database (114) when a user uses the generated app.

In this embodiment, the mobile terminal (100) comprising a camera (106) has a function for image-capturing and decoding 2D codes such as QR codes (registered trademark) and the like, however, the decoding function may be provided in the parent app (300), as another embodiment.

The various standards such as the QR code (registered trademark), EAN128, and the like are known as 2D codes, and these 2D codes are utilized in various industrial fields. The 2D codes are image-captured with a camera, and the image-captured 2D code is decoded using the mobile terminal or the parent app, and information encoded in the 2D code is restored. Many types of information can be encoded in the 2D code according to the various standards described above, but character information is normally encoded as character information.

In this embodiment, the QR code (registered trademark), which is one embodiment of a 2D code, is image-captured by the camera (106) installed on the mobile terminal (100), and character information is acquired by decoding the image-captured QR code (registered trademark), but in another embodiment character information can also be acquired from the images or the voices other than 2D code.

Figure 5:
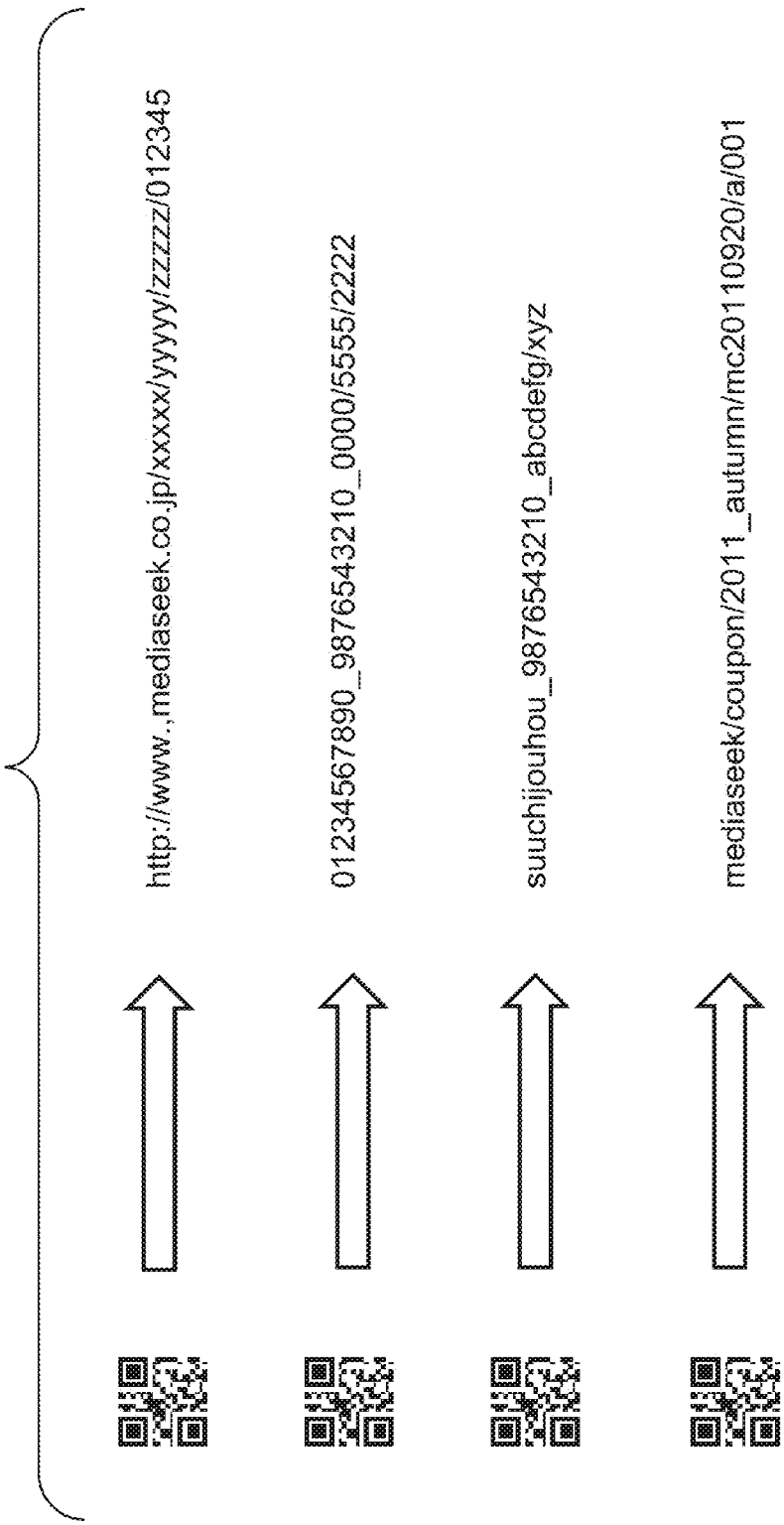
FIG. 5 A diagram showing an embodiment of character information encoded in a QR code (registered trademark) in an app generation system according to the present invention.

Character information stored in the QR code (registered trademark), i.e. character information acquired from the QR code (registered trademark), has a configuration that is shown as the embodiment in FIG. 5, but the configuration of character information is not limited thereto, and a variety of configurations is possible.

The Mobile terminal (100) also has a position information acquisition means (120) for acquiring position information related to the current position of the mobile terminal by GPS or the communication with the cell phone base stations, a present time acquisition means (121) for acquiring a present time by referring to a standard time acquired by an internal clock, communication, etc., a language selection means (122) having a function capable of combined management of multiple fonts corresponding to multiple languages, and of switching between display messages for display of messages in various languages, allowing users to select the language displayed on the mobile terminal, a profile storage means (123) for allowing users to input user attributes such as user name or gender, etc. used on the mobile terminal and storing same, and a terminal usage information storage means (124) for storing various information pertaining to the mobile terminal usage state and usage history, etc.

The parent app (300) uses the position information acquisition means (120), the present time acquisition means (121), the language selection means (122), the profile storage means (123), and the terminal usage information storage means (124) installed on the mobile terminal (100) to acquire the various information ("additional information" below) from the mobile terminal (100). Additional information is not limited to information acquired by the aforementioned various means, and the parent app (300) function can also be constituted to allow users to pre-input additional information and store to the storage device (104) in the mobile terminal (100).

Next the server (200) is explained.

Figure 4:
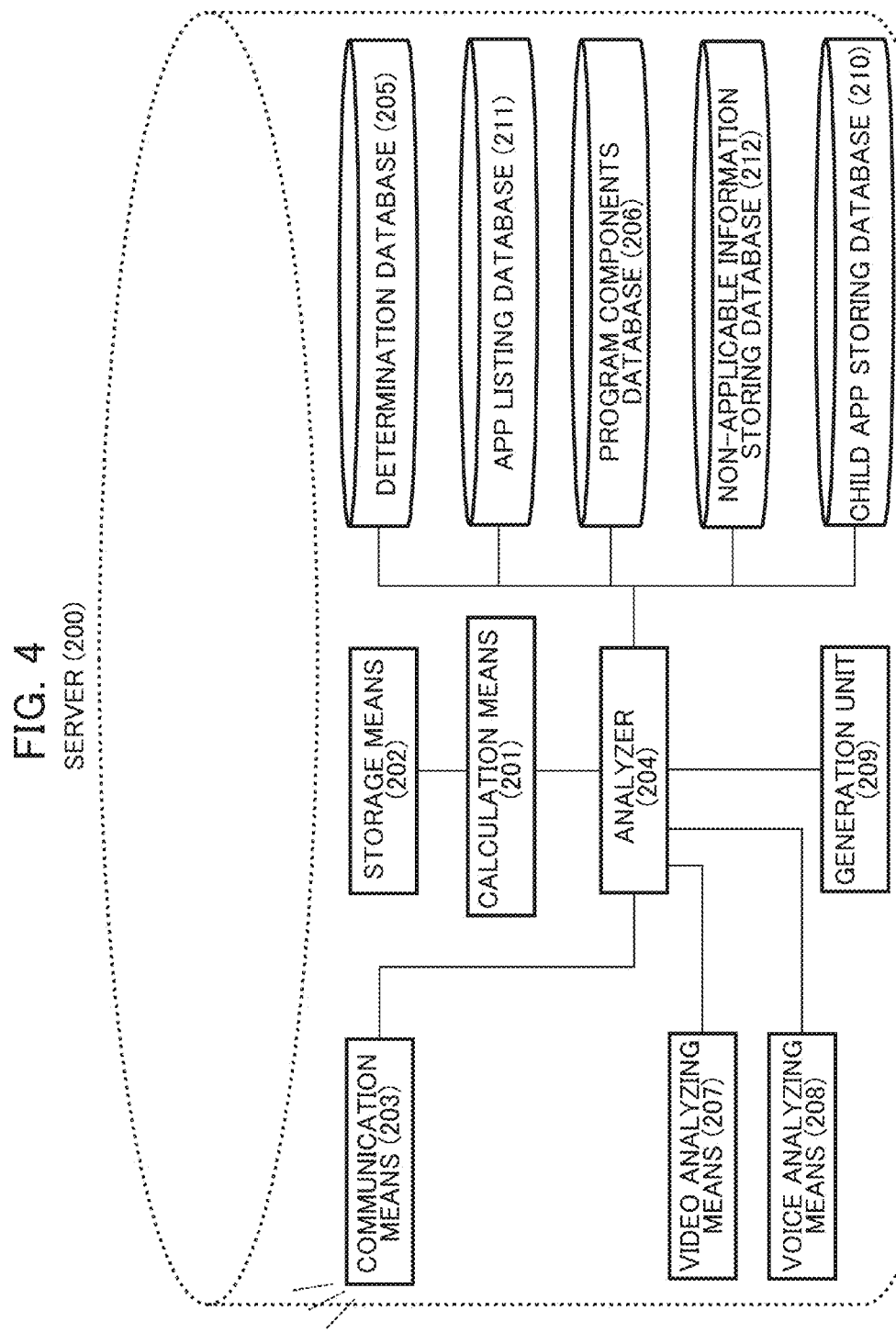
FIG. 4 A diagram showing each of the functional parts built into a server in an app generation system according to the present invention.

As shown in FIG. 4, the server (200) comprises a communication means (203) for transmitting and receiving information to and from the mobile terminal (100), an video analyzing means (207) for acquiring appropriate character information from the video or the still picture images by analyzing the video or the still picture images, a voice analyzing means (208) for acquiring appropriate character information from the voice by analyzing the voice, a storage means (202) for storing information related to image data, app attributes, configuration information, and mobile terminal (100) IDs, a computation means (201) for generating apps using the program components, an app listing database (211) for storing various types of information relating to an overview of the apps to be generated, and to each app, an analysis device (204) for analyzing and determining apps to be generated by comparing character information and additional information received from the mobile terminal (100) with the app listing database (211), a determination database (205) for storing video data location addresses and key character strings for uniquely identifying location addresses, a program component database (206) for storing program components used to generate apps, and a non-applicable information storing database (212) for temporarily storing character information and additional information on which an attempt to generate an app was made but the appropriate app could not be generated.

In general, an icon is a form of display broadly used in various types of personal computers (PC), mobile terminals, and various devices having display screens.

In the system (1000) of the present embodiment, the user can find the generated app without confusion using an icon, by displaying the icon, generated at the same time as the app is generated, and representing the app on the screen of the display (102) in the mobile terminal (100). When the mobile terminal (100) comprises a touch-panel display, the user can easily launch an app by touching an icon displayed on the display (102).

The app listing database (211) forming the server (200) is constituted as shown in FIGS. 7(*a*) through 7(*c*). Information pertaining to all types of apps to be subsequently generated are registered on the app listing database (211). Stated differently, the apps registered on the app listing database (211) are the entirety of apps to be generated.

Note that, in another embodiment, the apps can be constituted so that the content is dynamically determined from the analytical results of the character information and additional information, using the specific algorithm.

A maintenance is performed on the app listing database (211) from time to time, and the apps to be generated are added thereto. For example, when building a new enterprise app for a customer enterprise, enterprise app relating to the enterprise is additionally registered on the app listing database (211).

Moreover, as will be described below, data tracks are added to the app listing database (211) for character information for which no corresponding item could be found, and information relating to the app intended to correspond to the character information is replenished in future, with the ability to become data tracks representing the new apps.

FIG. 8 is one configuration example of a program component database (206) forming the server (200).

Then, the operation of the system (1000) according to the present embodiment will be explained, based on the concrete embodiment(s).

Next, the processes from image-capturing the QR code (registered trademark) to generating an app will be explained, according to the multiple concrete examples.

For example, it is assumed that a QR code (registered trademark) of a particular restaurant is printed on a newspaper insert ad. Then it is assumed that the character information "ra-men-AAA," for example, is encoded in the QR code (registered trademark). Note that it is normally the case that the QR code (registered trademark) is created by the restaurant, but the specific creator of the QR code (registered trademark) does not matter here.

When a user image-captures the QR code (registered trademark) with the camera (106) installed on the mobile terminal (100), the mobile terminal (100) decodes the image-captured QR code (registered trademark) using the decoder (107) and acquires the character information encoded in the QR code (registered trademark).

The mobile terminal (100) extracts the additional information as of the time of image-capturing the QR code (registered trademark) from the storage device (104). Here the additional information is already acquired by the parent app (300) and is stored in the storage device (104).

The mobile terminal (100) transmits the acquired character information and the extracted additional information from communication means (105) to the server (200) via a network.

The server (200) receives the character information and the additional information transmitted from the mobile terminal (100) via the network using communication means (203).

The server (200) compares the received character information and additional information with the app listing database (211) using the analysis device (204), and identifies the apps to be generated.

When an app to be generated is identified among the apps stored in the app listing database (211), the "attribute information," "configuration information," and "embedded information" for the app to be generated are respectively obtained.

"Attribute information" refers to a type classification according to the basic operational types of apps, as shown in FIG. 6, and in this embodiment, the attributes are divided into seven (7) types; Type A (with the central function of reproducing videos or voice for promotions or events, etc., or announcing events); Type B (with the central function of accessing URLs); Type C (with the central function of setting up communication means such as telephone, email, etc. and implementing mutual communication); type D (with the central function of serving as a membership card); Type E (with the central function of issuing coupons, including displaying coupon images, etc.); Type F (with the central function of allowing users to refer to restaurant names, open hours, etc.) and Type G (with the central function of allow users to refer to retailer names, store hours, etc.). For each type, program module provided with basic functions of each type of app are prepared; these are referred to as the "basic program components" for each type.

In addition to the basic program components, there are "individual program components", which are program modules for implementing individual functions by generating apps in combination with the basic programs. In the embodiment, as shown in FIG. 6, there are ten (10) individual program components: individual program component a (a program module comprising a function for displaying enterprise names, store names, etc.); individual program component b (a program module comprising a function for displaying telephone numbers and FAX numbers and originating calls to the telephone and FAX numbers); individual program component c (a program module comprising a function for displaying business hours); individual program component d (a program module comprising a function for displaying email addresses, creating emails to an email address, and transmitting and receiving emails); individual program component e (a program module comprising a function for displaying numbers, URLs, etc. for exchanging SMS messages, and of receiving and transmitting SMS messages); individual program component f (a program module comprising a function for displaying membership card information and managing information stored in membership cards, such as member numbers etc.); individual program component g (a program module with coupon functions such as displaying coupon images and the like); individual program component h (a program module comprising a function for playing voice); individual program component i (a program module comprising a function for playing videos); and individual program component j (a program module comprising a function for accessing and browsing URLs).

In addition to the above 10 program components, icon image data used when displaying each of the app icons on the mobile terminal (100) display is also present as a part (program component) forming the app.

"Constituent information" is information determining what combination of program modules will constitute the app to be generated, and is information about which type of basic program component to combine with which individual program component and icon image.

"Embedded information" is specific information embedded in each of above individual program components. Individual program component a is a program module comprising a function for displaying enterprise names and store names, etc., but when generating an app in which individual program component a is embedded, information pertaining to a specific enterprise name and/or store name must be acquired; after this is embedded in individual program component a, the app must be generated using individual program component a, in which the enterprise name and/or store name are embedded. Otherwise specific enterprise names or store names cannot be displayed on the generated app.

Here, as the result of comparing the character information "ra-men-AAA" and additional information with the app listing database (211), the attribute of the app to be generated is Type F (with the central function of allowing users to refer to restaurant names, open hours, etc.); the configuration is basic program component type F, individual program component a, individual program component b, and individual program component c, as well as a dedicated icon (icon image data identified by the app ID) and it is apparent that as embedded information, the store name "Rankings King! Triple A Ramen" should be embedded in individual program component a, the contact telephone number "03-0000-0000" in individual program component b, and the open hour information "Weekdays: 11:00-14:30, 18:00-23:00, last order 22:00; Saturdays, Sundays and holidays: 11:00-23:00, last order 22:00; Tuesdays closed" in individual program component c.

The server (200) which has obtained attribute information, configuration information, and embedded information first acquires each necessary program component (in this case 4 items: basic program component F, individual program component a, individual program component b, and individual program component c) from the app listing database (211).

Next, embedded information is acquired from app listing database (211), and each item of acquired embedded information (in this case the restaurant name, telephone number, and open hour information) is respectively embedded in a program component (in this case the restaurant name is embedded in individual program component a; the telephone number in individual program component b, and the open hour information in individual program component c). The app constituent materials, which are basic program component type F, individual program component a, individual program component b, individual program component c, and a dedicated icon (image data), are transmitted together with attribute information and configuration information from communication means (203) over a network to mobile terminal (100).

The mobile terminal (100) which has received a basic program component type F, individual program component a, individual program component b, individual program component c, and dedicated icon refers to information pertaining to attribute and configuration and combines program modules (basic program component type F, individual program component a, individual program component b, and individual program component c) to generate an app, displaying the dedicated icon on the mobile terminal (100) display (102).

When the mobile terminal (100) comprises a version information storing database (113), version information of child app for which generation is complete is stored in the version information storing database (113).

Then, the process for generating apps when the server (200) does not comprise an app listing database (211) will be explained.

It is assumed that the QR code (registered trademark) for a particular restaurant exists, and the QR code (registered trademark) is encoded with the character information "udon-bangaichi," for example.

The transmission operation of the mobile terminal (100) and the receiving operation of the server (200) are the same as the ones in the above-described embodiment, and they are therefore omitted.

Using the analysis device (204), the server (200) analyzes the received character information and additional information and determines that the app to be generated is the "bangaichi udon" chain restaurant. Note that it is also acceptable to determine what app to be generated by connecting to a search site on the network, performing the search using the received character information as a key, performing an analysis using the items written at a higher order and the items used with high frequency among the phrases used on URLs obtained through searching or on web pages displayed by the URL, as well as character information and additional information, and it is also acceptable to determine what app to generate by analyzing search results, and to use extracted or selected information or character strings, etc. to perform a second search, analyzing broadly acquired information on a network by repeating the search using the information or character strings analyzed and extracted from the search results as a key.

The server (200) connects to a search site on a network and searches to see whether there is acquirable data regarding "bangaichi udon" (restaurant name, telephone number, open hours, URL, etc.). Here, as the result of the search, the restaurant name and 4 different telephone numbers (assumed to be the telephone numbers of different branches of Bangaichi Udon) are obtained.

The server (200) can obtain information about the approximate position (city, ward, block, village, etc.) of each branches using 4 telephone numbers based on the exchange numbers of above 4 telephone numbers by comparing with public information on the network.

Also, the server (200) has acquired position information for mobile terminal (100) from the above additional information. It can therefore select the telephone number assumed to be in a location closest to the acquired position information for the mobile terminal (100).

It can be seen from the various information obtained above that, on the server (200), the attribute of the app to be generated is Type F (with the central function of allowing users to refer to restaurant names, open hours, etc.), the configuration is basic program component type F, individual program component a, individual program component c, and the Type F general purpose icon, and that with respect to embedded information, "Bangaichi Udon" should be embedded in component a, and the contact telephone number "01-0000-0000" (the single telephone number selected a moment ago by comparison with position information) should be embedded in component c.

The server (200) which has acquired attribute information, configuration information, and embedded information for the app to be generated performs the acquisition of program components, the embedding of embedded information, and the transmission of program components and icon to the mobile terminal (100); furthermore, app generation, icon display, and recording of version information are implemented in mobile terminal (100), but these operations are the same as in the embodiment above, so an explanation thereof is here omitted.

When the mobile terminal (100) comprises a version information storing database (113), version information for child apps for which generation is complete is stored in the version information storing database (113).

Similarly, it will explain about the case in which the character information "unagi_bisi-basi.jp" is encoded in a particular QR code (registered trademark). The mobile terminal (100) transmission operation and the server (200) receiving operation and analysis, and the app determining operations using analysis device (204) in server (200), are the same as the ones in the embodiment above, and they are therefore omitted, but it is assumed here that the app to be generated has been determined to be for "Bishi-Bashi," a restaurant specializing in eel cuisine.

In the same way as in the embodiment above, the server (200) acquires the restaurant name, telephone number, open hours, and URL, etc. of "Bishi-Bashi" as embedded information. Moreover, the server (200) can connect to search sites on the network to acquire related information. Specifically, the server (200) performs a search using received character information as a first key, and for each respective web page indicated by multiple URLs obtained as the result of searching, a selection is made of a freely chosen number of items set forth at a high level and frequently used from among phrases used on the web page; multiple selected phrases are similarly compared with phrases selected from web pages indicated by other URLs, and phrases with a high proportion of common use between multiple web pages are selected in any desired number, arranged in order according to proportion of common use. The server (200) connects to a search site on the network, then performs a further search using phrases selected and used in common in this way as a second key, acquiring the multiple URLs obtained through the search results as related information. Searching can be further repeated by the same method, using phrases acquired as related information as a third key. In this embodiment, "Bincho charcoal," "natural," and "popularity ranking" are phrases which can be selected as second keys; and it is conceivable that the multiple URLs obtained as a result of searches with these second keys would be a URL for the website of an eel restaurant (different from "Bishi-Bashi"), a URL for a site gathering reports about restaurants offering wild eels, and a URL of a site which collects reviews and popularity rankings, etc. of eel restaurants. The server (200) embeds URLs obtained as a result of a search using the second key as embedded information in program component j, following which it transmits the same to mobile terminal (100) together with other program components, as in the embodiment above, and the mobile terminal (100) generates an app and displays an icon, as in the embodiment above. If a user touches the icon for a generated app which includes the program component j in which related URL information is thus embedded, not only are the store hours of "Bishi-Bashi" displayed, but also websites of eel restaurants (other than "Bishi-Bashi"), sites gathering reports about restaurants offering wild eel, and sites collecting eel restaurant reviews and popularity rankings, etc. can be easily accessed for comparison to "Bishi-Bashi." Note that the method of selecting a second key in this embodiment is just one such embodiment. Also, it is not necessarily a requirement that information obtained as a result of searches on a network search site be a URL; this can be any information at all so long as it is appropriate for being embedded in a program component.

Using the embodiment of a restaurant, we have explained above the process for generating an app, but apps generated by this invention can also be for individual persons.

Now the generation of an app relating to an individual will be therefore explained.

It is assumed that an owner and user of the mobile terminal (100) is an individual (A). An individual B is a friend of the individual A; for explanation we assume that individual A is trying to generate an app pertaining to the individual B.

First, a QR code (registered trademark) relating to the individual B is created.

The QR code (registered trademark) is normally created by the individual B, but may also be created by the individual A (software for encoding character information into the QR code (registered trademark) or other 2D codes is currently widely published and easily acquired and used by anyone, therefore no problem arises when an individual creates the QR code (registered trademark)). It is also assumed that the character information "kojin-b@KB.person.ne.jp," which is the email address of an individual B, for example, is encoded in the QR code (registered trademark).

The transmission operation of the mobile terminal (100) and the receiving operation of the server (200) is the same as the ones in the above-described embodiment, therefore an explanation thereof is here omitted.

The server (200) uses the analysis device (204) to analyze the received character information and additional information, acquiring individual B's email address from character information and determining that the app to be generated is an app relating to individual B.

Based on the determination above, the server (200) understands that the attribute of the app to be generated is Type C (the type in which the central function is to establish a contact or communication means with individuals or businesses, etc.), that the configuration is basic program component type c and individual program component d and the general purpose icon in Type C, and that the email address "kojin-b@KB.person.net.jp" should be embedded in the individual program component d as embedded information.

The server (200) which has acquired attribute information, configuration information, and embedded information for the app to be generated performs the acquisition of program components, the embedding of embedded information, and the transmission of program components and icon to the mobile terminal (100); furthermore, app generation, icon display, and recording of version information are implemented in the mobile terminal (100), but these operations are the same as the ones in the embodiment above, so an explanation thereof is here omitted.

Next the case in which an app relating to an individual is similarly generated and the app to be generated is registered beforehand in the app listing database (211) on server (200) will be explained.

It is assumed that the owner and user of the mobile terminal (100a) is an individual A. An individual C is a friend of the individual A, and similarly owns and uses a mobile terminal (100c). Here the anticipated scenario is one in which the individual A is trying to generate an app relating to the individual C.

Prior to this, the individual C registers an app relating to the individual C on the server (200) and generates a QR code (registered trademark). Registration to the server (200) and the generation of the QR code (registered trademark) is performed as follows.

In order to prepare for the generation of an app, the parent app (300) installed on the mobile terminal (100) allows the user to select and input functions and information present in the individual app (icon names, telephone numbers, icon images etc.), and is fitted with a function for transmitting selected and input information to server (200).

The server (200) determines the child app to be generated based on the transmitted information, registering this as a new child app in the app listing database (211), and at the same time transmits the app ID of the newly registered child app to the mobile terminal (100).

The individual C first inputs to the parent app (300c) the name of the individual C-related app (character information such a name, a nickname, etc. determined at will by individual C), and a contact means which can be used by launching the individual C-related app. Various contact means are conceivable, such as a telephone, an email, a SMS, a FAX, an URL and the like, but for the individual C, the telephone and the email have been selected as the contact means.

The individual C inputs to the parent app (300c) his name (C-Ta, c-Ro), his telephone number (090-1111-1111), and his email address (kojin-c@KB.person.ne.jp), and specifies the icon image data for displaying a child app pertaining to individual C on the mobile terminal (100). Note that an icon image data is stored ahead of time by the individual C in the storage device (104c) in the mobile terminal (100c), and an identification of an image is done by specifying a particular location within the storage device (104c) in the mobile terminal (100c).

The parent app (300c), having acquired a name, a telephone number, an email address, and an icon image, transmits to the server (200) the message that an app pertaining to the individual C will be generated, along with the name, the telephone number, the email address, and the icon image data.

The server (200), having received the message that an app pertaining to the individual C will be generated, along with the name, the telephone number, the email address, and the icon image data for same, determines the requisite registration items to register a new child app (an app pertaining to individual C) in the app listing database (211).

The server (200) first determines that the attribute of the child app to be registered is Type C (the type in which the central function is to establish a contact or communication means with individuals or businesses, etc.) (the message that an icon pertaining to an individual will be generated has been notified from mobile terminal (100c), therefore it is obvious in this case that the attribute of the app to be generated is Type C).

Given that the name, telephone number, and email address have been acquired from mobile terminal (100c), it is clear that the configuration is a basic program component type C, an individual program component a, an individual program component b, and an individual program component d, and the name (C-Ta, c-Ro) is the information embedded in individual program component a, the telephone number (090-1111-1111) is the information embedded in individual program component b, and the email address "kojin-c@KB.person.ne.jp" is the information embedded in individual program component d. In addition, given that icon image data is acquired from mobile terminal (100c), it can be seen that the acquired image data should be used in place of the Type C general purpose icon.

The server (200) furthermore determines the app ID (xxxxx-000551) and character information (kojin_xxxx/d0000/00000. The character information which, when acquired, leads to judge that a child app should be generated) of a child app to be newly registered (the app ID is mechanically and automatically determined according to app listing database (211) control rules; character information is automatically and uniquely determined based on each of the above acquired information, attributes, and configuration information). The server (200) registers each of the above each information into each of the items in the app listing database (211), respectively.

The server (200) transmits the character information (kojin_xxxx/d0000/00000) from the information registered in the app listing database (211) to the mobile terminal (100c).

The mobile terminal (100c), having received the character information (kojin_xxxx/d0000/00000) from server (200), encodes the character information to the QR code (registered trademark) and stores the QR code (registered trademark) image data into the storage device (104c).

The individual C manipulates the parent app (300) in the mobile terminal (100c) to display the QR code (registered trademark) on the display (102c).

The individual A image-captures the displayed QR code (registered trademark) with the camera (106) installed on the mobile terminal (100a). The character information is decoded and acquired from the image-captured QR code (registered trademark). In this case the acquired character information is kojin_xxxx/d0000/00000.

The mobile terminal (100a) transmits the acquired character information to the server (200) via the network.

The server (200) receives the character information via the network.

The server (200) compares the received character information and additional information with the app listing database (211) using the analysis device (204) to identify the app to be generated. In this case, fully matching character information is present in the app listing database (211), so the app to be generated is identified as an app pertaining to the individual C, with the app ID of "xxxxx-000551."

By identifying which app is the app to be generated on the app listing database (211), the attribute information, the configuration information, and the embedded information about the app to be generated are obtained, respectively.

Here the attribute of the app to be generated is Type C (the type in which the central function is to establish a contact or communication means with individuals or businesses, etc.), and it is clear that the configuration is the basic program component type C, the individual program component a, the individual program component b, and individual program component d and dedicated icon (icon image data specified by app ID), and that as embedded information, the name (C-Ta, c-Ro) is to be embedded in the individual program component a, the telephone number (090-1111-1111) is to be embedded in the individual program component b, and the email address "kojin-c@KB.person.ne.jp" is to be embedded in the individual program component d.

The server (200) which has acquired the attribute information, the configuration information, and the embedded information for the app to be generated performs the acquisition of program components, the embedding of embedded information, and the transmission of program components and icon to the mobile terminal, and furthermore, the app generation, the icon display, and the storage of version information are implemented in the mobile terminal (100), but these operations are the same as the ones in the embodiment above, so an explanation thereof is here omitted.

The dedicated icon image above is selected at will by the individual C and stored in the storage device (104c) in the mobile terminal (100c), but such a configuration is not necessarily required, and it is also acceptable for the individual C to select among the images pre-stored on the mobile terminal (100c). In such case, because the same image data can be pre-stored in the storage means (202) of the server (200), no transmission or reception of the image data is necessary.

It is not necessary to use the image selected by the individual C and stored in the storage device (104c) of the mobile terminal (100c) as is, but it is rather possible to use the image after the parent app (300) or the server (200) processes the image data according to the appropriate rules. In such case, it can be arranged such that the data size and the tone are more suitable for displaying as an icon on the display of the mobile terminal, and thus it can be configured as resulting in obtaining a unity on design for each type of icon, and improving an easiness in seeing by a user, etc.

In the embodiment above, the mobile terminal (100a), having received character information (kojin_xxxx/d0000/00000) from server (200), encodes the character information to the QR code (registered trademark), however, such a configuration is not necessarily required, and it is also acceptable for the server (200) to first encode the character information (kojin_xxxx/d0000/00000) to the QR code (registered trademark), then transmit the QR code (registered trademark) image data to the mobile terminal (100a).

Next, an embodiment of generating an app in which the primary function is to play videos such as corporate advertising or promotion videos and the like will be explained. Note that in the explanation below of the process for generating a video app, it is assumed that the server (200) app listing database (211) is not used.

As a representative method of reproducing a video data arranged on the network, which is triggered by reading the QR code (registered trademark), it can be divided into two types, namely, the streaming type in which a reproduction is occurred in parallel by sequentially downloading the video data each time, and the download type in which the video data is fully downloaded all at once, and then it is reproduced after being stored on the mobile terminal (100).

With respect to each type, it will be explained by dividing into six (6) types, as follows, however, in the specific application of the present invention, it is not limited to those 6 types, and other methods may also be applied:
(1) the method by which the location addresses of video data are directly stored in the QR code (registered trademark);
(2) the method by which the video data location address and the key character string for uniquely identifying the location addresses are stored in the determination database (205) of the server (200), and the character string is stored in the QR code (registered trademark);
(3) the method by which a data file in which the video data location addresses are stored is placed on the network, the data file address and key character string for uniquely identifying the data file are stored in the determination database (205) of the server (200), and the key character string is stored in the QR code (registered trademark);
(4) the method by which video data location addresses and program component for video reproduction are made into a data set and stored in the program component database (206) of the server (200), the determining data for calling the data set is stored in the determination database (206) of the server (200), and the key character string for uniquely calling the determining data is stored in the QR code (registered trademark);
(5) the method by which a data file in which the video data location addresses are stored is placed on the network, the addresses of the data file and program component for video reproduction are made into a data set and stored in the program component database (206) of the server (200), the determining data for calling the data set is stored in the determination database (205) of the server (200), and the key character string for uniquely calling the determining data is stored in the QR code (registered trademark);
(6) the method by which a video data and program component for video reproduction are made into a data set and stored in the program component database (206) of the server (200), the determining data for calling the data set is stored in the determination database (205) of the server (200), and the key character string for uniquely calling the determining data is stored in the QR code (registered trademark) (download type only).

First an example in which the video data is transmitted sequentially to the mobile terminal (100) over the network while the video data is placed on the network (streaming reproduction) will be explained.

In this case, the video data is transmitted in fragments from the server to the mobile terminal (100) and is reproduced in sequence. For example, for the video data of 100 MB, ultimately the entire 100 MB is transmitted to the mobile terminal (100) and is reproduced (played back), but the mobile terminal (100) does not record and hold all of the data of 100 MB at once; for example, and then the video data is reproduced by storing and holding the new data while deleting the reproduced data using the storage area of 10 MB.

Next the method by which the video location addresses are directly stored in the QR code (registered trademark) will be explained.

First, as a preparation step, the video data is stored at a location accessible from the network, and an address thereof is identified. As an example, a video data file is placed and stored at the address "www.ms.com/video/video-A.mp4".

Figure 9:
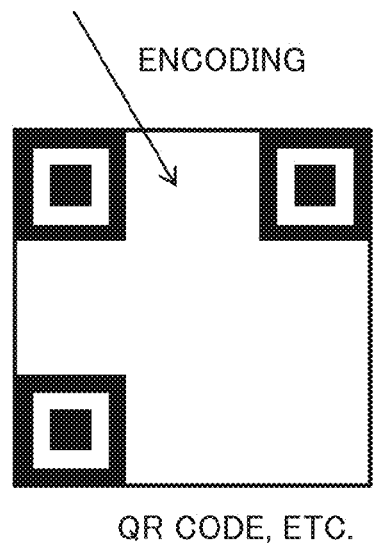
FIG. 9 A diagram showing a QR code (registered trademark) (code A1) in an app generation system according to the present invention.

Next, as shown in FIG. 9, the address "www.ms.com/video/video-A.mp4" is stored in the QR code (registered trademark) as the character information, and a QR code (registered trademark) (code A1) is generated. At this point, with the goal of making it easy to determine it is about the video data, a form may be adopted in which an identifying character string data (ID tag) such as "video," "MPEG4," or "http" is inserted before or after the character information, or authentication data such as "1234" is also inserted to determine the authorization to reproduce the video data.

Figure 10:
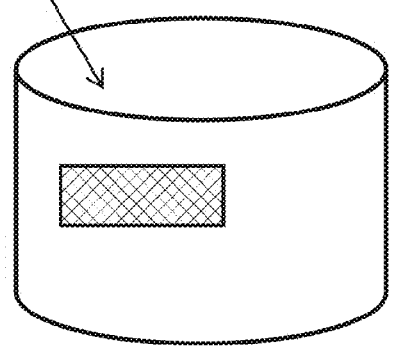
FIG. 10 A diagram showing the appearance when key character strings and program components are linked and stored in a determination database within an app generation system according to the present invention.

Next, as shown in FIG. 10, the "www.ms.com/video/video-A.mp4" address above is stored in the determination database (205) of the server (200) as a key character string for determination, and as a program component corresponding to the key character string, the program component (component I) for reproduction of the video data is linked thereto and stored.

Next, as an implementation step, the QR code (registered trademark) above (code A1) is read using the camera (106) on the mobile terminal (100) on which the parent app (300) is installed. The mobile terminal (100), which has acquired the image information for the QR code (registered trademark) (code A1), activates the decoder (107), and then, as the result of decoding, the mobile terminal acquires the character information "www.ms.com/video/video-A.mp4" stored in the QR code (registered trademark) (code A1).

The mobile terminal (100) communicates with the server (200) via the network, and then transmits the acquired character information "www.ms.com/video/video-A.mp4" to the server (200). At this point, it may be in the form such that the mobile terminal (100) transmits, to the server (200), the data stored in the QR code (registered trademark), in addition to other information stored in the QR code (registered trademark), ID character string data (ID tag) such as "video, "Play", "MPEG4," "http," and the authentication data such as "1234", along with the character information "www.ms.com/video/video-A.mp4". It may also be in the form such that in addition to the character information stored in the QR code (registered trademark), the data such as "utilized language", "position information", "IP address", and "past usage history" is transmitted together to the server (200) as the additional information, and it may also be in the form such that the input data by users is transmitted together to the server (200).

The server (200) identifies the character information "www.ms.com/video/video-A.mp4" from the data received from the mobile terminal (100), and using the character information as a key information, the server searches the determination database (205) and acquires the ID data (e.g., "buhin-I") for the program component (component I) which is linked to and stored in the character information. At this point, it may also be in the form such that the server (200) repeatedly searches the determination database (205) using other information stored in the QR code (registered trademark) or the additional information or the user input information, together with the character information "www.ms.com/video/video-A.mp4", thereby specifying the linked program components in more detail.

Next, the server (200) searches the program component database (206) using "buhin-I", the ID data for the program components acquired from the determination database (205), as the key information, acquiring the program component "component I" which is linked to the ID data and stored. The server (200) transmits the program component "component I" acquired from the program component database (206), and the character information "www.ms.com/video/video-A.mp4" stored in the QR code (registered trademark), to the mobile terminal (100). At this point, it may also be in the form such that the program component data and the character information are directly transmitted from the server (200) to the mobile terminal (100), or such that the program component "component I" information is transmitted from the server (200) to the mobile terminal (100), and requesting from the mobile terminal (100) to the server (200) so as to download the program component "component I" on the server (200) together with the character information.

Figure 11:
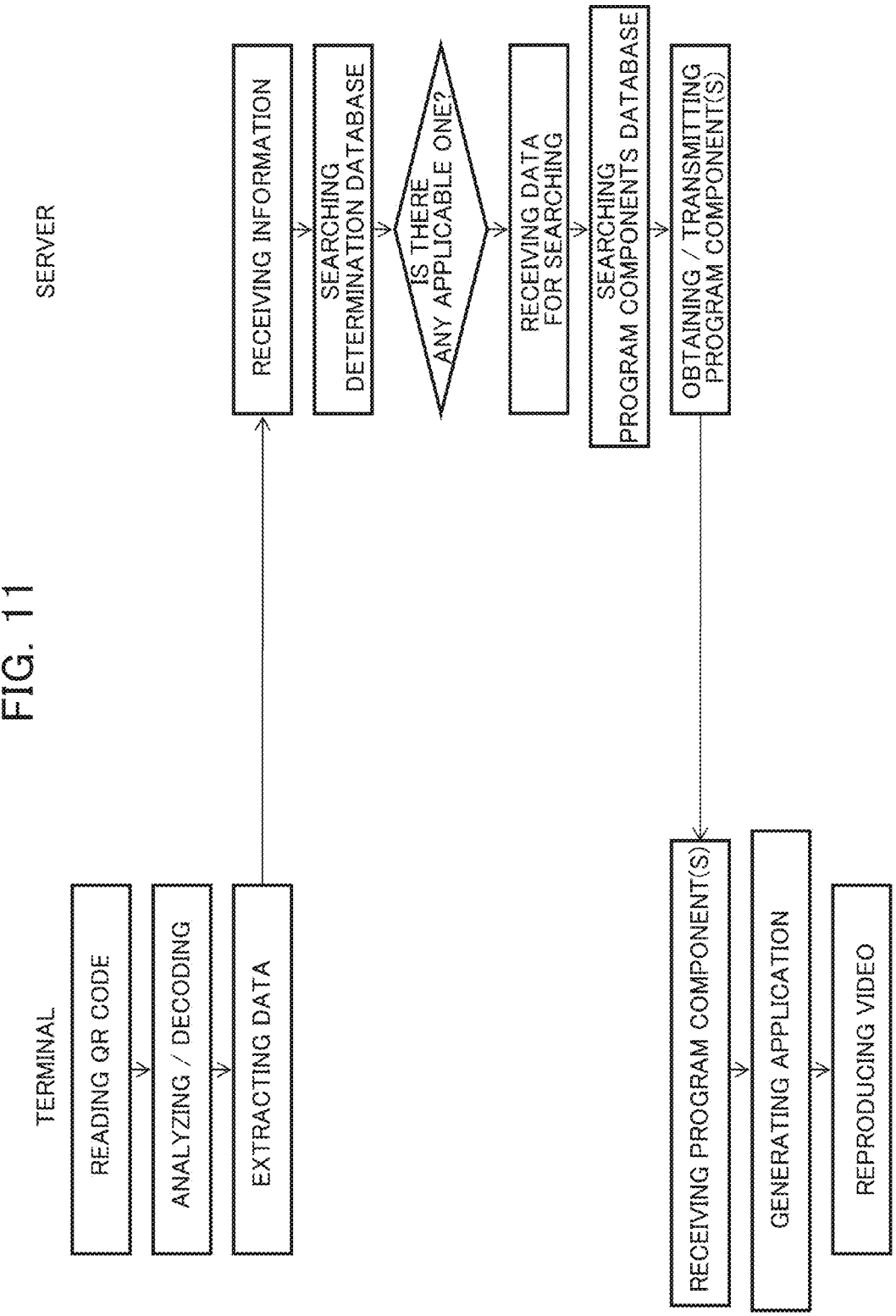
FIG. 11 A diagram showing the flow from the scanning of a QR code (registered trademark) up to video reproduction in an app generation system according to the present invention.

The mobile terminal (100) generates the video reproduction (reproduction) apps on the mobile terminal (100) using the program component "component I" received from the server (200), as shown in FIG. 11. In the mobile terminal (100), the generated app is activated and the video data present at the address "www.ms.com/video/video-A.mp4" is reproduced. The video data which has been reproduced is displayed on the display (102) of the mobile terminal (100), and the functional operations such as play, stop, pause, fast forward, rewind, search scene, etc. may be possible by the manipulation of the user.

Continuously performing the aforementioned series of operations, the video data is easily reproduced on the mobile terminal (100) screen by scanning the QR code (registered trademark) with the mobile terminal (100).

Next, the method by which the video data location address and the key character string for uniquely identifying the location addresses are stored in the determination database (205) of the server (200), and the character string is stored in the QR code (registered trademark) will be explained.

First, as a preparation step, the video data is stored at a location accessible from the network, and then such address is identified. As an example, the video data file is placed and stored at the address "www.ms.com/video/video-A.mp4".

Figure 12:
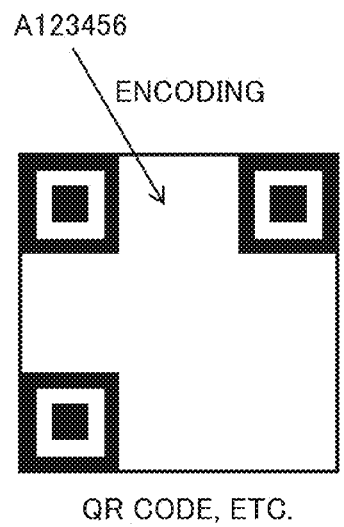
FIG. 12 A diagram showing a QR code (registered trademark) (code A2) in an app generation system according to the present invention.

Next, as shown in FIG. 12, the character string such as "A123456" for uniquely identifying the address "www.ms.com/video/video-A.mp4" is set, and the key character string is stored in the QR code (registered trademark), and then the QR code (registered trademark) (code A2) is generated.

At this point, for the purpose of easily determining that the subject data is the video data, it may be in the form such that the identifying character string data (ID tag) such as "video," "MPEG4," or "http" is inserted before or after the key character string, or the authentication data such as "1234" is also inserted to determine an authorization to reproduce the video data.

Figure 13:
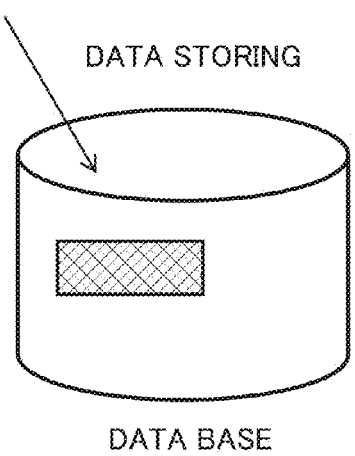
FIG. 13 A diagram showing the appearance when key character strings and program components are linked and stored in a determination database within an app generation system according to the present invention.

Next, as shown in FIG. 13, the aforementioned key character string "A123456" is stored in the determination database (205) of the server (200) as the key character string for determination, and as a program component corresponding to the key character string, the program component (component I) for reproduction of the video data is linked thereto and stored.

Next, as an implementation step, the aforementioned QR code (registered trademark) (code A2) is read using the camera (106) on the mobile terminal (100) on which the parent app (300) is installed. The mobile terminal (100), which has acquired the image information for the QR code (registered trademark) (code A2), activates the decoder (107), and as the result of decoding, the terminal acquires the character information "A123456" stored in the QR code (registered trademark) (code A2).

The mobile terminal (100) communicates with the server (200) via the network and transmits the acquired character information "A123456" to the server (200). At this point, it may be in the form such that the mobile terminal (100) transmits, to the server (200), the data stored in the QR code (registered trademark), in addition to other information stored in the QR code (registered trademark), the ID character string data (ID tag) such as "video, "Play", "MPEG4", "http" or the authentication data such as "1234", along with the character information "A123456." It may also be in the form such that, in addition to the character information stored in the QR code (registered trademark), the data such as "utilized language", "position information", "IP address", "past usage history" is transmitted together to the server (200) as the additional information. It may be in the form such that the user input data is also transmitted to the server (200).

The server (200) identifies the character information "A123456" from the data received from the mobile terminal (100), and using the character information as the key information, the server searches the determination database (205)

and acquires the address "www.ms.com/video/video-A.mp4" linked to the character information and stored, and the ID data (e.g., "buhin-I") for the program component (component I). At this point it may be in the form such that the server (200) repeatedly searches the determination database (205) using other information stored in the QR code (registered trademark) or the additional information or the user input information, together with the character information "A123456," and then the linked address data and the program components, etc. are specified in more detail.

Next, the server (200) searches the program component database (206) using "buhin-I", the ID data for the program components acquired from the determination database (205), as the key information, acquiring the program component "component I" which is linked to the ID data and stored. The server (200) transmits the program component "component I" acquired from the program component database (206), and the address "www.ms.com/video/video-A.mp4" acquired from the determination database (205), to the mobile terminal (100). At this point, It may be in the form such that the program component data and address are directly transmitted from the server (200) to the mobile terminal (100), or the program component "component I" and the address-related information can be transmitted from the server (200) to the mobile terminal (100), or it may also be in the form such that a request is made from the mobile terminal (100) to the server (200), and then the program component "component I" and other data are downloaded to the server (200).

The operation of the mobile terminal (100) (app generation and video reproduction) is the same as the one in the aforementioned embodiment, and thus they are omitted here.

Next, the method by which a data file in which the video data location addresses are stored is placed on the network, and the data file address and key character string for uniquely identifying the data file are stored in the determination database (205), and the key character string is stored in the QR code (registered trademark), will be explained.

First, as a preparation step, the video data is stored at a location accessible from the network, and such address is identified. As an example, a video data file is placed and stored at the address "www.ms.com/video/video-A.mp4".

Figure 14:
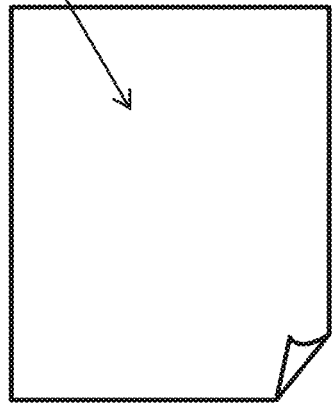
FIG. 14 A diagram showing the appearance when a data file recording video data addresses is placed at a specific address in an app generation system according to the present invention.

Next, as shown in FIG. 14, the address "www.ms.com/video/video-A.mp4" is stored in the separate data file "videodata.xml" as the character string data, and the data file is placed in and stored at the address "www.ms.com/XML/videodata.xml".

At this point, for the purpose of easily determining that the address stored in the data file is the video data, it may be in the form such that an identifying character string data (ID tag) such as "video", "MPEG4", "http" is stored together with the video address "www.ms.com/video/video-A.mp4", and the authentication data such as "1234" is also stored to determine the authorization to reproduce the video data.

Figure 15:
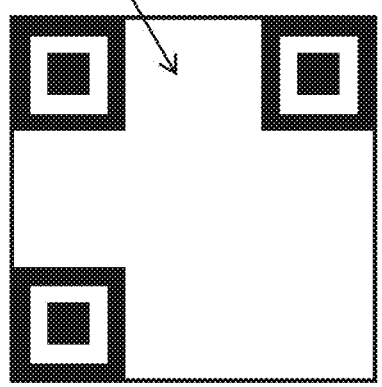
FIG. 15 A diagram showing a QR code (registered trademark) (code A3) in an app generation system according to the present invention.

Next, as shown in FIG. 15, a character string such as "X654321" for uniquely identifying the data file address "www.ms.com/XML/videodata.xml" is set, and the key character string is stored in the QR code (registered trademark), and the QR code (registered trademark) (code A3) is generated. At this point, for the purpose of easily determining the data file in which the address of the subject video data is stored, it may be in the form such that an identifying character string data (ID tag) such as "XML" is inserted before or after the key character string, and the authentication data such as "1234" is also inserted in order to determine the authorization to access the data.

Secondarily, the aforementioned key character string "X654321" is stored in the determination database (205) as the key character string for determination, the address "www.ms.com/XML/videodata.xml" is stored as the data corresponding to the character string, and the program component (component I) for video data reproduction is linked to and stored in as a program component corresponding to the character string. At this point, it may be in the form such that a program component corresponding to the key character string is not identified and stored, but rather the determination database (205) is searched based on the character information acquired from the data file present at the key character string address, and a corresponding program component is identified.

Next, as an implementation step, the aforementioned QR code (registered trademark) (code A3) is read using the camera (106) on the mobile terminal (100) on which the parent app (300) is installed. The mobile terminal (100), which has acquired the image information for the QR code (registered trademark) (code A3), activates the decoder (107), and as the result of decoding, the mobile terminal acquires the character information "X654321" stored in the QR code (registered trademark) (code A3). The mobile terminal (100) communicates with the server (200) via the network and transmits the acquired character information "X654321" to the server (200). At this point, it may also be in the form such that the mobile terminal (100) transmits, to the server (200), the data stored in the QR code (registered trademark), in addition to other information stored in the QR code (registered trademark), the ID character string data (ID tag) such as "XML", the authentication data such as "1234", along with the character information "X654321". It may also be in the form such that, in addition to the character information stored in the QR code (registered trademark), the data such as "utilized language", "position information", "IP address", and "past usage history" is transmitted together to the server (200) as the additional information, or the input data by the user can also be transmitted to the server (200).

The server (200) identifies the character information "X654321" from the data received from the mobile terminal (100), and using the character information as the key information, searches the determination database (205) and acquires the address "www.ms.com/XML/videodata.xml" and the ID data (e.g., "buhin-I") for the program component (component I) as the data linked to the character information and stored. At this point, it may also be in the form such that the server (200) repeatedly searches the determination database (205) using other information stored in the QR code (registered trademark) or the additional information or the user input information together with the character information "X654321", and then the linked data, the program components, etc. are identified in more detail. Alternatively, it may also be in the form such that, after acquiring the data stored in the data file "www.ms.com/XML/videodata.xml" stored at the acquired address, the determination database (205) is searched and the linked data, the program components, and the like are identified.

The server (200) accesses the data "www.ms.com/XML/videodata.xml" and acquires the video data file address "www.ms.com/video/video-A.mp4" stored in the data file. Next, the server (200) searches the program component database (206) using "buhin-I", the ID data for the program components acquired from the determination database (205), as the key information, acquiring the program component "component I" linked to the ID data and stored.

The server (200) transmits the program component "component I" acquired from the program component database (206), and the address "www.ms.com/video/video-A.mp4" acquired from the data file "www.ms.com/XML/videodata.xml," to the mobile terminal (100). At this point, the program component and the address may be directly transmitted from the server (200) to the mobile terminal (100), or the program component "component I" and the address information can be transmitted from the server (200) to the mobile terminal (100), and then a request is made from the mobile terminal (100) to the server (200) and the program component "component I" and other data on server (200) are downloaded. Or, instead of the video file address "www.ms.com/video/video-A.mp4", the data file address "www.ms.com/XML/videodata.xml" can be transmitted from the server (200) to the mobile terminal (100), and after the mobile terminal (100) has accessed the data file, the video file stored in the data file can again be accessed.

In the followings, we omit a discussion of the operation (app generation and video reproduction) on mobile terminal (100), as it is basically the same as the one in the aforementioned embodiment, however, when playing the video data, it may also be in the form such that the mobile terminal (100) activates the generated app, accesses the address "www.ms.com/XML/videodata.xml" and reproduce the video data present at the "www.ms.com/video/video-A.mp4" address stored in the data file.

Figure 16:
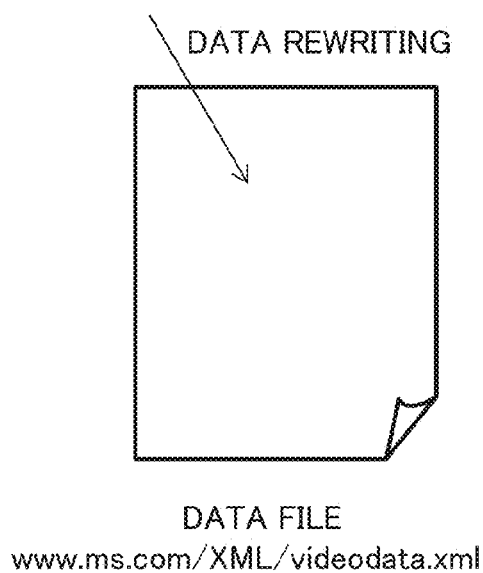
FIG. 16 A diagram showing the appearance of a change of video data address in an app generation system according to the present invention.

Note that, with the structure described above, the video data played on the mobile terminal (100) can be changed or updated as needed. In the aforementioned description, the embodiment in which the video data stored in the data file "www.ms.com/XML/videodata.xml" is locked to the video data at the "www.ms.com/video/video-A.mp4" address is described, however, it is also possible, as shown, for example, in FIG. 16, by changing the address of the video data stored in the data file "www.ms.com/XML/videodata.xml" to record, for example, "www.ms.com/video/video-A.mp4" up until the end of April, changing to "www.ms.com/video/video-B.mp4" starting in May, so that the content of the video data reproduced in mobile terminal (100) can be changed as needed, without changing the configuration of apps running on the mobile terminal (100).

Next, the method by which the video data location addresses and the program module reproduction program component I are made into a data set and stored in the program component database (206), the determining data for calling the data set is stored in the determination database (205), and the key character string for uniquely calling the determining data is stored in the QR code (registered trademark), is explained.

First, as a preparation step, the video data is stored at a location accessible from the network, and such address is identified. As an example, a video data file is placed and stored at the address "www.ms.com/video/video-A.mp4".

Next, the address "www.ms.com/video/video-A.mp4" and the program component data (component I) for playing the video data present at the address are made into a data set (data set A4) and stored in the program component database (206), and at the same time, the key character string, e.g. "DSET123456" for uniquely identifying the data set (data set A4) is set, linked to the data set, and stored in the program component database (206).

Figure 17:
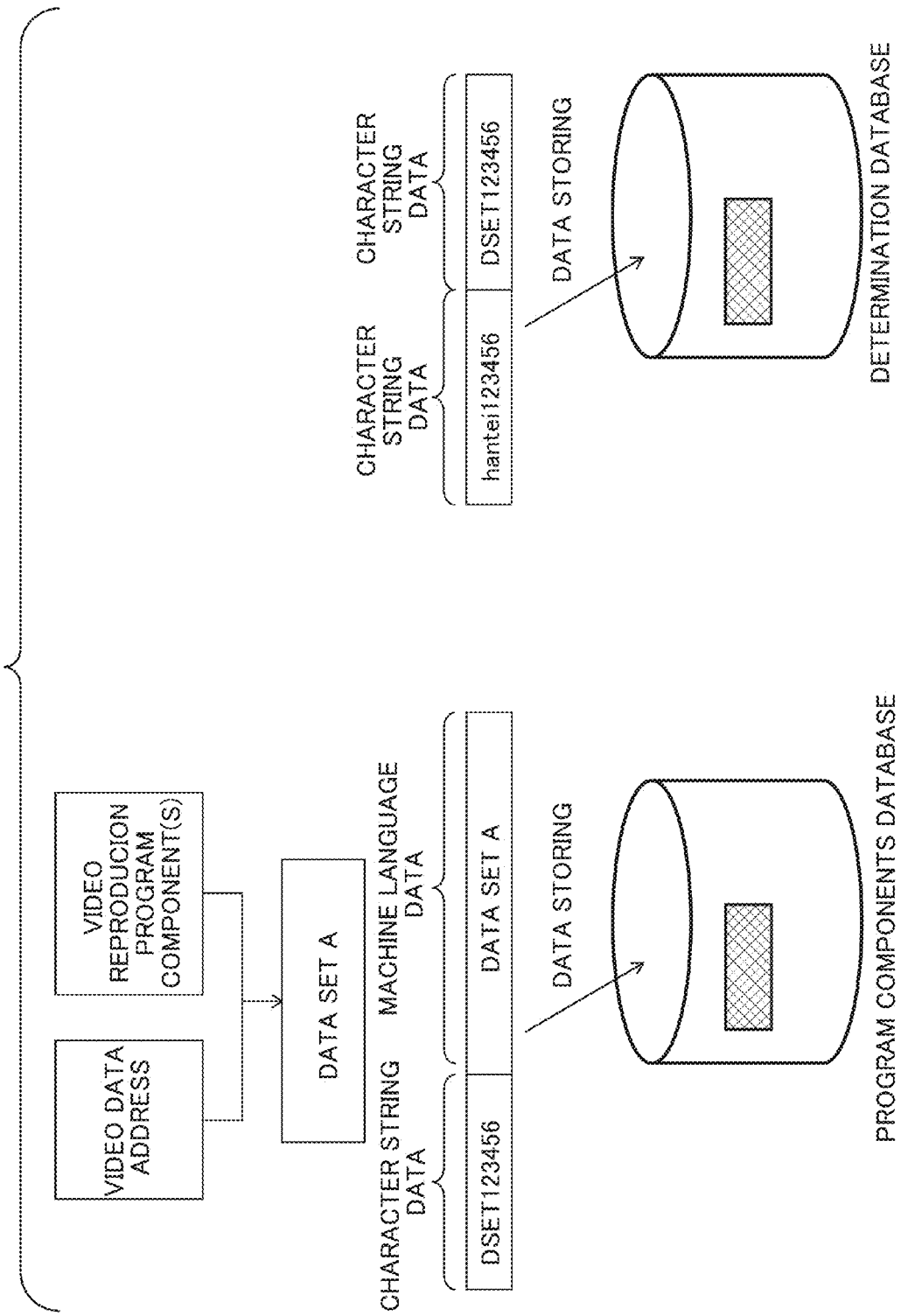
FIG. 17 A diagram showing the appearance when a data set and its related character information is stored in a program component database and a determination database in an app generation system according to the present invention.

Next, as shown in FIG. 17, a different key character string uniquely identifying the key character string "DSET123456" stored in program component database (206) is set, for example, to "hantei123456" and the "DSET123456" and "hantei123456" are linked to and stored in the determination database (205).

Next, the key character string "hantei123456" stored in the determination database (205) is stored in the QR code (registered trademark) and a QR code (registered trademark) (code A4) is generated. At this point, for the purpose of easily determining that the subject data is video data, it may be in the form such that an identifying character string data (ID tag) such as "video," "MPEG4" or "http" is inserted before or after the key character string, or the authentication data such as "1234" is also inserted to determine the authorization to reproduce the video data.

Next, as an implementation step, the QR code (registered trademark) above (code A4) is read using the camera (106) on the mobile terminal (100) on which the parent app (300) is installed. The mobile terminal (100), which has acquired the image information for the QR code (registered trademark) (code A4), activates the decoder (107), and as the result of decoding, the mobile terminal acquires the character information "hantei123456" stored in the QR code (registered trademark) (code A4). The mobile terminal (100) communicates with the server (200) via the network and transmits the acquired character information "hantei123456" to the server (200). At this point, it may also be in the form such that the mobile terminal (100) transmits, to the server (200), the data stored in the QR code (registered trademark), in addition to other information stored in the QR code (registered trademark), the ID character string data (ID tag) such as "video", "Play", "MPEG4", "http" or the authentication data such as "1234", along with the character information "hantei123456." It may also be in the form such that, in addition to the character information stored in the QR code (registered trademark), the data such as "utilized language", "position information", "IP address", and "past usage history" is transmitted together to the server (200) as the additional information. It may also be in the form such that the user input data is also transmitted to the server (200)

The server (200) identifies the character information "hantei123456" from the data received from the mobile terminal (100), and using the character information as the key information, the server searches the determination database (205) and acquires the key character string "DSET123456" as the data linked to the character information and stored. At this point, it may also be in the form such that the server (200) repeatedly searches the determination database (205) using other information stored in the QR code (registered trademark) or additional information or user input information together with the character information "hantei123456," and the linked address data, the program components, etc. are identified in more detail.

Next, the server (200) searches the program component database (206) using the key character string "DSET123456" acquired from the determination database (205) as the key information, and acquires the data set (data set A4) linked to the ID data and stored. The server (200) transmits the program component "component I" included in the data set acquired from the program component database (206), and the video data address "www.ms.com/video/video-A.mp4," to the mobile terminal (100). At this point, the program component and other addresses may be directly transmitted from the server (200) to the mobile terminal (100), or the program component "component I" and the address information can be transmitted from the server (200) to the mobile terminal (100), then a request is made from the mobile terminal (100) to the server (200) and the program component "component I" and other data on the server (200) are downloaded.

The operation of the mobile terminal (100) (app generation and video reproduction) is the same as the one in the aforementioned embodiment, and thus they are omitted here.

Next it will explain the method by which a data file in which the video data location addresses are stored is placed on the network, and the address of the data file and the program component (component I) for playing the video are made into a data set and stored in the program component database (206), and the determining data for calling the data set is stored in the determination database (205), and the key character string for uniquely calling the determining data is stored in the QR code (registered trademark).

First, as a preparation step, the video data is stored at a location accessible from the network, and such address is identified. As an example, a video data file is placed and stored at the address "www.ms.com/video/video-A.mp4".

Next, the address "www.ms.com/video/video-A.mp4" is stored in a separate data file "videodata.xml" as the character string data, and the data file is placed in and stored at address "www.ms.com/XML/videodata.xml". At this point, for the purpose of easily determining that the address stored in the data file is the video data, it may be in the form such that the identifying character string data (ID tag) such as "video", "MPEG4", "http" is stored together with the video address "www.ms.com/video/video-A.mp4", and the authentication data such as "1234" is also stored to determine the authorization to reproduce the video data.

Next, the data file address "www.ms.com/XML/videodata.xml" and the program component data (component I) for playing the video data present at address "www.ms.com/video/video-A.mp4" stored in the data file at the address are made into a data set (data set A5) and stored in the program component database (206), and at the same time, a key character string, e.g. "DSET654321," for uniquely identifying the data set (data set A5) is set, linked to the data set, and stored in the program component database (206).

Next, a different key character string uniquely identifying the key character string "DSET654321" stored in the program component database (206) is set, for example, to "hantei654321," and the "DSET654321" and "hantei654321" are linked to and stored in the determination database (205). Next, the key character string "hantei654321" stored in the determination database (205) is stored in the QR code (registered trademark) and a QR code (registered trademark) (code A5) is generated. At this point, for the purpose of easily determining that this is the data file in which the address of the subject video data is stored, it may be in the form such that an identifying character string data (ID tag) such as "XML" is inserted before or after the key character string, and the authentication data such as "1234" is also inserted in order to determine the authorization to access the data.

Next, as an implementation step, the aforementioned QR code (registered trademark) (code A5) is read using the camera (106) on the mobile terminal (100) on which the parent app (300) is installed. The mobile terminal (100), which has acquired the image information for the QR code (registered trademark) (code A5), activates the decoder (107), and as the result of decoding, the mobile terminal acquires the character information "hantei654321" stored in the QR code (registered trademark) (code A5).

The mobile terminal (100) communicates with the server (200) via the network and transmits the acquired character information "hantei654321" to the server (200). At this point, it may also be in the form such that the mobile terminal (100) transmits, together with the character information "hantei654321", other information stored in the QR code (registered trademark), the ID character string data (ID tag) such as "XML", the authentication data such as "1234", and other data stored in the QR code (registered trademark) to the server (200). In addition to the character information stored in the QR code (registered trademark), the data such as "utilized language", "location information", "IP address", and "past usage history" can be transmitted together to the server (200) as the additional information. It may also be in the form such that the user input data is also transmitted to the server (200).

The server (200) identifies the character information "hantei654321" from the data received from the mobile terminal (100), and using the character information as the key information, searches the determination database (205) and acquires the key character string "DSET654321", linked to the character information and stored. At this point, it may also be in the form such that the server (200) repeatedly searches the determination database (205) using other information stored in the QR code (registered trademark), or the additional information or the user-input data, together with the character information "hantei654321", to identify the linked data or the program components in more detail.

Continuing, the server (200) searches the program component database (206) using the key character string "DSET654321" acquired from the determination database (205) as the key information, acquiring a data set (data set A5) linked to the ID data and stored. The server (200) transmits the program component "component I" included in the data set acquired from the program component database (206), and the data file address "www.ms.com/XML/videodata.xml", to the mobile terminal (100). At this point, it may also be in the form such that the program component and other addresses are directly transmitted from the server (200) to the mobile terminal (100), or the program component "component I" information is transmitted from the server (200) to the mobile terminal (100) and a request is made from the mobile terminal (100) to the server (200), so that the program component "component I" and other data on the server (200) are downloaded. Or, instead of the data file address "www.ms.com/XML/videodata.xml", the video file address "www.ms.com/video/video-A.mp4" stored in the data file can be transmitted from the server (200) to the mobile terminal (100), and after the mobile terminal (100) generates an app to run on the mobile terminal (100) using the program component "component I", the video file is accessed.

The mobile terminal (100) generates the video reproduction apps on the mobile terminal (100) using the program component "component I" received from the server (200). In the mobile terminal (100), the generated app is activated, the address "www.ms.com/XML/videodata.xml" is accessed, the address "www.ms.com/video/video-A.mp4" stored in the data file is acquired, and the video data present at the address "www.ms.com/video/video-A.mp4" is played. The video data which has been reproduced is displayed on the display (102) of the mobile terminal (100), and the functional operations such as a play, a stop, a pause, a fast forward, a rewind, a search scene, etc. may be possible by the manipulation of the user.

Note that with the structure described above, the video data played on the mobile terminal (100) can be changed or updated as needed. In the aforementioned description, for example, it is discussed the embodiment in which the video data stored in the data file "www.ms.com/XML/videodata.xml" is locked to the video data in the address "www.ms.com/video/video-A.mp4", however, it is possible by changing the video data address stored in the data file "www.ms.com/XML/videodata.xml" to record, for example, "www.ms.com/video/video-A.mp4" until the end of April, and change this to "www.ms.com/video/video-B.mp4" starting in May, so as to change the content of the video data reproduced on the mobile terminal (100) as needed without changing the configuration of the app running on the mobile terminal (100).

Next, it is discussed an example in which, after copying all video data on the network onto the mobile terminal (100), the video data is reproduced on the mobile terminal (100) (download reproduction). In this case, if there is the video data of 100 MB, for example, the reproduction as a rule is started after all 100 MB have been stored on the mobile terminal (100), however, it may also be in the form such that the continuous video data is divided for download, or the mutually related video data sets are simultaneously or sequentially downloaded.

It is now explained the method by which the address of the video data for downloading is directly stored in the QR code (registered trademark) address.

First, as a preparation step, the video data is stored at a location accessible and downloadable from the mobile terminal (100), and such address is identified. As an example, a video data file is placed and stored at address "www.ms.com/video/video-D.mp4".

Next, the address "www.ms.com/video/video-D.mp4" is stored in the QR code (registered trademark) as the character string data, and a QR code (registered trademark) (code D1) is generated. At this point, for the purpose of easily determining the nature of the video data targeted for downloading, it may be in the form such that an identifying character string data (ID tag) such as "DL", "video", "MPEG4", "ZIP", "http" is inserted before or after the character string, and the authentication data such as "1234" is inserted together to determine the authorization to download the video data.

Next, the aforementioned "www.ms.com/video/video-D.mp4" address is stored in the determination database (205) as a key character string for determination, and as a program component corresponding to the key character string, the program component (component I) for reproduction of the video data is linked to the key character string and stored in the determination database (205).

Next, as an implementation step, the above QR code (registered trademark) (code D1) is read using the camera (106) on the mobile terminal (100) on which the parent app (300) is installed. The mobile terminal (100) which has acquired the video information for the QR code (registered trademark) (code D1) activates the decoder (107), and as a result of decoding, the mobile terminal acquires the character information "www.ms.com/video/video-D.mp4" stored in the QR code (registered trademark) (code D1).

The mobile terminal (100) communicates with the server (200) over the network and transmits the acquired character information "www.ms.com/video/video-D.mp4" to the server (200). At this point, it may be in the form such that the mobile terminal (100) transmits, together with the character information "www.ms.com/video/video-D.mp4," other information stored in the QR code (registered trademark), the ID character string data (ID tag) such as "DL", "video", "MPEG4", "ZIP", "http", and the authentication data such as "1234" and other data stored in the QR code (registered trademark) to the server (200). In addition to the character information stored in the QR code (registered trademark), the data such as "utilized language", "location information", "IP address", and "past usage history" can be transmitted together to the server (200) as the additional information. It may be in the form such that the user input data is also transmitted to the server (200).

The server (200) identifies the character information "www.ms.com/video/video-D.mp4" from the data received from the mobile terminal (100), and using the character information as the key information, searches the determination database (205) and acquires the program component (component I) identifying data (e.g. "buhin-I") linked to the character information and stored. At this point, it may also be in the form such that the server (200) repeatedly searches the determination database (205) using other information stored in the QR code (registered trademark), or the additional information or the user-input information, together with the character information "www.ms.com/video/video-D.mp4," to identify the linked data in more detail.

Next, the server (200) searches the program component database (206) using "buhin-I", the ID data for the program components acquired from the determination database (205) as the key information, acquiring the program component "component I" which is linked to the ID data and stored. The server (200) transmits the program component "component I" acquired from the program component database (206), and the character information "www.ms.com/video/video-D.mp4" stored in the QR code (registered trademark) to the mobile terminal (100). At this point, it may also be in the form such that the program component and the character information are directly transmitted from the server (200) to the mobile terminal (100), or the program component "component I" information is transmitted from the server (200) to the mobile terminal (100) and a request is made from the mobile terminal (100) to the server (200), so that the program component "component I" is downloaded together with character information.

The mobile terminal (100) generates the video reproduction apps on the mobile terminal (100) using the program component "component I" received from the server (200). The mobile terminal (100) activates the generated app and downloads and reproduces the video data present at address "www.ms.com/video/video-D.mp4". The video data which has been reproduced is displayed on the display (102) of the mobile terminal (100), and the functional operations such as a play, a stop, a pause, a fast forward, a rewind, a search scene, etc. are made possible by the manipulation of the user. Continuously performing the aforementioned series of operations, the video data can be easily reproduced on the screen of the mobile terminal (100) by reading the QR code (registered trademark) with the mobile terminal (100).

Next, it is explained the method by which a video data address and the key character string for uniquely identifying the address are stored in the determination database (205), and the key character string is stored in the QR code (registered trademark).

First, as a preparation step, the video data is stored at a location accessible and downloadable from the mobile terminal (100), and such address is identified. As an example, a video data file is placed and stored at address "www.ms.com/video/video-D.mp4."

Next, a key character string uniquely identifying the address "www.ms.com/video/video-D.mp4," for example "DL123456", is set, and the key character string is stored in the QR code (registered trademark) and a QR code (registered trademark) (code D2) is generated. At this point, for the purpose of easily determining the nature of the video data targeted for downloading, it may be in the form such that an identifying character string data (ID tag) such as "DL" "video", "MPEG4", "ZIP", "http" is inserted before or after the character string, or the authentication data such as "1234" is inserted together to determine the authorization to download the video data.

Next, the aforementioned "DL123456" address is stored in the determination database (205) as a key character string for determination, the address "www.ms.com/video/video-D.mp4" is stored as the data corresponding to the key character string, and as a program component corresponding to the key character string, the program component (component I) for reproduction of video data is linked to the key character string and stored in the determination database (205).

Next, as an implementation step, the aforementioned QR code (registered trademark) (code D2) is read using the camera (106) on the mobile terminal (100) on which the parent app (300) is installed. The mobile terminal (100) which has acquired the video information for the QR code (registered trademark) (code D2) activates the decoder (107), and as a result of decoding, the mobile terminal acquires the character information "DL123456" stored in the QR code (registered trademark) (code D2). The mobile terminal (100) communicates with the server (200) over the network and transmits the acquired character information "DL123456" to the server (200). At this point, it may also be in the form such that the mobile terminal (100) transmits, together with the character information "DL123456", other information stored in the QR code (registered trademark), the ID character string data (ID tag) such as "DL", "video", "MPEG4", "ZIP", "http", the authentication data such as "1234", and other data stored in the QR code (registered trademark) to server (200). A form can also be adopted in which, in addition to the character information stored in the QR code (registered trademark), the data such as "utilized language", "position information", "IP address", and "past usage history" is transmitted together to the server (200) as the additional information. It may also be in the form such that the user input data is also transmitted to the server (200).

The server (200) identifies the character information "DL123456" from the data received from the mobile terminal (100), and using the character information as the key information, searches the determination database (205) and acquires the address "www.ms.com/video/video-D.mp4" as the data linked to the character information and stored, and the program component (component I) identifying data (e.g. "buhin-I") linked to the character information and stored. At this point, it may also be in the form such that the server (200) repeatedly searches the determination database (205) using other information stored in the QR code (registered trademark), or the additional information or the user-input information, together with the character information "DL123456", to identify the linked data or the program components in more detail.

Next, the server (200) searches the program component database (206) using "buhin-I", the ID data for the program components acquired from the determination database (205), as the key information, acquiring the program component "component I" which is linked to the ID data and stored. The server (200) transmits the program component "component I" acquired from the program component database (206), and the data "www.ms.com/video/video-D.mp4" acquired from the determination database (205), to the mobile terminal (100). At this point, the program component and address data can be directly transmitted from the server (200) to the mobile terminal (100), or the program component "component I" information and the address-related information can be transmitted from the server (200) to the mobile terminal (100), and a request is made from the mobile terminal (100) to the server (200), so that the program component "component I" and other data on server (200) are downloaded.

The operation of the mobile terminal (100) (app generation and video reproduction) is the same as the one in the aforementioned embodiment, and thus they are omitted here.

Next, it is explained the method by which a data file in which the address of video data is stored is placed on the network, and the data file address and a key character string for uniquely identifying the data file is stored in the determination database (205), and the key character string is stored in the QR code (registered trademark).

First, as a preparation step, the video data is stored at a location accessible and downloadable from the mobile terminal (100), and such address is identified. As an example, the video data file is placed and stored at address "www.ms.com/video/video-D.mp4."

Next, the address "www.ms.com/video/video-D.mp4" is stored in a separate data file "DLdata.xml" as the character string data, and the data file is placed and stored at "www.ms.com/XML/DLdata.xml." At this point, for the purpose of easily determining that an address stored in a data file is the video targeted for download, it may be in the form such that, together with the video address "www.ms.com/video/video-D.mp4", the identifying character string data (ID tag) such as "DL", "video", "MPEG4", "ZIP", "http" is stored before or after the character string, or the authentication data such as "1234" is inserted together to determine the authorization to download the video data.

Next, a key character string uniquely identifying the data file address "www.ms.com/XML/DLdata.xml", for example "DL654321", is set, the key character string is stored in the QR code (registered trademark), and a QR code (registered trademark) (code D3) is generated. At this point, for the purpose of easily determining that this is the data file in which the address of the subject video data is stored, it may be in the form such that an identifying character string data (ID tag) such as "XML" is inserted before or after the key character string, or the authentication data such as "1234" is also inserted in order to determine authorization to download the data.

Next, the aforementioned "DL654321" address is stored in the determination database (205) as a key character string for determination, the address "www.ms.com/XML/DLdata.xml" is stored as the data corresponding to the key character string, and the program component (component I) for reproduction of video data is linked the key character string and stored in the determination database (205) as a program component corresponding to the key character string. At this point, it may also be in the form such that a program component corresponding to the key character string is not identified and stored, and the determination database (205) is searched based on the character string data acquired from the data file present at the address of the key character string to identify the corresponding program component.

Next, as an implementation step, the above QR code (registered trademark) (code D3) is read using the camera (106) on the mobile terminal (100) on which the parent app (300) is installed. The mobile terminal (100) which has acquired the video information for the QR code (registered trademark) (code D3) activates the decoder (107), and as a result of decoding, the mobile terminal acquires the character information "DL654321" stored in the QR code (registered trademark) (code D3). The mobile terminal (100) communicates with the server (200) over the network and transmits the acquired character information "DL654321" to the server (200). At this point, it may also be in the form such that the mobile terminal (100) transmits, together with the character information "DL654321", other information stored in the QR code (registered trademark), the ID character string data (ID tags) such as "XML", the authentication data such as "1234", and other data stored in the QR code (registered trademark) to the server (200). It may also be in the form such that, in addition to the character information stored in the QR code (registered trademark), data such as "utilized language", "position information", "IP address", and "past usage history" is transmitted together to the server (200) as the additional information. It may also be in the form such that the user input data is also transmitted to the server (200).

The server (200) identifies the character information "DL654321" from the data received from the mobile terminal (100), and using the character information as the key information, searches the determination database (205) and acquires the address "www.ms.com/XML/DLdata.xml" as the data linked to the character string data and stored, and the program component (component I) identifying data (e.g. "buhin-I") linked to the character information and stored. At this point, it may also be in the form such that the server (200) repeatedly searches the determination database (205) using other information stored in the QR code (registered trademark), or the additional information or the user-input information, together with the character information "DL654321", to identify the linked data or the program components in more detail. Alternatively, the determination database (205) can be searched after acquiring the data stored in the data file "www.ms.com/XML/DLdata.xml", which is stored at the acquired address to identify things such as the linked data and the program components.

The server (200) accesses the acquired address "www.ms.com/XML/DLdata.xml" and acquires the address "www.ms.com/video/video-D.mp4" of the video data file stored in the data file. Next, using the program component ID data "buhin-I" acquired from the determination database (205) as the key information, the program component database (206) is searched and the program component "component I", which is linked to ID data and stored, is acquired.

The server (200) transmits the program component "component I" acquired from the program component database (206), and the address "www.ms.com/video/video-D.mp4" acquired from the data file "www.ms.com/XML/DLdata.xml," to the mobile terminal (100). At this point, the program component and the addresses can be directly transmitted from the server (200) to the mobile terminal (100), or the program component "component I" and the address-related information can be transmitted from the server (200) to the mobile terminal (100) and a request is made from the mobile terminal (100) to the server (200), so that the program component "component I" and other data on the server (200) are downloaded. Alternatively, instead of the video file address "www.ms.com/video/video-D.mp4", the data file address "www.ms.com/XML/DLdata.xml" can be transmitted from the server (200) to the mobile terminal (100), and after the mobile terminal (100) accesses the data file, the access can again be made to the video file stored in the data file and the downloading is performed.

The operation of the mobile terminal (100) (app generation and video reproduction) is basically the same as the one in the aforementioned embodiments, and thus they are omitted here, however, it may be in the form such that when playing the video data the generated app is activated in the mobile terminal (100), the address "www.ms.com/XML/DLdata.xml" is accessed, and the video data at address "www.ms.com/video/video-D.mp4" stored in the data file is downloaded and played.

Note that with the structure described above, the video data downloaded and played on the mobile terminal (100) can be changed or updated as needed. In the aforementioned description, for example, it is discussed an example in which the video data stored in the data file ""www.ms.com/XML/DLdata.xml"" is locked to the video data in the address "www.ms.com/video/video-D.mp4", however, it is possible, by changing the video data address stored in data file "www.ms.com/XML/videodata.xml", to record, for example, "www.ms.com/video/video-D.mp4" until the end of April, and to change this to "www.ms.com/video/video-E.mp4" starting in May, so as to change the content of the video data downloaded to and played on the mobile terminal (100) as needed without changing the configuration of the app running on the mobile terminal (100).

Next it is explained the method by which a video data address and the program component "component I" for the video reproduction are made into a data set and stored in the program component database (206), the determination data for calling the data set is stored in the determination database (205), and a key character string for the uniquely calling determination data is stored in the QR code (registered trademark).

First, as a preparation step, the video data is stored at a location accessible and downloadable from the mobile terminal (100), and such address is identified. As an example, a video data file is placed and stored at the address "www.ms.com/video/video-D.mp4".

Next the address "www.ms.com/video/video-D.mp4" and the program component (component I) for playing the video data present at address are made into a data set (data set D4) and stored in the program component database (206), and at the same time a key character string, e.g. "DSET2" for uniquely identifying the data set (data set D4) is set, linked to the data set, and stored in the program component database (206). Next, a key character string for uniquely identifying the key character string "DSET2" stored in the program component database (206), e.g. "hantei2," is set, and the key character string "DSET2" and "hantei2" are linked to and stored in the determination database (205).

Next, the key character string "hantei2" stored in the determination database (205) is stored in the QR code (registered trademark), and a QR code (registered trademark) (code D4) is generated. At this point, for the purpose of easily determining the nature of the video data targeted for downloading, it may be in the form such that, for example, the identifying character string data (ID tag) such as "DL", "video", "MPEG4", "ZIP" is inserted before or after a key character string, or the authentication data such as "1234" is inserted together to determine the authorization to download the video data.

Next, as an implementation step, the aforementioned QR code (registered trademark) (code D4) is read using the camera (106) on the mobile terminal (100) on which the parent app (300) is installed. The mobile terminal (100) which has acquired the video information for the QR code (registered trademark) (code D4) activates the decoder (107), and as a result of decoding, the mobile terminal acquires the character information "hantei2" stored in the QR code (registered trademark) (code D4).

The mobile terminal (100) communicates with the server (200) over the network and transmits the acquired character information "hantei2" to the server (200). At this point, it may also be in the form such that the mobile terminal (100) transmits, together with the character information "hantei2," other information stored in the QR code (registered trademark), the ID character string data (ID tags) such as "DL", "video", "MPEG4", "ZIP", the authentication data such as "1234", and other data stored in other QR code (registered trademark) to the server (200). In addition, it may also be in the form such that an outside of the character information stored in the QR code (registered trademark), the data such as "utilized language", "position information", "IP address", and "past usage history" is transmitted together to the server (200) as the additional information. It may also be in the form such that the user input data is also transmitted to server (200).

The server (200) identifies the character information "hantei2" from the data received from the mobile terminal (100), and using the character information as the key information, searches the determination database (205) and acquires the key character string "DSET2" as data linked to the character information and stored. At this point, it may also be in the form such that the server (200) repeatedly searches the determination database (205) using other information stored in the QR code (registered trademark), or the additional information or the user-input information, together with the character information "hantei2," to identify the linked data or the program components in more detail. Continuing, the server (200) searches the program component database (206) using the key character string "DSET2" acquired from the determination database (205) as the key information, acquiring a data set (data set D4) linked to and stored in the ID data.

The server (200) transmits the program component "component I" included in the data set acquired from the program component database (206), and the video data address "www.ms.com/video/video-D.mp4," to the mobile terminal (100). At this point, it may also be in the form such that the program component and the video data addresses are directly transmitted from the server (200) to the mobile terminal (100), or the program component "component I" information is transmitted from the server (200) to the mobile terminal (100) and a request is made from the mobile terminal (100) to the server (200), so that the program component "component I" and other data on the server (200) are downloaded.

The mobile terminal (100) generates the video reproduction apps on the mobile terminal (100) using the program component "component I" received from the server (200). In the mobile terminal (100), the generated app is activated, and the video data present at the address "www.ms.com/video/video-D.mp4" is downloaded and played. The video data which has been reproduced is displayed on the display (102) of the mobile terminal (100), and the functional operations such as a play, a stop, a pause, a fast forward, a rewind, a search scene, etc. is made possible by the manipulation of the user. Continuously performing the aforementioned series of operations, the video data can be easily reproduced on the screen of the mobile terminal (100) by reading the QR code (registered trademark) with the mobile terminal (100).

Next, it will be explained the method by which a data file in which the video data addresses are stored is placed on the network, and the data file address and the program component "component I" for the video reproduction are made into a data set and stored in the program component database (206); the determination data for calling the data set is stored in the determination database (205), and a key character string for uniquely calling determination data is stored in the QR code (registered trademark).

First, as a preparation step, the video data is stored at a location accessible and downloadable from the mobile terminal (100), and such address is identified. As an example, a video data file is placed and stored at the address "www.ms.com/video/video-D.mp4."

Next, the address "www.ms.com/video/video-D.mp4" is stored in a separate data file "DLvideodata.xml" as the character string data, and the data file is placed and stored at "www.ms.com/XML/DLdata.xml." At this point, for the purpose of easily determining that an address stored in a data file is the video targeted for download, it may be in the form such that, together with the video address "www.ms.com/video/video-D.mp4," the identifying character string data (ID tag) such as "DL", "video", "MPEG4", "ZIP" is stored, or the authentication data such as "1234" is inserted together to determine the authorization to download the video data.

Next, the data file address "www.ms.com/XML/DLdata.xml" and the program component (component I) for playing the video data present at address "www.ms.com/video/video-D.mp4" stored in the data file at the address are made into a data set (data set D5) and stored in the program component database (206), and at the same time a key character string, e.g. "DSET3" for uniquely identifying the data set (data set D5) is set, linked to the data set, and stored in the program component database (206). Next, a key character string for uniquely identifying the key character string "DSET3" stored in the program component database (206), e.g. "hantei654321," is set, and the key character string "DSET3" and "hantei3" are linked to and stored in the determination database (205).

Next, the key character string "hantei3" stored in the determination database (205) is stored in the QR code (registered trademark), and a QR code (registered trademark) (code D5) is generated. At this point, for the purpose of easily determining that this is the data file in which the address of the subject video data is stored, it may be in the form such that an identifying character string data (ID tag) such as "XML" is inserted before or after the key character string, or authentication data such as "1234" is also inserted in order to determine the authorization to access the data.

Next, as an implementation step, the aforementioned QR code (registered trademark) (code D5) is read using the camera (106) on the mobile terminal (100) on which the parent app (300) is installed. The mobile terminal (100) which has acquired the video information for the QR code (registered trademark) (code D5) activates the decoder (107), and as a result of decoding, the mobile terminal acquires the character information "hantei3" stored in the QR code (registered trademark) (code D5).

The mobile terminal (100) communicates with the server (200) over the network and transmits the acquired character information "hantei3" to the server (200). At this point, it may also be in the form such that the mobile terminal (100) transmits, together with the character information "hantei3", other information stored in the QR code (registered trademark), the ID character string data (ID tags) such as "XML", the authentication data such as "1234", and other data stored in the QR code (registered trademark) to the server (200). It may also be in the form such that, in addition to the character information stored in the QR code (registered trademark), the data such as "utilized language", "position information", "IP address", and "past usage history" are transmitted to the server (200) as the additional information. It may be in the form such that the user input data is also transmitted to the server (200).

The server (200) identifies the character information "hantei3" from the data received from the mobile terminal (100), and using the character information as the key information, searches the determination database (205) and acquires the key character string "DSET3" as the data linked to the character information and stored. At this point, it may also be in the form such that the server (200) repeatedly searches the determination database (205) using other information stored in the QR code (registered trademark), or the additional information or the user-input data, together with the character information "hantei3," to identify the linked data or the program components in more detail.

Continuing, the server (200) searches the program component database (206) using the key character string "DSET3" acquired from the determination database (205) as the key information, acquiring a data set (data set D5) linked to the ID data and stored.

The server (200) transmits the program component "component I" included in the data set acquired from the program component database (206), and the data file address "www.ms.com/XML/DLdata.xml", to the mobile terminal (100). At this point, it may also be in the form such that the program component and other addresses are directly transmitted from the server (200) to the mobile terminal (100), or the program component "component I" information is transmitted from the server (200) to the mobile terminal (100) and a request made from the mobile terminal (100) to the server (200), so that the program component "component I" and other data on the server (200) are downloaded. Or, instead of the data file address "www.ms.com/XML/DLdata.xml", the video file address "www.ms.com/video/video-D.mp4" stored in the data file can be transmitted from the server (200) to the mobile terminal (100), and after the mobile terminal (100) generates a program (program I) to run on the mobile terminal (100) using the program component "component I", the video file is downloaded.

The mobile terminal (100) generates the video reproduction app on the mobile terminal (100) using the program component "component I" received from the server (200). In the mobile terminal (100) the generated app is activated, the address "www.ms.com/XML/DLdata.xml" is accessed, the address "www.ms.com/video/video-D.mp4" stored in the data file is acquired, and the video data present at the address "www.ms.com/video/video-D.mp4" is downloaded and played. The video data which has been reproduced is displayed on the display (102) of the mobile terminal (100), and the functional operations such as a play, a stop, a pause, a fast forward, a rewind, a search scene, etc. are made possible by the manipulation of the user.

Note that with the structure described above, the video data played on the mobile terminal (100) can be changed or updated as needed. In the aforementioned description, for example, it is discussed an example in which the video data stored in the data file ""www.ms.com/XML/DLdata.xml"" is locked to the video data in the address "www.ms.com/video/video-D.mp4", however, it is possible by changing the video data address stored in the data file "www.ms.com/XML/DLdata.xml" to record, for example, "www.ms.com/video/video-D.mp4" until the end of April, and change this to "www.ms.com/video/video-E.mp4" starting in May, so as to change the content of the video data downloaded to and played on the mobile terminal (100) as needed without changing the configuration of app running on the mobile terminal (100).

Next it is explained the method by which a video data and the program component "component I" for the video reproduction are made into a data set and stored in the program component database (206); the determination data for calling the data set is stored in the determination database (205), and a key character string for uniquely calling the determination data is stored in the QR code (registered trademark).

Next, as a preparation step, the targeted video data "video-D.mp4" and the program component (component I) for reproducing the video data are made into a data set (data set D6) and stored in the program component database (206), and at the same time a key character string, e.g. "DSET1" for uniquely identifying the data set (data set D6) is set, linked to the data set, and stored in the program component database (206).

Figure 18:
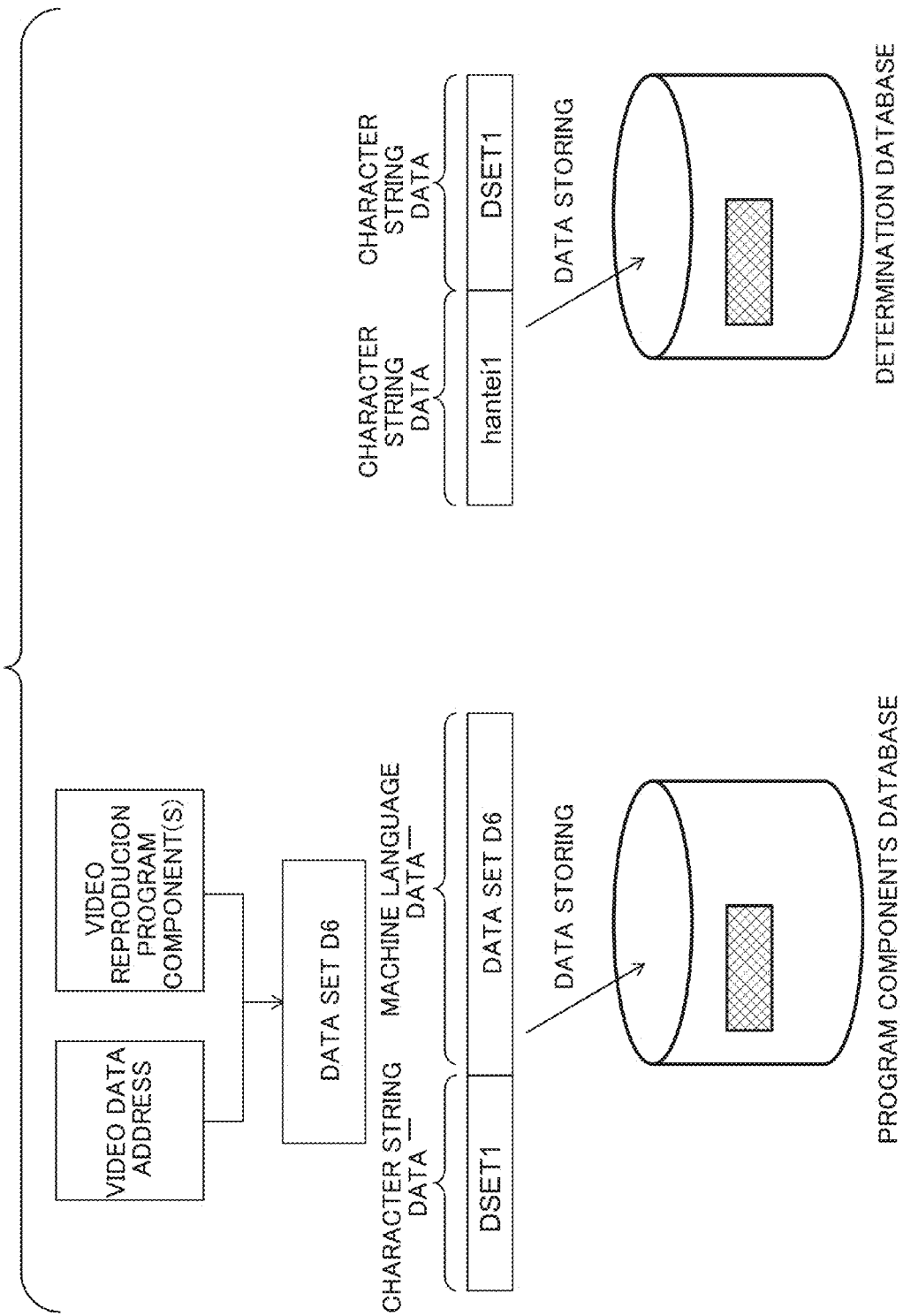
FIG. 18 A diagram showing the appearance when a data set (D6) and its related character information is stored in a program component database and a determination database in an app generation system according to the present invention.

Next, a key character string for uniquely identifying the key character string "DSET1" stored in the program component database (206), e.g. "hantei1," is set, and the key character string "DSET1" and "hantei1" are linked to and stored in the determination database (205) (see FIG. 18).

Next, the key character string "hantei1" stored in the determination database (205) is stored in the QR code (registered trademark), and a QR code (registered trademark) (code D6) is generated. At this point, for the purpose of easily determining the nature of the video data targeted for downloading, it may be in the form such that an identifying character string data (ID tag) such as "DL", "video", "MPEG4", "ZIP", "http" is inserted before or after a key character string, and the authentication data such as "1234" is inserted together to determine the authorization to download the video data.

Next, as an implementation step, the aforementioned QR code (registered trademark) (code D6) is read using the camera (106) on the mobile terminal (100) on which the parent app (300) is installed. The mobile terminal (100) which has acquired the video information for the QR code (registered trademark) (code D6) activates the decoder (107), and as a result of decoding, the mobile terminal acquires the character information "hantei1" stored in the QR code (registered trademark) (code D6).

The mobile terminal (100) communicates with the server (200) over the network and transmits the acquired character information "hantei1" to the server (200). At this point, it may also be in the form such that the mobile terminal (100) transmits, together with the character information "hantei1," other information stored in the QR code (registered trademark), the ID character string data (ID tags) such as "DL", "video", "MPEG4", "ZIP", the authentication data such as "1234", and other data stored in other QR code (registered trademark) to the server (200). It may also be in the form such that, in addition to the character information stored in the QR code (registered trademark), the data such as "utilized language", "position information", "IP address", and "past usage history" are transmitted to the server (200) as the additional information. It may be in the form such that the user input data is also transmitted to the server (200).

The server (200) identifies the character information "hantei1" from the data received from the mobile terminal (100), and using the character information as the key information, searches the determination database (205) and acquires the key character string "DSET1" as the data linked to the character information and stored. At this point, it may also be in the form such that the server (200) repeatedly searches the determination database (205) using other information stored in the QR code (registered trademark), or the additional information or the user-input information, together with the character information "hantei1," to identify the linked data or the program components in more detail.

Continuing, the server (200) searches the program component database (206) using the key character string "DSET1" acquired from the determination database (205) as the key information, acquiring a data set (data set D6) linked to the ID data and stored.

The server (200) transmits the program component "component I" included in the data set acquired from the program component database (206), and the video data "video-D.mp4" to the mobile terminal (100). At this point, it may also be in the form such that the program component and the video data are directly transmitted from the server (200) to the mobile terminal (100), or the program component "component I" information is transmitted from the server (200) to the mobile terminal (100) and a request is made from the mobile terminal (100) to the server (200), so that the program component "component I" and the video data on the server (200) are downloaded.

The mobile terminal (100) generates the video reproduction app on the mobile terminal (100) using the program component "component I" received from the server (200). In the mobile terminal (100), the generated app is activated, and the downloaded video data "video-D.mp4" is played. The video data which has been reproduced is displayed on the display (102) of the mobile terminal (100), and the functional operations such as a play, a stop, a pause, a fast forward, a rewind, a search scene, etc. are made possible by the manipulation of the user. Continuously performing the aforementioned series of operations, the video data can be easily reproduced on the screen of the mobile terminal (100) by reading the QR code (registered trademark) with the mobile terminal (100).

Next, a concrete embodiment of generating an app which functions as a membership card in the system of the present invention will be explained.

Regarding a representative method of generating a membership card app, it will explain about:

(1) a method of generating an authentication app for inputting and registering authentication data for authenticating personal identity;

(2) a method of generating a membership card app on a mobile terminal using an authentication app;

(3) and a method of generating a member authentication app for authenticating a membership card. In the concrete application of the present invention, other methods may also be applied.

First it will explain about (1) the method of generating an authentication app for authenticating a personal identity. Here it will explain about the cases in which the followings are used as the basic data for authenticating a personal identity in order to generate an app for collecting and registering the basic data for a personal identification:

(a) an ID number that is unique to each mobile terminal (an ID number for uniquely identifying a hardware of the mobile terminal, or an ID number for uniquely identifying the basic software such as an OS (Operating System) installed in on the mobile terminal, or a combination thereof);

(b) a passcode input by the user him/herself (it may also be a data set made up of not only character data, but gestures, etc.). In the concrete application of the present invention, it may be in the form such that the data other than the aforementioned (a) and (b) is combined for authentication. It may also be in the form such that an additional information such as "user's own profile information", "utilized language", "position information", "IP address", "past usage history" are also used for authentication.

Figure 19:
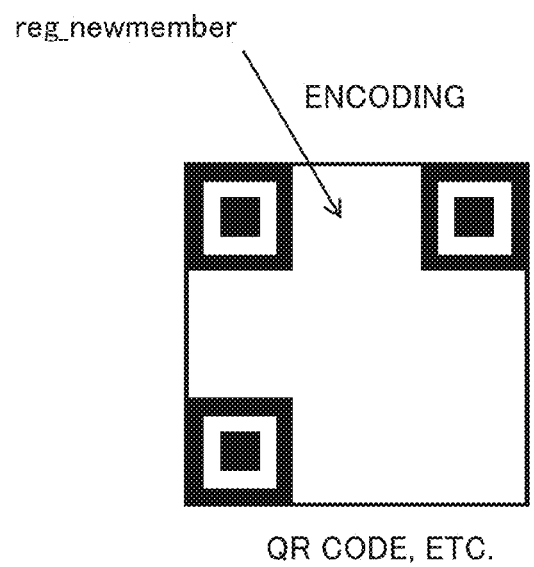
FIG. 19 A diagram showing a QR code (registered trademark) (code #1) in an app generation system according to the present invention.

First, as a preparation step, a QR code (registered trademark) for triggering the generation of an authentication app is generated. For example, FIG. 19, in which the QR code (registered trademark) (code #1), in which "reg_newmember" is stored as the character information, is generated. At this point, for the purpose of clarifying the role of the character information and facilitating the identification, the character string data (ID tag) such as "fnc::reg_newmember,, start::20110401,,end::20120331" can be inserted before or after the character information.

Figure 20:
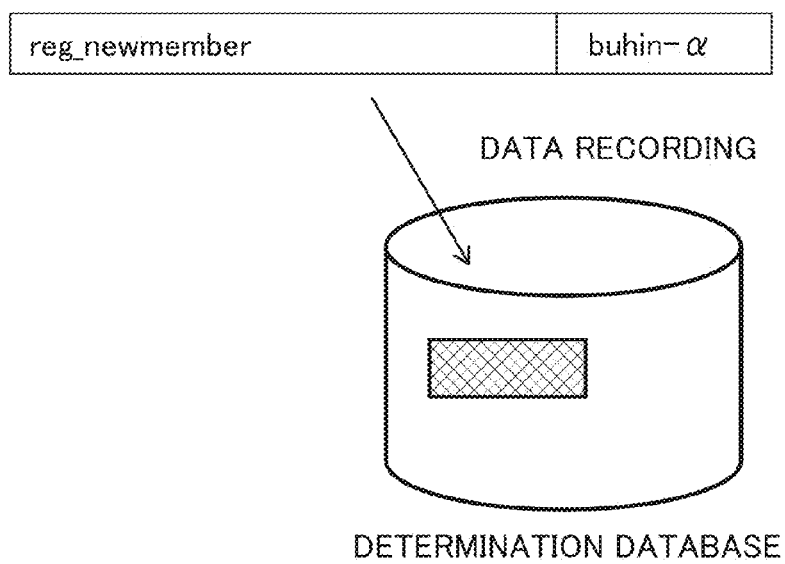
FIG. 20 A diagram showing the appearance when key character strings and program components are linked and stored in a determination database within an app generation system according to the present invention.

Next, FIG. 20, in which the aforementioned character information "reg_newmember" is stored in the determination database as a key character string for determination, and an authentication program component (component α) for collecting and registering the basic data for authenticating a personal ID is linked and stored therein as a program component corresponding to the key character string.

Next, as an implementation step, the aforementioned QR code (registered trademark) (code #1) is read using the camera (106*h*) function on the mobile terminal (100*h*) in which the parent app (300) is installed. The mobile terminal (100), which has acquired the image information for the QR code (registered trademark) (code #1), activates the decoder (107), and as the result of decoding, the mobile terminal acquires the character information "reg_newmember" stored in the QR code (registered trademark) (code #1). The mobile terminal (h) communicates with the server (200) via the network and transmits the acquired character information "reg_newmember" to the server (200).

At this point, it may also be in the form such that, together with the acquired character information "reg_newmember," the mobile terminal (100*h*) transmits the information other than what is stored in the QR code (registered trademark), for example, the ID character string data (ID tag), to the server (200). It may also be in the form such that, in addition to the character information stored in the QR code (registered trademark), the additional information such as "user's own profile information", "utilized language", "position information", "IP address", "past usage history", the data such as "an ID number for uniquely identifying a hardware", the data such as "an ID number uniquely identifying basic software such as the OS, etc. installed on the terminal" are also sent to the server (200). Furthermore, it may also be in the form such that the input data such as a passcode input by the user is also transmitted to the server (200).

The server (200) identifies the character information "reg_newmember" from the data received from the mobile terminal (100*h*), and using the character information as the key information, searches the determination database and acquires the program component (component α) identifying data (e.g. "buhin-α") linked to the character information and stored. At this point, it may also be in the form such that the server (200) repeatedly searches the determination database using the data such as the aforementioned additional information or the user-input information, etc. together with the character information "reg_newmember," to identify the linked data or the program components in more detail.

Next, using the program component ID data "buhin-α" acquired from the determination database as the key information, the program component database (206) is searched and the program component "component α," which is linked to the ID data and stored, is acquired. The server (200) transmits the program component "component α" acquired from the program component database (206) to the mobile terminal (100*h*). At this point, it may also be in the form such that the program component is directly transmitted from the server to the mobile terminal (100*h*), or the program component "component α" related information is transmitted from the server to the mobile terminal (100*h*) and a request is made from the mobile terminal (100*h*) to the server (200), so that the program component "component α" on the server (200) are downloaded.

The mobile terminal (100*h*) generates and activates an authentication data collection app (app α) to run on the mobile terminal (100*h*) using the program component "component α" received from the server (200). App α acquires either an ID number unique to each mobile terminal at the time of startup (an ID number uniquely identifying the hardware of the mobile terminal, an ID number uniquely identifying the basic software such as the OS, etc. installed in the mobile terminal, or a combination thereof, which is represented as the term "unique ID" below). In the specific application of the present invention, it may also be in the form such that the data other than a unique ID is acquired. After being activated, the app α prompts the user to input a passcode for identifying the user him/herself (it may be not only the character data, but a data set made up of gestures or the like).

Figure 21:
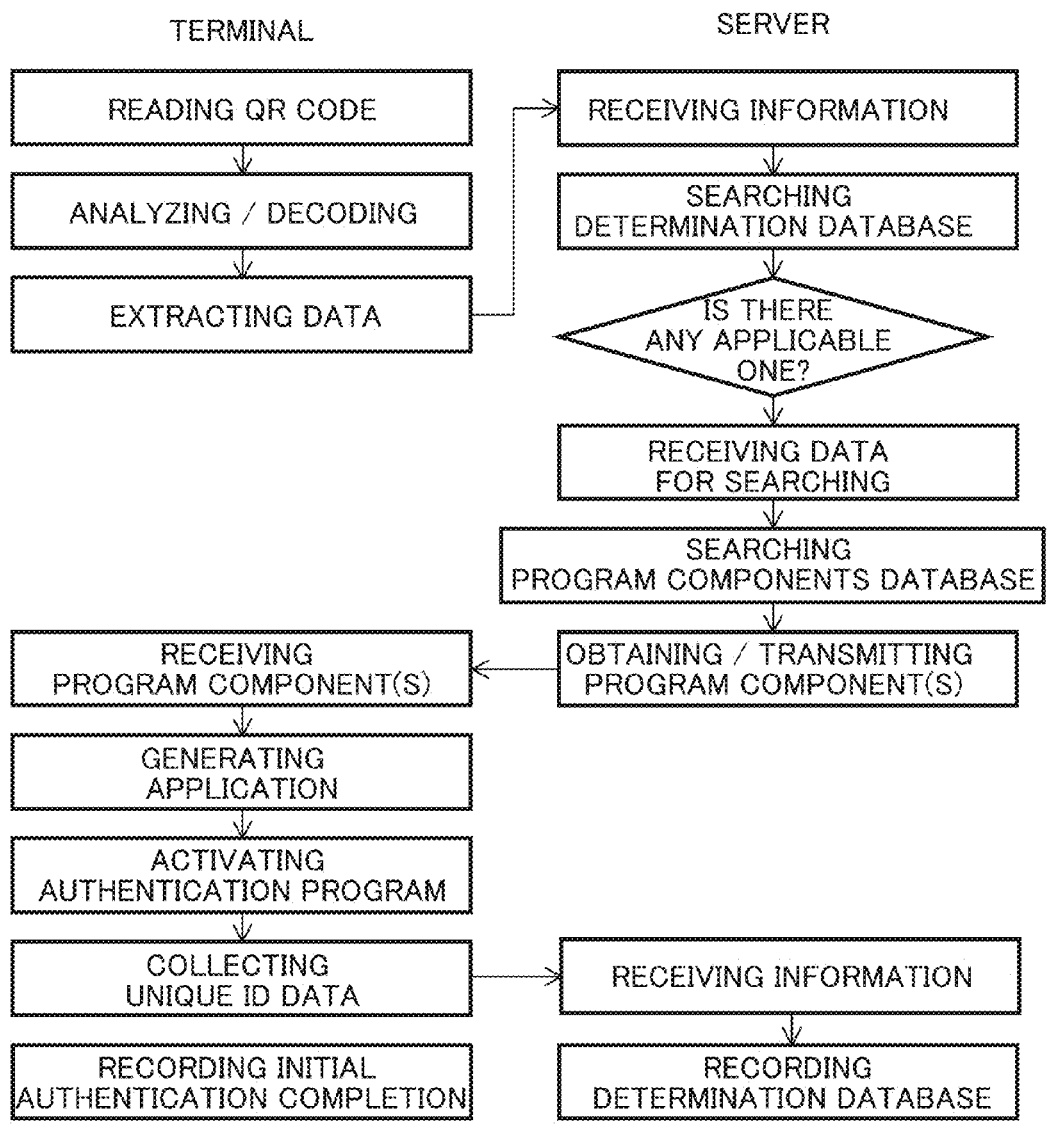
FIG. 21 An explanatory diagram showing the flow from reading of a QR code (registered trademark) up to completion of initial authentication in an app generation system according to the present invention.

When a user inputs the passcode information such as the character string "0909," the app α stores such information and communicates to the server (200), registering this together with the acquired unique ID in the determination database. At this point, a program component (component β) for the purpose of a membership card app software is linked to and stored therein as a program component corresponding to a passcode or unique ID (see FIG. 21).

Next, the aforementioned (2) a method of generating a membership card app on a mobile terminal using an authentication app will be explained.

First, a member registration process is executed by the same method discussed above. The server (200) acquires the program component (component α) ID data (embodiment: "buhin-α") and transmits the information about the program component (component α) to the mobile terminal (100*h*).

When the mobile terminal (100*h*) has received the information about the program component (component α) from the server (200), it activates the app α if an authentication data collecting app (app α) for authenticating an identity based on "component α" has been generated in the mobile terminal (100*h*), and the app α issues a request to the server (200) not to transmit "component α" but rather to transmit the program component (component β) for the membership card app. At this point, it may also be in the form such that the unique ID of the mobile terminal (100*h*) is also transmitted from the mobile terminal (100*h*) to the server (200).

When the server (200) receives the character information (e.g., "buhin-β") uniquely identifying the program component (component β) for the membership card app from the mobile terminal (100*h*), the server searches the program component database (206) using the character information and acquires a program component (component β) for the membership card app. The server (200) transmits the program component "component β" acquired from the program component database (206) to the mobile terminal (100*h*). At this point, it may also be in the form such that the program component is directly transmitted from the server (200) to the mobile terminal (100*h*), or the information related to the program component "component β" is transmitted from the server (200) to the mobile terminal (100*h*) and a request is made from the mobile terminal (100*h*) to the server (200), so that the program component "component β" on the server (200) is downloaded.

The mobile terminal (100*h*) generates and activates the membership card app (app β) to run on the mobile terminal (100*h*) using the program component "component β" received from the server (200). The app β acquires the unique ID at the time of the activation and validates whether it matches the information stored in the app β or not. If it matches, then the app activates, however, if it does not match, then the membership card app β does not activate normally. In the specific application of the present invention, it may also be in the form such that the data other than the unique ID is acquired. After being activated, the app β prompts the user to input a passcode for identifying the user him/herself (may be not only the character data, but a data set made up of gestures or the like). If the input data matches the passcode pre-stored in the app β, then the app β operates as the membership card program, and if the input data does not match the pre-stored passcode, the app β does not operate as the membership card program.

Figure 22:
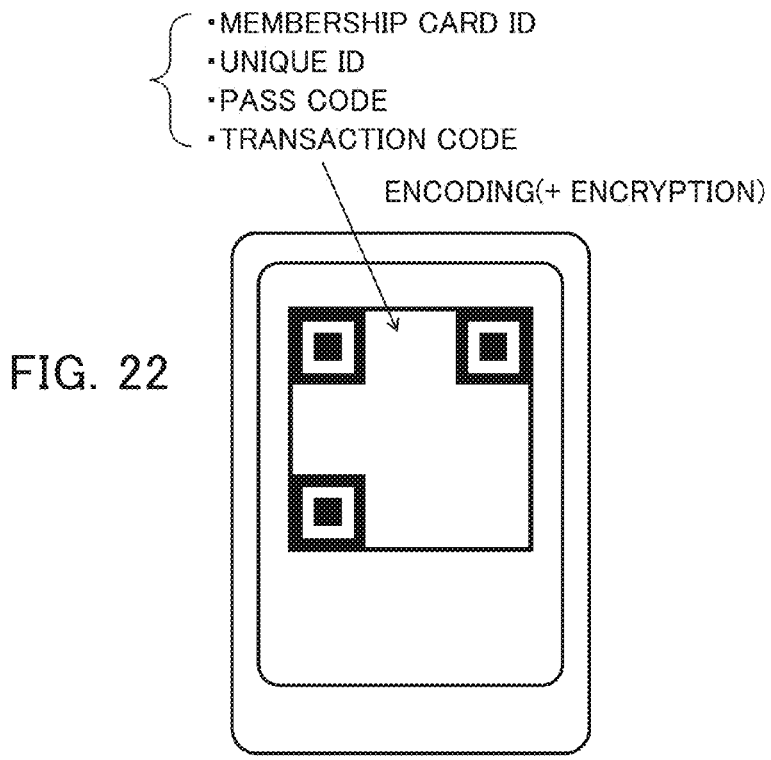
FIG. 22 A diagram showing a QR code (registered trademark) (code #2) in an app generation system according to the present invention.

When the normally activated app β operates as the membership card, a dedicated QR code (registered trademark) (code #2) is generated and displayed on the display (102) of the mobile terminal (100*h*) (see FIG. 22). In addition to the membership card ID, the unique ID or the passcode which is acquired at the time of the app β activates or which has already been held by the app β is stored in the QR code (registered trademark), and a "transaction code" randomly generated by the app β when the QR code (registered trademark) is generated is also stored. At this point, it may also be in the form such that, in order to maintain the confidentiality of data stored in the QR code (registered trademark), the data such as the unique ID or the passcode is encoded, or translated and represented according to the specific algorithm.

Figure 23:
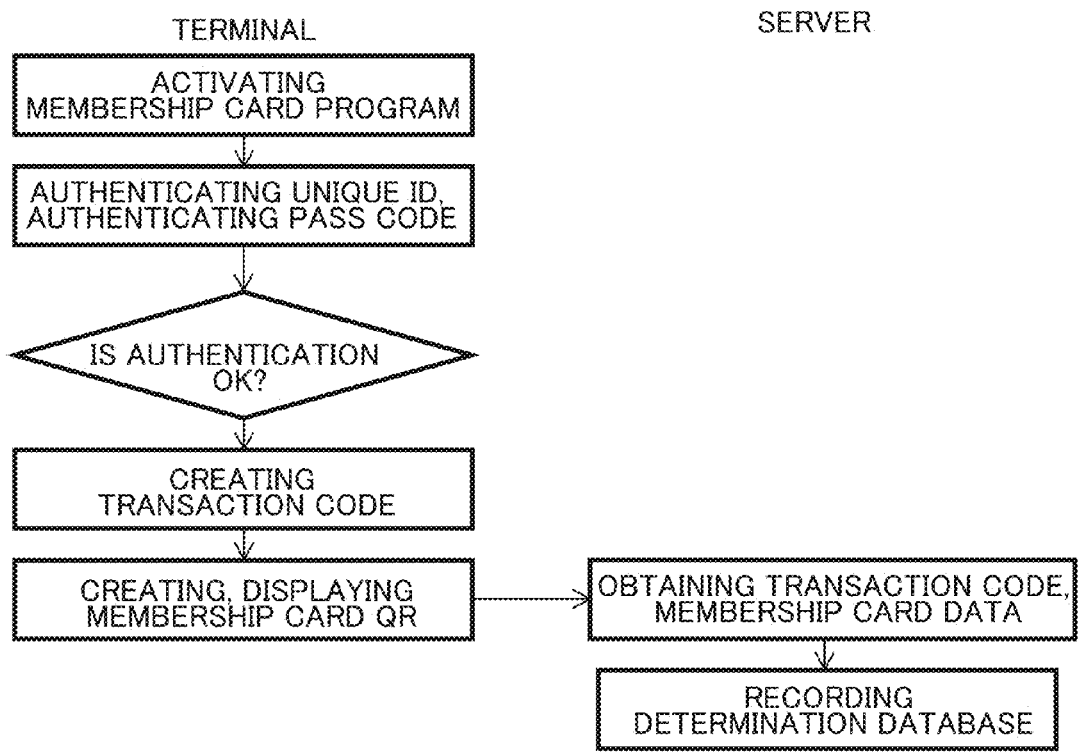
FIG. 23 An explanatory diagram showing the flow of the generation of transaction codes relating to membership cards in an app generation system according to the present invention.
Figure 24:
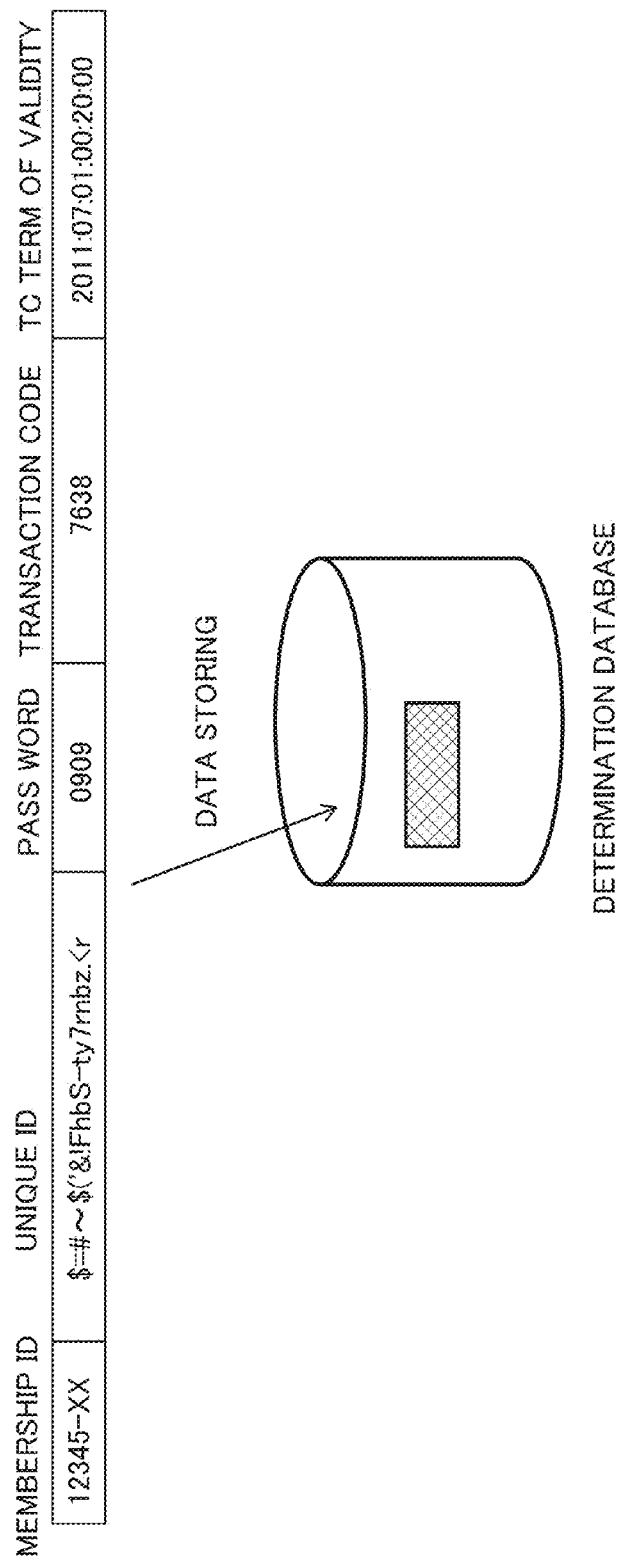
FIG. 24 An explanatory diagram of the appearance when transaction codes, etc. relating to membership cards are stored in a determination database in an app generation system according to the present invention.

Each time the app β generates the QR code (registered trademark) which will serve as the membership card, it generates a "transaction code" which is different on each occasion (for example, in this occasion it is "7638", and in the next occasion it is "2943"), communicating with the server (200) so that the server (200) records a "transaction code" (together with the user unique ID or the passcode, etc.) to the determination database (FIGS. 23 and 24). Since the content of the data, especially transaction code, included in the QR code (registered trademark) differs with each generation of the membership card QR code (registered trademark), an authentication will not occur if an image of a membership card QR code (registered trademark) generated in the past is reproduced and used (because the latest membership card and the transaction code will not match). Note that at this point, it may also be in the form such that an expiration limit (expiration time, e.g. Jul. 1, 2011, 12:20 am) is set for the "transaction code".

Next, the aforementioned (3) a method of generating a member authentication app for authenticating a membership card will be explained.

Here, an example of which the mobile terminal (100*i*) in which the membership authentication app has been generated is used for the device of membership authentication will be explained. A member authentication app (app γ) is generated on the mobile terminal (100*i*) mounted with the camera (106*i*), and the member authentication is carried out by reading the QR code (registered trademark) displayed on the screen of a different mobile terminal (100*h*) in which the member authentication app is installed. Other methods may also be used in the specific application of the present invention.

First, as a preparation step, the character information is set which will trigger the generation of the member authentication app. The member authentication app should not be open to general users, but only installed in the specific terminals for business purposes, therefore a confirmation is performed here that a pre-set character information and a pre-set passcode match. Other methods may also be used in the specific application of the present invention.

The character information serving as the trigger to generate a member authentication app is set as "build_new_Certifer", the passcode as "9111", and the command to request a passcode as "sndCmnd:REQ_INPUTPASS", and each item of data is linked to and registered in the determination database. At this point, it may also be in the form such that the multiple passcodes are set relative to the character information "build_new_Certifer" serving as the trigger, or an expiration limit is set on the passcode.

In addition, if the character information and passcode are normally authenticated, then a member authentication program component (component γ) is linked to and stored in the determination database as a program component corresponding to the character information.

Figure 25:
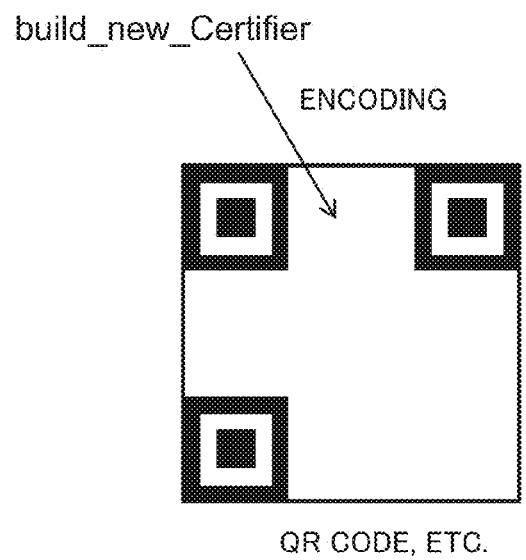
FIG. 25 A diagram showing a QR code (registered trademark) (code #3) in an app generation system according to the present invention.

A QR code (registered trademark) (code #3) is generated in which the aforementioned character information "build_new_Certifer" is stored (see FIG. 25). At this point, for the purpose of clarifying the role of character information and facilitating the identification, a character string data (ID tag) can be inserted before or after the character information.

Next, as an implementation step, the aforementioned QR code (registered trademark) (code #3) is read using the camera (106i) on the mobile terminal (100i) in which the parent app (300) is installed. The mobile terminal (100i), having acquired the image information for the QR code (registered trademark) (code #3), activates the decoder (107), and as the result of decoding, the mobile terminal acquires the character information "build_new_Certifier" stored in the QR code (registered trademark) (code #3). The mobile terminal (100i) communicates with the server (200) via the network and transmits the acquired character information "build_new_Certifier" to the server (200).

At this point, it may also be in the form such that, together with the acquired character information "build_new_Certifier," the mobile terminal (100i) transmits the information other than what is stored in the QR code (registered trademark), for example, ID character string data (ID tag), to the server (200). It may also be in the form such that, in addition to the character information stored in the QR code (registered trademark), the additional information such as "user's own profile information", "utilized language", "position information", "IP address", "past usage history," or the data such as "an ID number uniquely identifying basic software such as the OS, etc. installed on the terminal" are also sent to the server (200).

The server (200) identifies the character information "build_new_Certifier" from the data received from the mobile terminal (100i) and searches the determination database with the character information as the key information, identifying the command "sndCmnd:REQ_INPUTPASS" for requesting the passcode linked to the character information and stored, transmitting this to the mobile terminal (100i).

The mobile terminal (100) communicates over the network with the server (200), recognizes the transmitted passcode request command "sndCmnd:REQ_INPUTPASS," and displays a screen prompting "input passcode" on the display (102) of the mobile terminal (100i). The mobile terminal (100i) transmits the passcode input by the user, e.g. "9111", to the server (200).

The server (200) searches in the determination database for the passcode "9111" received from mobile terminal (100i) and confirms that the character information "build_new_Certifier" and the passcode "9111" are registered (stored) in the program component database. The server (200), after confirming that this is a proper procedure, acquires the identification data (e.g., "buhin-γ") for the program component (component γ) linked to the record and stored. At this point, it may also be in the form such that the server (200) repeatedly searches the determination database using the data such as the aforementioned additional information or the user-input information, etc. to identify the linked data or the program components in more detail.

Next, using the program component ID data "buhin-γ" acquired from the determination database as the key information, the program component database (206) is searched and the program component "component γ," which is linked to the ID data and stored, is acquired. The server (200) transmits the program component "component γ" acquired from the program component database (206) to the mobile terminal (100i). At this point, it may also be in the form such that the program component is directly transmitted from the server (200) to the mobile terminal (100i), or the information related to the program component "component γ" is transmitted from the server (200) to the mobile terminal (100i) and a request is made from the mobile terminal (100i) to the server (200), so that the program component "component γ" on the server (200) is downloaded.

The mobile terminal (100i) generates and activates the membership authentication app (app γ) to run on the mobile terminal (100i) using the program component "component γ" received from the server (200). The app γ acquires the mobile terminal's unique ID upon being activated. In the specific application of the present invention, it may also be in the form such that the data other than the unique ID is acquired. After being activated, the app γ prompts the user to input the passcode for identifying the user him/herself (may be not only character data, but a data set made up of gestures or the like).

Figure 26:
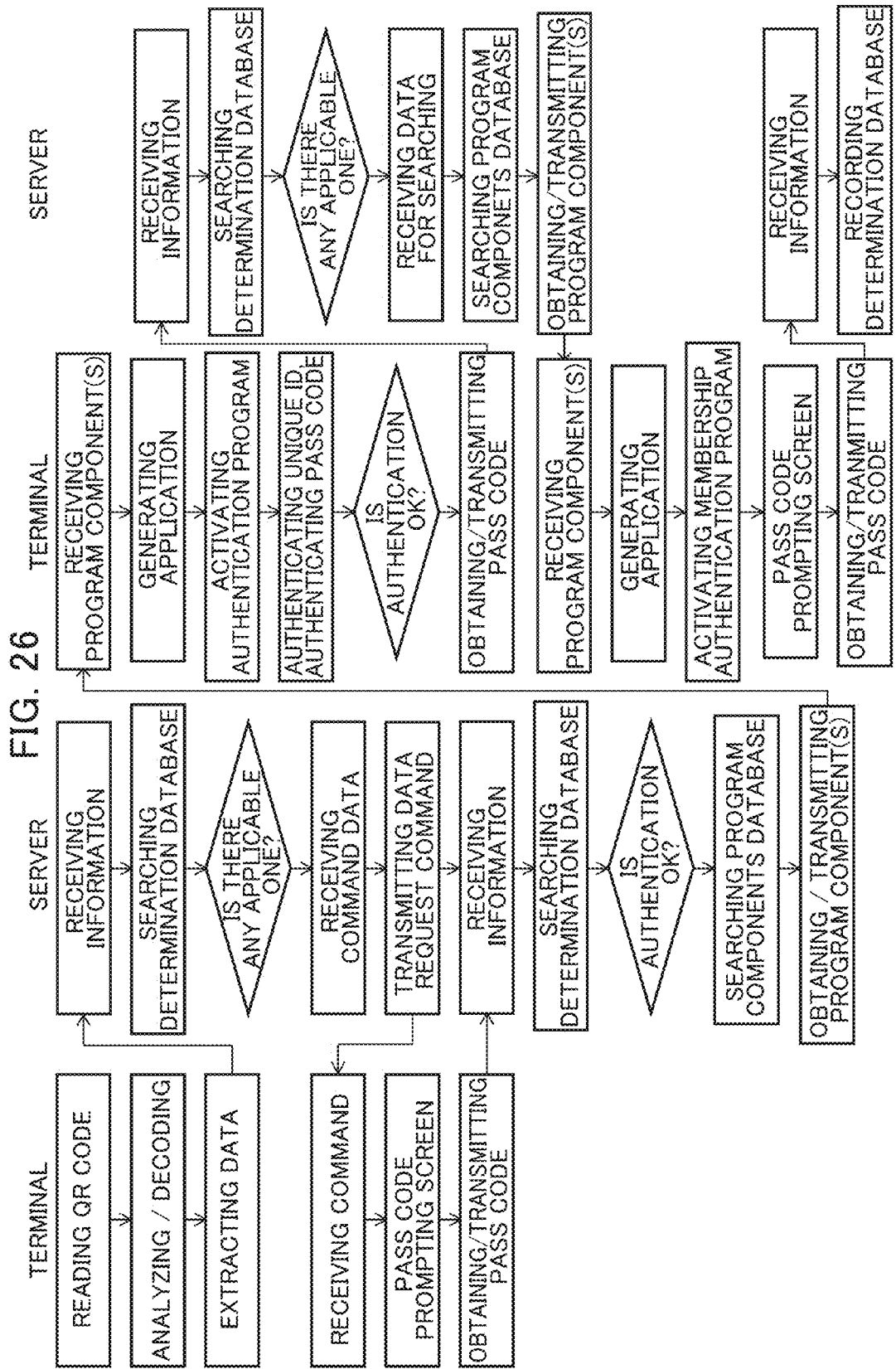
FIG. 26 An explanatory diagram showing the flow up until the recording of passcode information relating to membership cards in a determination database in an app generation system according to the present invention.

When a user inputs the passcode information such as the character string "0111", the app γ stores such information and communicates to the server (200), and the server (200) registers this, together with the unique ID acquired, to the determination database; FIG. 26. At this point, the character string "0111" input by the user is linked to the unique ID and stored in as the formal passcode to the serve as the app's passcode for user authentication.

The mobile terminal (100i) generates and activates the membership authentication app (app γ) to run on the mobile terminal (100i) using the program component "component γ" received from the server (200). The app γ acquires the unique ID at the time of activation and validates that it matches the information stored in the app γ upon being activated. If it matches, then the app activates, however, if it does not match, then the membership authentication app γ does not activate normally. In the specific application of the present invention, it may also be in the form such that the data other than the unique ID is acquired. After being activated, the app γ prompts the user to input the passcode for identifying the user him/herself (may be not only character data, but a data set made up of gestures or the like). If the input data matches the passcode pre-stored in the app γ, then the app γ operates as the membership authentication app, and if the input data does not match the pre-stored passcode, then the app γ does not operate.

When a normally activated app γ operates as the member authentication app, it reads the QR code (registered trademark) (code #2) generated by the membership card app (app β) in another mobile terminal (100i) using the camera (106i) on the mobile terminal (100i). The mobile terminal (100i), having acquired the image information for the QR code (registered trademark) (code #2), activates the decoder (107), and as the result of decoding, the mobile terminal acquires the membership card ID, the unique ID, and the transaction code stored in the QR code (registered trademark) (code #2). It may also be in the form such that, in order to maintain the confidentiality of data stored in the QR code (registered trademark), the data such as the unique ID or the passcode is encoded, or translated and represented according to the specific algorithm. The mobile terminal (100i) transmits the acquired data via the network to the server (200).

Using the membership card ID, the unique ID, and the transaction code received from the mobile terminal (100i), the server (200) searches the determination database, confirms that this information is linked to and stored in, and transmits a command to the mobile terminal (100i) (an example: "sndCmnd:SHOW_ID-CONFIRMED") to display that the authentication is completed in order to confirm that the formal member authentication is completed.

The mobile terminal (100) communicates over the network with the server (200), recognizes the transmitted authentication completed display command "sndCmnd:SHOW_ID-CONFIRMED," and displays a screen showing "membership card formal authentication complete" on the display (102) of the mobile terminal (100i).

Next, the concrete embodiment of generating a program which functions as a point card in the system of the present invention will be explained.

Regarding the representative method of generating a point card program, it will explain:

(1) a method of generating an authentication program for inputting and registering an authentication data for authenticating a personal identity;

(2) a method of generating an pint card program in a mobile terminal using an authentication program; and (3) a method of generating a point management program to authenticate point cards and assign ranks or points.

Other methods may also be used in the specific application of the present invention.

First the aforementioned (1) the method of generating an authentication program for authenticating a personal identity will be explained.

Here, it will explain an example in which the followings are used as the basic data for authenticating a personal identity in order to generate a program for collecting and registering the basic data for a personal identification:

(a) an ID number which is unique to each mobile terminal (an ID number uniquely identifying the hardware of the mobile terminal, or an ID number uniquely identifying the basic software such as the OS, etc. installed in the mobile terminal, or a combination thereof); and (b) a passcode input by the user him/herself (may also be a data set made up of not only character data, but gestures, etc.). In the specific application of the present invention, it may also be in the form such that the data other than the aforementioned (a) and (b) is combined for authentication. It may also be in the form such that the additional information such as "user's own profile information", "utilized language", "position information", "IP address", "past usage history" are also used for authentication.

First, generating the individual authentication program and the process of individual authentication are accomplished by executing the same individual authentication process method as described above.

The program a acquires a unique ID for each mobile terminal and prompts the user to enter a passcode. If a user inputs a passcode information such as the character string "0909", then the program α stores such information and communicates to the server, registering this together with the acquired unique ID in the determination database. At this point, a program component (component δ) for the purpose of a point card app software is linked to and stored in as a program component responsive to a passcode or unique ID.

Next, the aforementioned (2) the method of generating a point card app software in a mobile terminal using an authentication program will be explained.

First, a member registration process is executed by the same method discussed above. The server (200) acquires the program component (component α) ID data (an example: "buhin-α") and transmits the information about the program component (component α) to the mobile terminal (100h).

When the mobile terminal (100h) has received the information about the program component (component α) from server (200), the mobile terminal activates the app α if an authentication data collecting app (app α) for authenticating an identity based on "component α" has been generated in the mobile terminal (100h), and the app α issues a request to the server (200) not to transmit "component α" but rather to transmit the program component (component δ) for the point card app. At this point, it may also be in the form such that the unique ID of the mobile terminal (100h) is also transmitted from the mobile terminal (100h) to the server (200).

When the server (200) receives the character information (e.g., "buhin-δ") uniquely identifying the program component (component δ) for the point card app from the mobile terminal (100h), the server searches the program component database (206) using the character information and acquires the program component (component δ) for the point card app. The server (200) transmits the program component "component δ" acquired from the program component database (206) to the mobile terminal (100h). At this point, it may also be in the form such that the program component is directly transmitted from the server (200) to the mobile terminal (100h), or the information related to the program component "component δ" is transmitted from the server (200) to the mobile terminal (100h) and a request is made from the mobile terminal (100h) to the server (200), so that the program component "component δ" on the server (200) is downloaded.

The mobile terminal (100h) generates and activates the point card app (app δ) to run on the mobile terminal (100h) using the program component "component δ" received from the server (200). The app δ acquires the unique ID at the time of activation and validates that it matches the information stored in the app δ. If it matches, then the app activates, however, if it does not match, then the point card app δ does not activate normally. In the specific application of the present invention, it may also be in the form such that the data other than the unique ID is acquired. After being activated, the app δ prompts the user to input a passcode for identifying the user him/herself (may be not only character data, but a data set made up of gestures or the like). If the input data matches the passcode pre-stored in the app δ, then the app δ operates as the point card app, and if the input data does not match the pre-stored passcode, then the app δ does not operate as the point card app.

Figure 27:
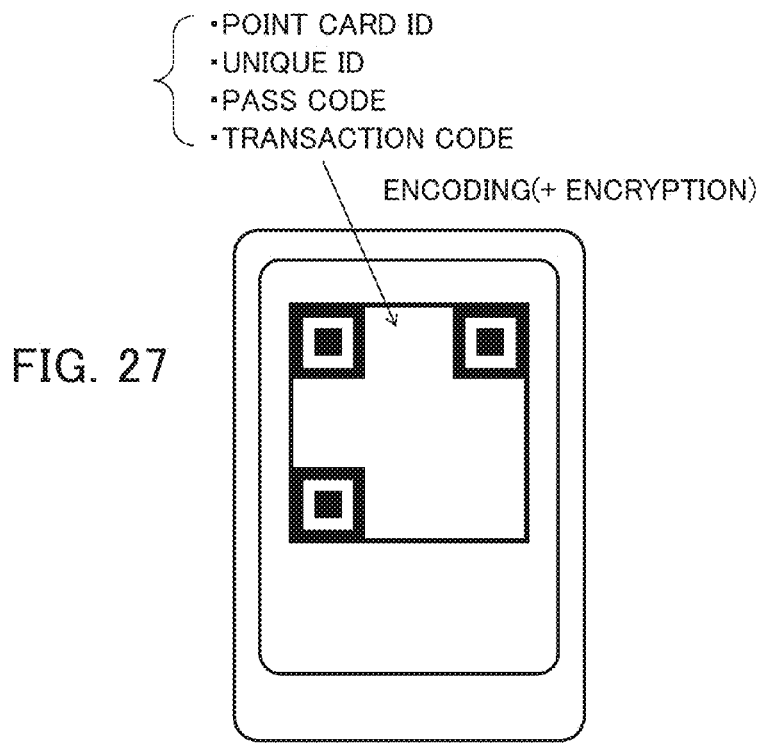
FIG. 27 A diagram showing a QR code (registered trademark) (code #4) in an app generation system according to the present invention.

When the normally activated app δ operates as the point card app, a dedicated QR code (registered trademark) (code #4) is generated and displayed on the display (102) of the mobile terminal (100h) (see FIG. 27). In addition to the point card ID, the unique ID or the passcode acquired at the time of the app δ activates or has already been held by the app δ is stored in the QR code (registered trademark), and a "transaction code" randomly generated by the app δ when the QR code (registered trademark) is generated is also stored. At this point, it may also be in the form such that, in order to maintain the confidentiality of data stored in the QR code (registered trademark), the data such as the unique ID or the passcode is encoded, or translated and represented according to the specific algorithm.

Figure 28:
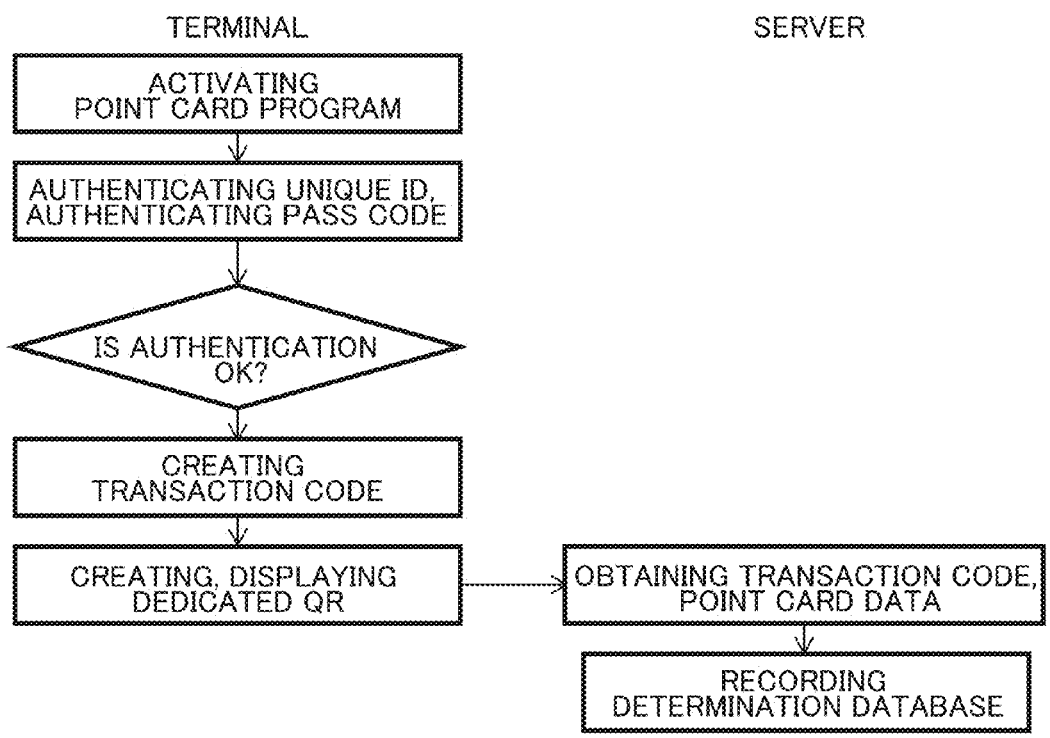
FIG. 28 An explanatory diagram showing the flow of the generation of transaction codes relating to point cards in an app generation system according to the present invention.
Figure 29:
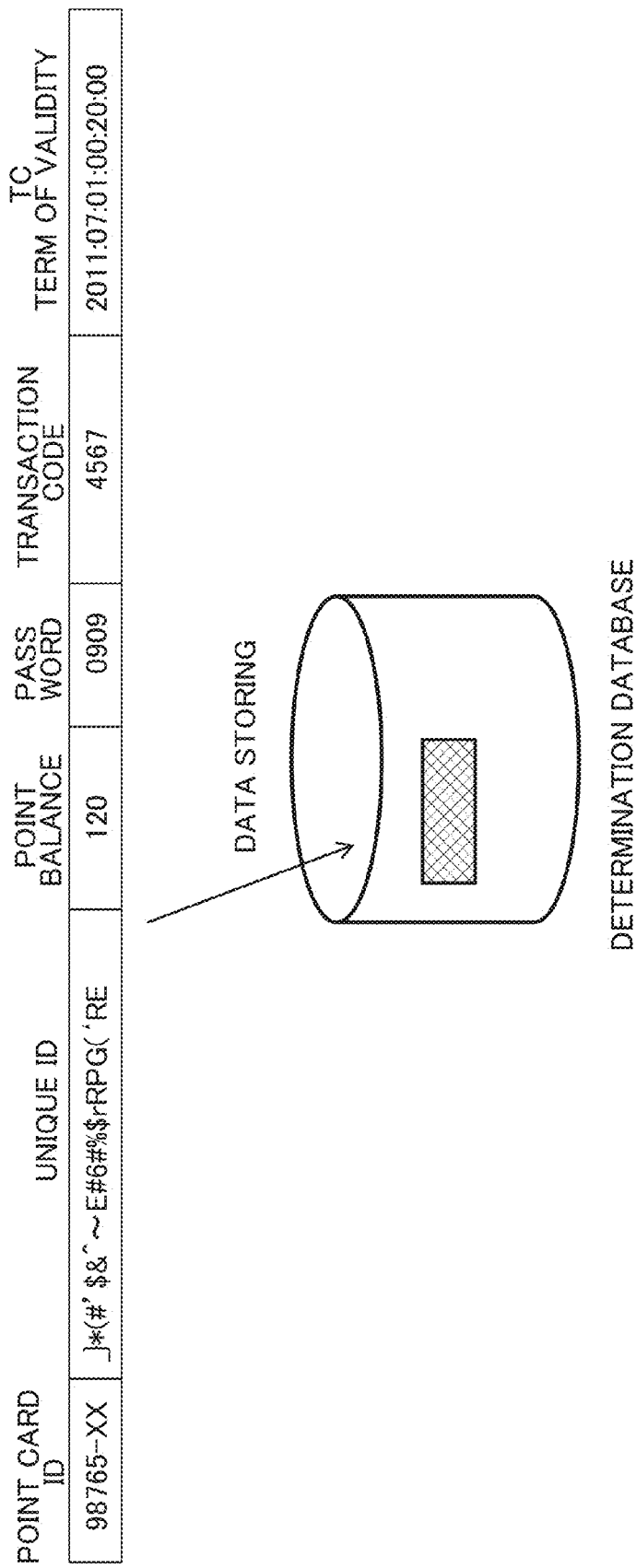
FIG. 29 An explanatory diagram of the appearance when transaction codes, etc. relating to point cards are stored in a determination database in an app generation system according to the present invention.

Each time the app δ generates a QR code (registered trademark) which will serve as a point card, the app δ generates a "transaction code" which is different on each occasion (for example, on this occasion it is "4567", on the next occasion it is "9876"), communicating with the server (200) and storing a "transaction code" (together with the user unique ID or passcode, etc.) in the determination database (FIGS. 28 and 29). Since the content of the data, especially transaction code, included in the QR code (registered trademark) differs each time the point card QR code (registered trademark) is generated, an authentication will not occur if an image of the point card QR code (registered trademark) generated in the past is reproduced and used (because the latest point card and the transaction code will not match). Note that at this point, it may also be in the form such that an expiration limit (expiration time, e.g. Jul. 1, 2011, 12:20 am) can be set for the "transaction code".

At time of operation, the app δ performs the registration and confirmation of the point balance, together with registration of the transaction code. The app δ installed on the mobile terminal (100h) communicates over the network with the server (200), transmits the point card ID, the unique ID, and the passcode stored on the app δ, at the same time confirming the point balance.

The server (200) searches the point card ID, the unique ID, and the passcode received from the mobile terminal (100h) and confirms that each item of data is linked to and registered in the determination database (205). The server (200), after confirming that this is a formal procedure, acquires the balance data (e.g., "120 points") linked to the record and stored and transmits it over the network to the mobile terminal (100h). At this point, it may also be in the form such that the server (200) repeatedly searches the determination database (205) using the data such as the above additional information or the user-input information, etc. to identify the linked data or the program components in more detail.

Figure 30:
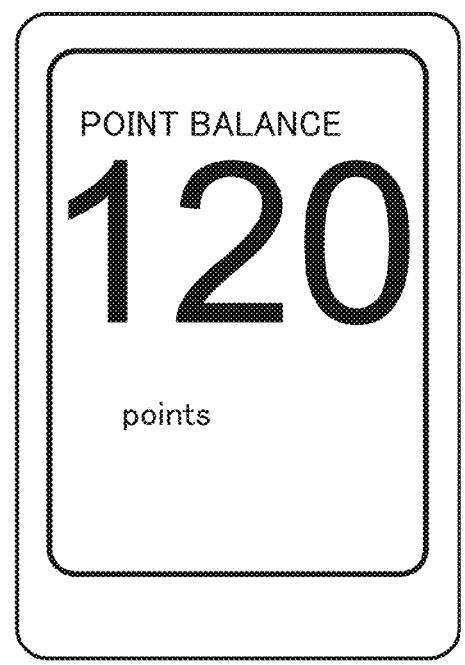
FIG. 30 A diagram showing a point balance screen in an app generation system according to the present invention.

The point card app (app δ) installed in the mobile terminal (100h) recognizes the "120 points" point balance transmitted from the server (200) and displays a point balance screen on the display (102) of the mobile terminal (100h) (see FIG. 30).

Next, the aforementioned (3) a method of generating a point management app to authenticate point cards and assign ranks or points will be explained.

First, using the same method as described above, the point card management app is initialized. The mobile terminal (100j) generates and activates a point card app (app ε) to run on the mobile terminal (100j) using the program component "component ε" received from the server (200).

The mobile terminal (100j) generates and activates a point card app (app ε) to run on the mobile terminal (100j) using the program component "component ε" received from server (200). The app ε acquires the mobile terminal's unique ID upon activating. In the specific application of the present invention, it may also be in the form such that the data other than the unique ID is acquired. After being activated, the app ε prompts the user to input a passcode for identifying the user him/herself (may be not only character data, but a data set made up of gestures or the like).

Figure 31:
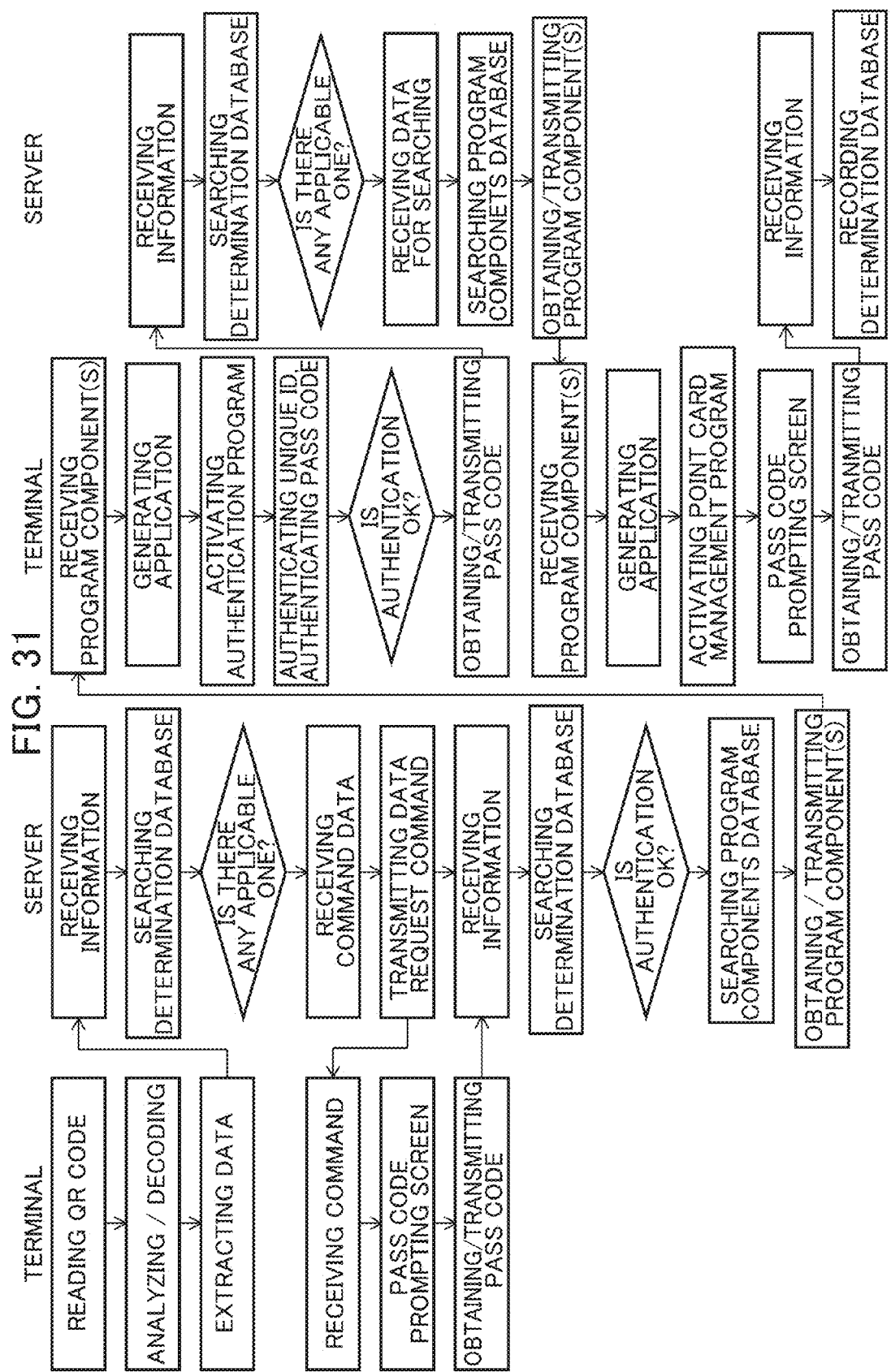
FIG. 31 An explanatory diagram showing the flow up until the recording of passcode information pertaining to point cards in a determination database in an app generation system according to the present invention.

When a user inputs passcode information such as the character string "0222", the app ε stores such information and communicates to the server (200), registering this together with the acquired unique ID in the determination database (see FIG. 31). At this point, the character string "0222" input by the user is linked to the unique ID and stored in as the formal passcode to serve as the program's passcode for user authentication.

The mobile terminal (100j) generates and activates a point card app (app ε) to run on mobile terminal (100j) using the program component "component ε" received from server (200). The app ε acquires the unique ID at the time of activation and validates that it matches the information stored in the app ε upon activating. If it matches, then the app activates, however, if it does not match, then the point card management app ε does not activate normally. In the specific application of the present invention, it may also be in the form such that the data other than the unique ID is acquired. After being activated, the app ε prompts the user to input a passcode for identifying the user him/herself (may be not only character data, but a data set made up of gestures or the like). If the input data matches the passcode pre-stored in the app ε, then the app ε operates as the point card management app, and if the input data does not match the pre-stored passcode, then the app ε does not operate.

When the normally activated app ε operates as the point card management app, it reads the QR code (registered trademark) (code #4) generated by the point card app (app δ) on another mobile terminal (100h) using the camera (106j) on the mobile terminal (100j). The mobile terminal (100j), having acquired the image information for the QR code (registered trademark) (code #4), activates the decoder (107), and as the result of decoding, the mobile terminal acquires the point card ID, the unique ID, and the transaction code stored in the QR code (registered trademark) (code #4). It may also be in the form such that, in order to maintain the confidentiality of data stored in the QR code (registered trademark), the data such as the unique ID or the passcode is encoded, or translated and represented according to the specific algorithm. The mobile terminal (100j) transmits the acquired data via the network to the server (200).

Based on the point card ID, the unique ID, and the transaction code received from the mobile terminal (100j), the server (200) searches the determination database (205), and confirms that this information is linked to and stored in, and transmits a command to the mobile terminal (100j) (an example: "sndCmnd:SHOW_ID-CONFIRMED") to display that an authentication is completed so as to confirm that the formal point card authentication is completed.

The mobile terminal communicates over the network with the server (200), recognizes the transmitted authentication completed display command "sndCmnd:SHOW_ID-CONFIRMED," and displays a screen showing "point card formal authentication complete" on the display (102) of the mobile terminal (100j).

When the point card app (app ε) installed in the mobile terminal (100j) is used to identify the target point card, and the granted points (points added) or the consumed points (points used) are input, the point card management app (app ε) stores the input points added or the points used in the determination database (205), along with the target point card ID. When the points added or the points used are stored, the server (200) updates the point balance data, adding or subtracting to the immediately prior point balance.

Next, it will explain the handling of additional information when, using the analysis device (204), the server (200) makes a comparison of the received character information and the additional information with the app listing database (211) to identify the app to be generated.

When the server (200) is identifying the apps to be generated, in cases such as when the multiple candidates are found on the received character information, or a perfectly matching candidate is not found, but the multiple imperfectly matching candidates are found, it may be possible to identify an app to be generated by using the additional information. The server (200) is provided with an additional information condition database (213), and when there is additional information requiring particular consideration regarding each app, the relevant additional information conditions are set for each app. Performing a comparison with not only the app listing database (211) but also the additional information condition database (213), the analysis device (204) can narrow down to a single app to be generated.

FIG. 32 is an example showing the content of additional information condition database (213). Here the age, the gender (f: female/m: male), the position information for the mobile terminal (100) at the time when the QR code (registered trademark) was image-captured, the date on which the QR code (registered trademark) was image-captured, the time instant when the QR code (registered trademark) was image-captured and the language setting (Japanese/English/Korean, etc.) on the mobile terminal (100) are used as the additional information. The conditions noted in each of the respective additional information items indicate that when the conditions are applicable, an app should be generated. It shows an app regarding bookstore C should be generated when the position information is "within the city of Saitama". It shows similarly, if the position information is "within Minato ward" or "within Shibuya ward", and the gender is "f (=female)," then an app regarding restaurant F should be generated.

For example, assume that the store names of car dealer I and car dealer J in FIG. 32 are the same or extremely similar (if the business regions or types of business differ, the store names are in fact very frequently the same or extremely similar). In this case, it is not certain from the character information obtained by image-capturing and decoding the QR code (registered trademark) which app should be generated. Furthermore, assume the location where the QR code (registered trademark) was image-captured is Tsuzuki ward, Yokohama city, Kanagawa prefecture (in this case the mobile terminal (100) position information at the time the QR code (registered trademark) was image-captured will show Tsuzuki ward, Yokohama city, Kanagawa prefecture). The analysis device (204) compares the additional information condition database (213) with the additional information. It is thus determined that since there is additional information, which should be given priority, that the car dealer I is in Yokohama city and the car dealer J is in Setagaya ward, and the position information for the mobile terminal (100) at the time the QR code (registered trademark) was image-captured was Tsuzuki ward, Yokohama city, Kanagawa prefecture, the app to be generated is for car dealer I.

There can also be apps for which any particular additional information condition is not specified, such as Apparel Shop L. In such cases, where no particular additional information condition is specified, apps for which conditions are specified are identified and given priority for generation (when conditions are met, of course). For example, the store names of apparel shop L and apparel shop P in FIG. 32 are similar, and if a determination cannot be made from the character information obtained from the QR code (registered trademark) as to whether apparel shop L's app should be generated or apparel shop P's app should be generated, then if the additional information of gender is "m (=male)," it is determined that an app for apparel shop P should be generated. Of course if the additional information is "f (=female)," then no determination can be made from these conditions as to whether the apparel shop L's app should be generated or the apparel shop P's app should be generated. In such cases there can also be the embodiments in which there is no relevant (should be generated) app, and there can also be the cases in which the app with the lowest app ID (registered earlier in the app listing database (211)) is given priority in the identification.

There can also be the embodiments in which a large number of conditions overlap, as in restaurant F and restaurant G. In such cases, a form can be adopted in which priority is given to the app in which the larger number of additional information conditions match. For example, assume a case in which a determination could not be made as to which app should be generated between restaurant F and restaurant G using the character information alone when determining an app to be generated from the character information obtained by image-capturing and decoding a QR code (registered trademark). Also assume that the location where the QR code (registered trademark) was image-captured is Shibuya ward, Tokyo, and that the additional information relative to the gender is "f (=female)". In this case, the additional information items "gender" and "position information" would both apply to either restaurant F or restaurant G, and a determination cannot be made as to whether the app should be generated for restaurant F or restaurant G with only this additional information. However, the further additional information of "age" is also obtained here, and if we assume that the content of the additional information "age" is "38," then there are two corresponding items for restaurant F and three corresponding items for restaurant G, and as a result, it is determined that the app for restaurant G should be generated.

In the aforementioned example, the priority is determined simply by the number of corresponding items, but such configuration does not necessarily have to be adopted, and for example, a degree of importance could be assigned to each item, and a priority is given starting with those items with higher degree items. A determination can also be made after establishing differences in the degree of importance of each item. As an example of such configuration, in which points are added when any item is matched, the parameters could be set up so that when "age" is matched 2 points are assigned, when "gender is matched" 1 point, when "position information" is matched 3 points, when "date" is matched 1 point, and for unmatching items or items for which no conditions are established 0 points are assigned, with priority given to items with the highest total points obtained by this determination.

It is explained above the process by which the analysis device (204) determines which app to be generated based on the character information and the additional information encoded in the QR code (registered trademark), however the determination process is made simpler if a control code of the type set forth in Claim 5 is pre-embedded in the QR code (registered trademark).

The control code is a character string described according to the appropriate rules in order to uniquely identify apps, and is encoded inside the QR code (registered trademark) in the form as shown in FIG. 33. When image-capturing and decoding a QR code (registered trademark) in which this type of control code is embedded, the control code will definitely be included in the character information obtained. Therefore the analysis device (204) on the server (200), having received the character information, easily and reliably identifies which app should be generated by searching the app listing database using the control code as a key.

FIG. 34 shows an example of the non-applicable information storing database (212). If no matching app from the app listing database (211) is found, then the server (200) store the character information and the additional information to the non-applicable information storing database (212) as well as the ID of the mobile terminal (100*d*) from which character information is sent, and transmits a notification to the mobile terminal (100*d*) of the fact that there is no app to be generated.

The mobile terminal (100*d*), having received the notice that there is no app to be generated, displays that message to the user on the parent app (300) and ends the app generating process.

In addition to transmitting to the mobile terminal (100*d*) the notification that there is no app to be generated, the server (200) also adds a new record having the character information and the additional information each on which there is no applicable app, as the key information, to the app listing database (211). Because there is insufficient content (information) in the added record, this can of course not be complete information for generating an app. What is added in this process is only a frame, referred to as a record, and at the time of the addition, the item relating to whether or not to generate an app is a "no" (see FIG. 34).

Thereafter, information may be added to the new record in the app listing database (211) by the manager, etc. of the server (200). For example, if a QR code (registered trademark) related to a particular restaurant A is image-captured and an app generation is attempted, but no match is found in the app listing database (211), then a new record (in which the item relating to whether or not it is possible to generate a new app is "no") having information related to the character information obtained from the QR code (registered trademark) for restaurant A is registered. Thereafter, in cases such as when the app type and etc. for the restaurant A are decided between the restaurant A and the service implementer, information will be added to each item in the new record (pertaining to restaurant A), and the item relating to whether or not to generate an app will change from "no" to "yes." At this point, preparations for app generation pertaining to restaurant A will be completed on the server (200) side.

When the preparations for generation of an app pertaining to restaurant A have been completed as noted above at the point when the QR code (registered trademark) for restaurant A is image-captured and the character information obtained from the same is transmitted to the server (200), an app about restaurant A is found in the app listing database (211) through an analysis of the character information, and the generation flow proceeds as described above.

Similarly, if the mobile terminal (100d) with which an attempt to generate an app related to restaurant A had been attempted in the past (and generation was not possible at that time) image-captures the same QR code (registered trademark) once again, then the character information is sent in the same way as before to the server (200), and the server (200) analyzes the received character information. Since the matching app is found as the result of analysis (information about an app relating to restaurant A is present in the app listing database (211)), a generation proceeds in the normal flow, and an app relating to restaurant A is ultimately generated on the mobile terminal (100d) and an icon for the same is displayed.

In the aforementioned embodiment, it explains an example in which the mobile terminal (100d) which had previously attempted to generate an app for restaurant A happened to again image-capture the same QR code (registered trademark) and attempt to generate an app, but a form can also be adopted for apps which could not be generated once, whereby supplemental app generation is done at a later date when the environment is ready, without performing operations autonomously on the terminal side. In the following paragraphs an example which adopts such configuration will be described.

If a certain mobile terminal (100d) had previously attempted to generate an app relating to a restaurant C but was unsuccessful, then the character information related to that restaurant C (character information C) and related additional information are stored, along with the ID of the mobile terminal (100d), in non-applicable information storing database (212). Also, a new record having information relating to the character information C (in which the item relating to whether or not it is possible to generate a new app is "no") is registered in the app listing database (211). Thereafter, along with the addition of information relating to restaurant C in the record, the item relating to whether or not to generate an app is changed from "no" to "yes."

The server (200) periodically compares the non-applicable information storing database (212) with the content of the app listing database (211). When the comparison is made after the item relating to whether or not to generate an app has been changed from "no" to "yes", it is found that an app related to restaurant C can be generated from the character information C and its related additional information. The server (200) then acquires the attribute and the configuration information for a restaurant C app, and the information relating to the program components needed to generate an app, from the app listing database (211), and copies the program components from the program component database (206) and stores the same in the storage means (202), along with the mobile terminal (100d) ID indicating that those items relate to the mobile terminal (100d).

Thereafter, the mobile terminal (100d) image-captures a different QR code (registered trademark) (relating to restaurant D) and attempts to generate an app for restaurant D. Here the mobile terminal (100d) transmits the character information (relating to restaurant D=character information D) acquired from the QR code (registered trademark) to the server (200), and the app generation proceeds as explained above. When, as the result of analysis of the character information D, the matching app (app D) is present in the app listing database (211), the app D attribute and the configuration information and the program components required to generate the app D are transmitted from the server (200) to the mobile terminal (100d), however, on that occasion the server (200) also transmits to the mobile terminal (100d) the app C attribute and the configuration information as well as the program components required to generate the app C, which are stored in the storage means (202). In the mobile terminal (100d), the parent app (300) generates the app D and displays an icon for the app D on the screen, and it also generates the app C and displays an icon for the app C on the screen.

The server (200), having transmitted to the mobile terminal (100d) the app C attribute and the configuration information as well as the program components required to generate the app C, furthermore accesses the non-applicable information storing database (212) and deletes the record of character information C stored along with the mobile terminal (100d) ID.

By doing as described above, for an app which could not be generated because a matching app was not present in the app listing database (211) at a particular time, such app can be supplementally generated after the information required for generation is assembled at a later date. Note that the above is just an example, and it may be configured such that the comparison of the contents of the non-applicable information storing database (212) with those in the app listing database (211) is not only performed periodically, but the comparison may be always performed when a new character information is transmitted from the mobile terminal, or it may also be configured such that the comparison is performed in advance before a new program component is transmitted when the new program component is transmitted. In addition, the timing at which the supplemental generation is performed is not limited to the time of generation of the new app, and it may also be configured such that if a supplementally generatable app is found as the result of comparison between the non-applicable information storing database (212) and the app listing database (211), for example, then the app attribute and the configuration information for supplemental generation, along with the program components needed to generate the app, can be immediately transmitted from the server (200), or it may also be configured such that if the supplementally generatable app is found, then the notification of that fact can be made from the server (200) to the mobile terminal, and the app attribute and the configuration information for appropriate supplemental generation, and the program components needed to generate the app are transmitted, depending on the response from the mobile terminal side to that notification (it is assumed that a decision and response, etc. are made regarding whether to do a supplemental generation, either automatically or by user selection). Moreover, so long as a communication means is obtained, the non-applicable information storing database (212) (211) can be placed in a third storage means rather than the server (200), or it can also be placed on the mobile terminal. If it would be placed in the storage device (104) of the mobile terminal, then the non-applicable information storing database (212) is scaled down to the one only having the information relating to the mobile terminal, and the content thereof is transmitted from the mobile terminal to the server (200) periodically or on a suitable occasion when the mobile terminal communicates with the server (200), and thereby performing the comparison with the app listing database (211).

Each app is updated from time to time due to the fixture of bug, the addition or change of the function, or the modification, etc., and it may result in updating the version. Along with the updates of the content in the app to be generated due to the version update, there are also the updates from time to time in the contents, respectively stored in the determination database (205), the program component database (206), and the app listing database (211). As shown in FIG. 7, the information relating to the app versions is stored in the app listing database (211), and when updates occur, the information about versions is also updated (version numbers are incremented).

The mobile terminal (100) is provided with a version information storing database (113). FIG. 35 shows an example of the configuration of the version information storing database (113). The ones stored in the version information storing database (113) are the version information about each app generated and currently present in the mobile terminal (100).

When the mobile terminal (100) transmits the character information acquired from a newly image-captured QR code (registered trademark), not only character information and related additional information, but also version information for each app stored in the version information storing database (113) of the mobile terminal (100) are transmitted to the server (200).

The server (200), having received the content stored in the version information storing database (113), compares the received data with the content in the app listing database (211) and determines whether any apps are present in which there are differences between the versions.

As the result of the determination, if there is an app present in which there are the differences in the version information, then the server (200) acquires, from the app listing database (211), the information pertaining to the attributes and the configuration of the app in which there are the differences (the same app in the version newer than the one generated in the mobile terminal (100)), and the information pertaining to the program components constituting the app, and then transmits the information pertaining to the attributes and the configuration and the program components constituting the app to mobile terminal (100).

The mobile terminal (100), having received the information pertaining to the attributes and the configuration and the program components constituting the app, generates the app (the same app in a newer version than the one already generated in the mobile terminal) on the mobile terminal (100) and deletes the old version of the app (the app already generated on the mobile terminal). By so doing, when the replacement of the old version of the app by the new version of the app is completed, the mobile terminal (100) overwrites the version information pertaining to the app in the version information storing database (113) with the new version which is just generated.

In the example described above, the transmission of the content of version information storing database (113) from the mobile terminal (100) to the server (200) is accomplished using the opportunities when the character information acquired from the newly image-captured QR code (registered trademark) is transmitted to the server (200), but it is not necessarily limited thereto, and it may also be in the form such that the content of the version information storing database (113) is always transmitted to the server (200) when the parent app (300) itself activates or terminates, or the transmission can be periodic, such as once per day or once per week, etc., or the server (200) can inquire to the mobile terminal (100) about the content of the version information storing database (113) on the mobile terminal (100) at an appropriate frequency, and the mobile terminal (100) can transmit the content of version information storing database (113) to the server (200) each time there is such an inquiry.

Next, an embodiment of the process for regenerating a child app will be explained.

The mobile terminal (100) comprises a use history storing database (114) for storing the IDs of each generated app and the history pertaining to the activates or uses of child app.

FIG. 36 shows an example of a use history storing database (114). The content stored in the use history storing database (114) would be the accumulated total activation number of times, the accumulated total activation time, the event arguments, etc. of the child app, and, here it is assumed as three types of information, such as the accumulated total activation number of times, the accumulated total activation time, and the event arguments (see FIG. 36). When a user touches an icon of a child app on the display of the mobile terminal (100) so as to activate or use the child app, the mobile terminal (100) accesses the use history storing database (114) and adds 1 to the numerical value (count) stored in the item of the accumulated total activation number of times of the child app. At the same time, the mobile terminal (100) temporarily stores the time of activation when the child app activates. When the user finishes using the child app, the mobile terminal (100) stores the end time at the time of the termination processing of the child app and calculates the use time of the child app by referring to the time of activation. The mobile terminal (100) stores the use time calculated following the child app termination processing in the use history storing database (114) (if a past cumulative use time is already registered, an addition is made to this and registered).

The use history information accumulated in this way is sent to the server (200) together with the character information sent by the mobile terminal (100) to the server (200) for the separate generation of another child app.

The setting conditions pertaining to the accumulated activation number of times, the accumulated total activation time, and the event argument for each child app, as well as the IDs for child apps to be newly generated when the setting conditions are satisfied, are stored in the app listing database (211) of the server (200).

The server (200), having received use history information, validates whether the accumulated total activation number of times, the accumulated total activation time, and the event arguments for each child app included in the received use history information satisfy the setting conditions for the accumulated total activation number of times, the accumulated total activation time, and the event arguments stored in the app listing database (211). If the condition is satisfied, the server (200) identifies the IDs of child apps to be generated if the condition would be met, and then transmits to the mobile terminal (100) the information pertaining to the ID of the child app which has satisfied the condition (the "old child app" below), the ID of the child app to be generated if the condition is satisfied (the "new child app" below), and the fact that the old child app will be regenerated to the new child app, and the mobile terminal (100) receives this information.

Furthermore, the server (200) determines, from the new child app ID, the attributes and the configuration of the child app to be newly generated, and the program components constituting the app, and transmits the information pertaining to the attributes and the configuration of the new child app, and the program components constituting the new child app to the mobile terminal (100).

The mobile terminal (100) receives, from the server (200), the information pertaining to the attribute and the configuration of the new child app, and program components constituting the new child app, and with the received information pertaining to the attribute and configuration of the new child app and program components constituting the new child app, uses the computing device (103) to generate the new child app on the mobile terminal (100).

In the mobile terminal (100), two types of the received app IDs (the old child app ID and the new child app ID) are referenced, and after confirming the completion of generation of a new child app (after the items pertaining to the new child app are respectively stored in the version information storing database (113) set forth in Claim 16 and the use history storing database (114) set forth in Claim 18), the old child app is deleted from the mobile terminal (100), and the display of the icon for the old child app on the display (102) is terminated.

When regenerating the apps as described above, it is desirable from a standpoint of communications efficiency to take advantages of the transmissions of the character information from the mobile terminal (100) to the server (200) at the time of app generation as the opportunities to transmit the use history information from the mobile terminal (100) to the server (200), however, there is no such limitation required, and it is acceptable to transmit to the server (200) each time there is an update of the use history storing database (114), or to always transmit the use history information to the server (200) at the point when the parent app (300) itself starts or terminates, or it may be configured to use the method of periodically transmitting to the server (200) once per day, once per week, etc., or it may be configured such that the server (200) inquires to the mobile terminal (100) about the content of the use history information on the mobile terminal (100) side at an appropriate frequency, and the mobile terminal (100) transmits the use history information to the server (200) each time when there is such inquiry.

In the above, as an example, it is explained the case where the character information is acquired from a 2D code such as the QR code (registered trademark), etc. however, as set forth in Claim 6, it may also be configured such that the acquisition is made from a 1D code or a 2D or the greater multidimensional code, or various types of video or still picture. An example of such configuration will be explained below.

An arbitrary image is image-captured using the camera (106) on the mobile terminal (100). The image may be a video or a still picture. The video analyzing means (108) provided on the mobile terminal (100) analyzes the image-captured image and acquires the character information appropriate to the content being shown in the image. In this case, an acquisition of the character information is carried out by extracting the letters and other characters appearing in the image (the technology to optically analyze the characters in the image data and to extract the character information is ubiquitous and is very easily implemented). It may also be carried, without depending on the character information in the image, by comparing the image data itself with the search database, and searching or extracting the character information used frequently with the image from the image data which is judged to have a high degree of sameness, or it may also be possible that each of the aforementioned methods is simultaneously used.

In the mobile terminal, it is usually provided with a camera (106), which is an example of an image capturing means for a video image-capturing or a calling, and a microphone (109), which is an example of a sound recording means. A voice is recorded with the microphone (109), and one or multiple words are extracted from the recorded voice according to the language analysis, and then the extracted words can be used as the character information. It may be considered that the words may be conceivably a name of a retail shop, a trade name, commodity name or a brand name, or it may be the case where they are pertaining to the activities such as a traveling, a camping, or a driving.

When generating an app in a particular mobile terminal (1000, if a parent app (300g) is already installed in another mobile terminal (100g), several child apps are already generated by the parent app (300g), and a generated child app icon is displayed on the screen of the other mobile terminal (100g), then the mobile terminal (100f) can acquire the character information by image-capturing the screen of the mobile terminal (100g). In this case, the video analyzing means (108f) of the mobile terminal (100f) compares the child app icon image appearing in the image-captured image with the icon image data stored in program component database (206) (see FIG. 8) and acquires the child app ID as the character information. Thereafter the same process as described above is followed to generate a child app on the mobile terminal (100f).

EXPLANATION OF REFERENCE NUMERALS

100 Mobile terminal
102 Display
103 Computing device
104 Storage device
105 Communication means
106 Camera
107 Decoder
108 Video analyzing means
109 Microphone
110 Voice analyzing device
111 Program components storage means
112 Primordial app
113 Version information storing database
114 Use history storing database
120 Position information acquisition means
121 Present time acquisition means
122 Language selection means
123 Profile storage means
124 Terminal usage information storage means
200 Server
201 Computation means
202 Storage means
203 Communication means
204 Analysis device
205 Determination database
206 Program component database
207 Video analyzing means
208 Voice analyzing means
210 Child app storing database
211 App listing database
212 Non-applicable information storing database
213 Additional information condition database
300 Parent app 1000 App generation system according the present embodiment

The invention claimed is:

1. An application generation system for generating a child application software program which is different from a parent application software program, the application generation system comprising:
   (i) a mobile terminal including:
      computation means for performing a predetermined computation processing;
      image-capturing means for image-capturing a dimensional code consisting of one dimensional code or a multi-dimensional code of two or more dimensions;
      decoding means for decoding said one dimensional code or said multi-dimensional code which is image-captured by said image-capturing means so as to extract character information corresponding to said one dimensional code or said multi-dimensional code;
      display means for displaying a predetermined information; and
      a first communication means for communicating said character information; and
   (ii) a server including:
      a second communication means for communicating with said first communication means;
      a determination database configured to store determination rules;
      a program component database configured to store program components; and
      analysis means for analyzing said character information received by said second communication means, and for determining a result of said analysis based on said determination rules stored in said determination database, so as to determine information related to an attribute and a configuration of said child application software program to be generated as well as program components constituting said child application software program,
      wherein said mobile terminal is configured to receive information related to said attribute and said configuration of said child application software program transmitted from said second communication means of said server as well as said program components constituting said child application software program, by said first communication means, and to generate said child application software program having a desirable function which is different from said parent application software program, based on said information related to said attribute and said configuration of said child application software program as well as said program components constituting said child application software program.

2. An application generation system according to claim 1, wherein said mobile terminal is further configured to display an icon symbolizing, said child application software program, on said display means in said mobile terminal, when said child application software program is generated.

3. An application generation system according to claim 1, wherein an image data of an icon symbolizing an application software program to be generated is included, in program components constituting said child application software program.

4. An application generation system according to claim 1, further comprising setting one or more information as additional information among the followings:
   (1) a user attribute;
   (2) a position information of said mobile terminal;
   (3) a time when said one dimensional code or said multi-dimensional code is read by operating said image-capturing means;
   (4) a time when said mobile terminal transmits said character information to said server;
   (5) a language used by a user;
   (6) a nationality of said user;
   (7) input information of said user;
   (8) a past utilization history of said user;
   (9) a type (types) of other icon (icons) to be displayed in said display means on said mobile terminal;
   (10) a number of other icon (icons) to be displayed in said display means on said mobile terminal;
   (11) information of whether a specific icon is (icons are) displayed in said display means on said mobile terminal or not;
   (12) information of whether there exists other mobile terminals in which said parent application software program is installed within a certain geographical range with respect to said mobile terminal or not, at a time when said mobile terminal transmits said character information to said server;
   (13) an IP (Internet Protocol) address of said mobile terminal;
   (14) a standard time setting of said mobile terminal;
   (15) a type of said mobile terminal; and
   (16) a type and a version of OS (Operating System) running in said mobile terminal, wherein said analysis means in said server is configured to acquire said determination rules, by searching said determination database, in combination of said additional information and said character information, in order to determine said child application software program to be generated, and program components constituting said child application software program.

5. An application generation system according to claim 1, wherein a specific control code is pre-encoded in said one dimensional code or said multi-dimensional code,
   wherein said mobile terminal acquires a character information in which said specific control code is included, when acquiring said character information from said one dimensional code or said multi-dimensional code, and
   wherein said server is further configured to determine said attribute and said configuration of said child application software program to be generated as well as said program components constituting said child application software program, by setting said specific control code as a key information, at the time of analyzing said character information by said analysis means and said determination database.

6. An application generation system according to claim 1, wherein said server further comprises:
   a generation unit configured to generate said child application software program; and
   a child application software program storage database configured to store said generated child application software program,
   wherein said child application software program is generated in said generation unit so as to store in said child application software program storage database, using information related to said determined attribute and said determined configuration of said child application software program as well as said determined program components constituting said child application software program,
   wherein an icon information of said child application software program generated and an address information indicating a location of where said generated child application software program is stored on said child application software program storage database is transmitted to said mobile terminal, instead of transmitting information related to said determined attribute and said determined configuration of said child application software program as well as said determined program components constituting said child application software program, and wherein said mobile terminal is further configured to display only an icon of said child application software program on said display means in said mobile terminal, based on the icon information of said child application software program, as well as provide access to said child application software program storage database, by said first communication means, when a user touches the icon of said child application software program displayed on said display means in said mobile terminal, and to download and activate said child application software program based on said address information.

7. An application generation system according to claim 1, wherein said mobile terminal further comprises video analysis means, and wherein said mobile terminal is further configured to extract said character information, from a motion picture or a still picture image-captured by said image-capturing means using said video analysis means, instead of extracting said character information from said one dimensional code or said multi-dimensional code using said image-capturing means and said decoding means.

8. An application generation system according to claim 1, wherein said mobile terminal further comprises recording means and voice analysis means, and wherein said mobile terminal is further configured to extract said character information, from a voice recorded by said recording means using said voice analysis means, instead of extracting said character information from said one dimensional code or said multi-dimensional code using said image-capturing means and said decoding means.

9. An application generation system according to claim 1, wherein said mobile terminal further comprises recording means, wherein said server further comprises video analysis means and voice analysis means, and wherein said mobile terminal is further configured to extract said character information, from a motion picture or a still picture image-captured by said mobile terminal, or from a voice recorded by said mobile terminal using said recording means, using said video analysis means or voice analysis means.

10. An application generation system according to claim 1, wherein said server further comprises a function of sending a notification of only information respectively related to said attribute and said configuration of said child application software program as well as said program components constituting said child application software program to said mobile terminal, after having defined an attribute and a configuration of said child application software program to be generated as well as program components constituting said child application software program, wherein said mobile terminal further comprises program component storage means for storing program components which are required for generating said child application software program, and wherein said mobile terminal is further configured to generate said child application software program using said program components stored in said program component storage means, based on said notification from said server.

11. An application generation system according to claim 1, wherein said server further comprises a function of sending a notification of only information respectively related to said attribute and said configuration of said child application software program as well as said program components constituting said child application software program to said mobile terminal, after having defined an attribute and a configuration of said child application software program to be generated as well as program components constituting said child application software program, wherein said mobile terminal further comprises storage means for pre-storing a model of said child application software program having all functions which (such model) is to be used as a matrix for generating said child application software program, and wherein said mobile terminal is further configured to turn on only the necessary function(s), among all functions of which said model has, based on said notification from said server, as well as to turn off other functions, so as to display an icon received by said notification from said server in said display means.

12. An application generation system according to claim 1, wherein said server further comprises, instead of said determination database, an application software program listing database into which all child application software programs which are possible to be generated, and information respectively related to said attribute and said configuration of said child application software program as well as said program components constituting said child application software program are pre-stored, and wherein said server is further configured to search said application software program listing database, based on a combination of said character information and additional information, and if there would exist an applicable child application software program, then to acquire information respectively related to an attribute and a configuration which is required for generating said applicable child application software program as well as program components from said application software program listing database.

13. An application generation system according to claim 12, wherein said server further comprises a non-applicable information storing database, wherein said server is further configured to search an applicable child application software program among child application software programs stored in said application software program listing database using analysis result of said character information and said additional information, and if there would exist no applicable child application software program, then to send a notification of an effect to said mobile terminal, as well as to store said character information and said additional information on which generating said applicable child application software program cannot be carried out in said non-applicable information storing database, and wherein said server is further configured to repeat at a constant frequency of searching again an applicable child application software program among the child application software programs stored in said application software program listing database, in the combination of said character information and said additional information, and if an applicable child application software program would be searched, then to continue generating said applicable child application software program, as well as to delete said character information related to said searched applicable child application software program from said non-applicable information storing database.

14. An application generation system according to claim 12, wherein said server is further configured to send a notification of an effect to said mobile terminal, if there would exist no applicable child application software program, at the time of searching an applicable child application software program among child application software programs stored in said application software program listing database, in the combination of said character information and said additional information,
wherein said mobile terminal further comprises a non-applicable information storing database,
wherein said mobile terminal is further configured to, if said notification of said effect would be received from said server, store said character information and said additional information on which said applicable child application software program cannot be generated into said non-applicable information storing database, and to send a notification of contents of said non-applicable information storing database to said server whenever a communication with said server is performed,
wherein said server is further configured to, after receiving said notification, repeat of searching again an applicable child application software program among the child application software programs stored in said application software program listing database, in the combination of said character information and said additional information, and if said applicable child application software program would be searched, then to continue generating said applicable child application software program, as well as to send a notification of said character information and said addition information related to said searched applicable child application software program to said mobile terminal, and
wherein said mobile terminal is further configured to delete said character information and said additional information related to said searched applicable child application software program from said non-applicable information storing database.

15. An application generation system according to claim 12, wherein said server is further configured to store, into said application software program listing database, said character information and said additional information on which generating said child application software program cannot be carried out, as information of a new child application software program, which is the child application software program still having a defect and is not suitable for generation, if there would be no applicable child application software program, at the time of searching an applicable child application software program among the child application software programs stored in said application software program listing database, in the combination of said character information and said additional information.

16. An application generation system according to claim 12, wherein said mobile terminal further comprises a version information storing database configured to store ID and version information of a first generated child application software program,
wherein said mobile terminal is further configured to store said ID and said version information of said first generated child application software program into said version information storing database, at a time of generating said first child application software program, and to transmit said character information together with content of said version information storing database, at a time of transmitting said character information to said server for separately generating a second child application software program,
wherein said server is further configured to receive the content of said version information storing database transmitted from said mobile terminal, and to check whether there is a difference between received version information of each child application software program stored in said version information storing database and version information of said child application software program having the same ID stored in said application software program listing database,
wherein said server is further configured to, as a result of said check, if there would be a difference, transmit altogether to said mobile terminal, information related to an attribute and a configuration of said child application software program of a new version on said application software program listing database as well as program components constituting said child application software program, at a time of transmitting information related to an attribute and a configuration of said second child application software program as well as program components constituting said second child application software program for separately generating said second child application software program, and
wherein said mobile terminal is further configured to, after receiving information related to an attribute and a configuration of said child application software program of a new version as well as program components constituting said child application software program, generate a child application software program of a new version based on information related to an attribute and a configuration of said child application software program as well as program components constituting said child application software program, and to replace a child application software program of a conventional version having the same ID by said child application software program of a new version.

17. An application generation system according to claim 12, wherein said server further comprises a version information storing database configured to store an ID and version information of a first generated child application software program in every individual mobile terminal,
wherein said mobile terminal is further configured to send a notification of said ID and said version information of said first generated child application software program, at a time of generating said first child application software program to said server,
wherein said server is further configured to store said ID and said version information of said first generated child application software program into said version information storing database, if said notification would be received,
wherein said server is further configured to regularly check whether there is a difference between version information of each child application software program stored in said version information storing database and version information of said child application software program having the same ID stored in said application software program listing database,
wherein said server is further configured to, as a result of said regularly check, if there would be a difference, transmit altogether to said mobile terminal, information related to an attribute and a configuration of said child application software program of a new version on said application software program listing database as well as program components constituting said child application software program, at a time of transmitting information related to an attribute and a configuration of a second child application software program as well as program components constituting said second child application software program for separately generating said second child application software program, and wherein said mobile terminal is further configured to, after receiving information related to an attribute and a configuration of said child application software program of a new version as well as program components constituting said child application software program, generate a child application software program of a new version based on information related to an attribute and a configuration of said child application software program as well as program components constituting said child application software program, and to replace a child application software program of a conventional version having the same ID by said child application software program of a new version.

18. An application generation system according to claim 12, wherein said mobile terminal further comprises a use history storing database for storing a history pertaining to an ID of a first child application software program generated and an activation and a use of said first child application software program, wherein said server is further configured to refer to use history information including a total activation number of times, a total activation time, and an event argument of said first child application software program being used, by referring to said use history storing database, at a time of said first child application software program being activated, and to validate whether or not said referred use history information satisfies setting conditions related to use history information of an applicable first child application software program stored in said application software program listing database, wherein said server is further configured to, as a result of said validation, if said setting conditions would be satisfied, specify an ID of a second child application software program to be generated when said setting conditions are satisfied, which is different from an ID of said first child application software program, wherein an effect that said first child application software program is updated to said second child application software program, together with an ID of said first child application software program and an ID of said second child application software program is transmitted to said mobile terminal, wherein information related to an attribute and a configuration of said second child application software program as well as program components constituting said second child application software program is determined from the ID of said second child application software program, wherein said determined information related to an attribute and a configuration of said second child application software program as well as program components constituting said second child application software program is transmitted to said mobile terminal, wherein said mobile terminal is further configured to receive said determined information related to an attribute and a configuration of said second child application software program as well as program components constituting said second child application software program from said server, wherein said mobile terminal is further configured to newly generate a second child application software program using said computation means, based on said received determined information related to an attribute and a configuration of said second child application software program as well as program components constituting said second child application software program, and wherein said mobile terminal is further configured to replace said first child application software program by said newly generated second child application software program.

* * * * *